United States Patent
Volkerink et al.

(10) Patent No.: US 11,363,427 B2
(45) Date of Patent: Jun. 14, 2022

(54) WIRELESS SENSOR NODES FOR EQUIPMENT MONITORING

(71) Applicant: Trackonomy Systems, Inc., San Jose, CA (US)

(72) Inventors: Hendrik J Volkerink, Palo Alto, CA (US); Ajay Khoche, West San Jose, CA (US)

(*) Notice: Subject to any disclaimer, the term of this patent is extended or adjusted under 35 U.S.C. 154(b) by 0 days.

(21) Appl. No.: 17/209,192

(22) Filed: Mar. 22, 2021

(65) Prior Publication Data
US 2021/0297826 A1 Sep. 23, 2021

Related U.S. Application Data

(60) Provisional application No. 63/081,887, filed on Sep. 22, 2020, provisional application No. 62/992,904, filed on Mar. 21, 2020.

(51) Int. Cl.
| | |
|---|---|
| *H04W 4/38* | (2018.01) |
| *H04W 4/80* | (2018.01) |
| *G01S 19/45* | (2010.01) |
| *H04W 4/02* | (2018.01) |
| *H04W 84/12* | (2009.01) |

(52) U.S. Cl.
CPC .............. *H04W 4/38* (2018.02); *G01S 19/45* (2013.01); *H04W 4/027* (2013.01); *H04W 4/80* (2018.02); *H04W 84/12* (2013.01)

(58) Field of Classification Search
None
See application file for complete search history.

(56) References Cited

U.S. PATENT DOCUMENTS

| | | | |
|---|---|---|---|
| 5,917,433 A | 6/1999 | Keillor | |
| 6,437,702 B1 * | 8/2002 | Ragland | G01S 7/003 340/425.5 |
| 6,614,392 B2 | 9/2003 | Howard | |
| 6,919,803 B2 | 7/2005 | Breed | |
| 7,009,517 B2 | 3/2006 | Wood | |

(Continued)

FOREIGN PATENT DOCUMENTS

| | | |
|---|---|---|
| CA | 3008512 A1 | 12/2018 |
| JP | 2008239282 A | 10/2008 |
| WO | WO 2019/028269 A1 | 2/2019 |

OTHER PUBLICATIONS

PCT Application No. PCT/US2019/042488, International Search Report and Written Opinion dated Nov. 5, 2019.

(Continued)

*Primary Examiner* — Hassan A Phillips
*Assistant Examiner* — Hicham B Foud

(57) ABSTRACT

A sensing system includes a first wireless sensor device configured to generate sensor data on an object of interest and communicate with a first wireless node, the first wireless node configured to communicate with the first wireless sensor device and a section node, and the section node configured to communicate with the first wireless node and a server, and the server. The first wireless node is located within a communication range of the first communication interface of the first wireless sensor device and is configured to receive the generated sensor data. The first wireless node analyzes the received sensor data to determine whether events relevant to the object of interest have occurred.

18 Claims, 24 Drawing Sheets

(56) References Cited

U.S. PATENT DOCUMENTS

| | | | |
|---|---|---|---|
| 8,095,070 B2 * | 1/2012 | Twitchell, Jr. | H04W 84/18 |
| | | | 455/41.2 |
| 8,356,207 B2 | 1/2013 | Hosek et al. | |
| 8,989,053 B1 * | 3/2015 | Skaaksrud | G06Q 20/308 |
| | | | 370/255 |
| 9,015,071 B2 | 4/2015 | Breed | |
| 9,182,231 B2 | 11/2015 | Skaaksrud | |
| 9,189,226 B2 | 11/2015 | Driesen et al. | |
| 9,633,327 B2 * | 4/2017 | Hamm | G06Q 10/0833 |
| 9,767,516 B1 | 9/2017 | Konrardy et al. | |
| 9,799,149 B2 | 10/2017 | Davidson | |
| 9,824,329 B2 | 11/2017 | Stirling et al. | |
| 9,854,556 B2 | 12/2017 | Skaaksrud et al. | |
| 9,860,688 B2 | 1/2018 | Kulkarni et al. | |
| 9,984,350 B2 | 5/2018 | Skaaksrud | |
| 10,057,722 B2 | 8/2018 | Skaaksrud | |
| 10,079,839 B1 * | 9/2018 | Bryan | G05B 15/02 |
| 10,102,494 B2 * | 10/2018 | Skaaksrud | G06Q 10/0833 |
| 10,262,255 B2 * | 4/2019 | Khoche | G06K 19/06037 |
| 11,115,732 B2 | 9/2021 | Lucrecio et al. | |
| 2003/0018927 A1 | 1/2003 | Gadir et al. | |
| 2004/0193467 A1 | 9/2004 | Williams et al. | |
| 2007/0044539 A1 * | 3/2007 | Sabol | G06Q 10/06 |
| | | | 73/19.01 |
| 2007/0049291 A1 | 3/2007 | Kim et al. | |
| 2007/0095905 A1 | 5/2007 | Kadaba | |
| 2008/0239282 A1 | 10/2008 | Zou et al. | |
| 2010/0039284 A1 * | 2/2010 | Hall | H04L 67/12 |
| | | | 340/8.1 |
| 2010/0082870 A1 | 4/2010 | Tokuhara | |
| 2010/0299401 A1 | 11/2010 | Lloyd | |
| 2013/0107770 A1 | 5/2013 | Marsden et al. | |
| 2015/0154531 A1 | 6/2015 | Skaaksrud | |
| 2015/0154538 A1 | 6/2015 | Skaaksrud | |
| 2015/0154544 A1 | 6/2015 | Skaaksrud | |
| 2016/0217399 A1 | 7/2016 | Roelofs et al. | |
| 2016/0233927 A1 | 8/2016 | Wu | |
| 2017/0006490 A1 * | 1/2017 | Shen | H04W 24/10 |
| 2017/0012830 A1 * | 1/2017 | Skaaksrud | H04L 41/12 |
| 2017/0039666 A1 | 2/2017 | Kuersten et al. | |
| 2017/0279892 A1 | 9/2017 | Skaaksrud | |
| 2018/0046964 A1 | 2/2018 | Leoni et al. | |
| 2018/0165568 A1 | 6/2018 | Khoche | |
| 2019/0179298 A1 | 6/2019 | Hosek et al. | |
| 2019/0222055 A1 | 7/2019 | Khoche | |
| 2019/0362215 A1 | 11/2019 | Khoche | |
| 2019/0370624 A1 | 12/2019 | Khoche | |
| 2020/0160622 A1 * | 5/2020 | Aquila | G08B 21/182 |
| 2021/0209923 A1 * | 7/2021 | Kumura | H04W 84/18 |
| 2021/0297826 A1 * | 9/2021 | Volkerink | H04W 4/027 |

OTHER PUBLICATIONS

Lucas Iacono, Wireless Sensor Network Protocols, Universidad De Mendoza, Argentina, 2011.

M.A. Matin et al., Overview of Wireless Sensor Network, Intech, 2012 (http://dx.doi.org/10.5772/49376.1).

Shen et al., A Mobility Framework to Improve Heterogeneous Wireless Network Services, Inderscience Enterprises Ltd., 2011.

Cimino et al., Wireless Communication, Identification and Sensing Technologies Enabling Integrated Logistics: A Study in the Harbor Environment, Research Gate, Oct. 2015 (https://www.researchgate.net/publication/283117890_Wireless_communication_identification_and_sensing_technologies_enabling_integrated_ligistics_a_study_in_the_harbor_environment.

PCT Application No. PCT/2021/023545, International Search Report and Written Opinion, dated Jun. 24, 2021, 14 pages.

International Patent Application No. PCT/2021/051383, International Search Report and Written Opinion dated Dec. 28, 2021, 15 pages.

International Patent Application No. PCT/2021/053442, International Search Report and Written Opinion dated Jan. 14, 2022, 17 pages.

* cited by examiner

PRIOR ART

PRIOR ART

| Time Domain Measurements | | Frequency Domain Values | | |
|---|---|---|---|---|
| Acceleration (G) | Time (s) | Acceleration (G) | Frequency (Hz) | Velocity (in/s) |
| -0.3345 | 0 | 0.0033 | 0.5 | 0.11 |
| -0.0103 | 0.001 | 0.0028 | 1.0 | 0.33 |
| 0.00001 | 0.002 | 0.0100 | 1.5 | 0.65 |
| -0.0033 | 0.003 | 0.0003 | 2.0 | 0.14 |
| -0.2463 | 0.004 | 0.0060 | 2.5 | 0.18 |
| -0.3013 | 0.005 | 0.0078 | 3.0 | 0.78 |
| -0.2879 | 0.006 | 0.0043 | 3.5 | 0.65 |

Time Domain Acceleration Data 1810

Frequency Domain Data 1820

PRIOR ART

WIRELESS SENSOR NODES FOR EQUIPMENT MONITORING

This application claims priority to U.S. Provisional Patent Application No. 62/992,904, filed on Mar. 21, 2020 and U.S. Provisional Patent Application No. 63/081,887, filed on Sep. 22, 2020, each of which is incorporated herein in its entirety.

FIELD OF THE DISCLOSURE

This disclosure generally relates to sensor devices related to asset management, including tracking, warehousing, inventorying, and monitoring items (e.g., objects, tools, and other equipment).

BACKGROUND

When equipment failure occurs, multiple factors may contribute to the failure or malfunctioning of the equipment. It is conventionally difficult to isolate the cause of failure without continuous monitoring of the various factors. Therefore, it is desirable to be able to monitor a large amount of data on different aspects of equipment or assets in order to determine the condition of the equipment or assets and causes for failure or malfunctioning.

In some applications, an array of sensor devices may be deployed at different physical locations in the field to gather information about various conditions. In some cases, sensor devices at each location communicate with a system that provides sensor data to users and takes further actions based on the sensor data it receives. The sensor devices may continuously communicate the full range of sensor data collected to the central system at all times. However, communicating large volumes of data for extended periods of time or continuously at all times results in high power consumption, particularly when the sensor devices are using wireless communication to send data to the central system. Situations may arise where an object or location being monitored does not require the full functionality of the sensing device or only requires a limited set of functionalities.

SUMMARY

Disclosed herein is a method and sensing system for monitoring equipment using wireless sensor nodes. The wireless sensor nodes are configured to gather sensor data using sensors integrated into the wireless sensor nodes and wirelessly communicate data with other wireless nodes of the sensing system including communication of the gathered sensor data. The wireless sensor nodes are wireless sensor devices that may be attached or coupled to an object of interest for measuring sensor data relevant to the object of interest. In some embodiments, a wireless sensor node is an embodiment of an adhesive tape platform, examples of which are discussed below with respect to FIGS. 1-5C and 10A-10C. Wireless sensor nodes attached to various components of equipment gather sensor data on the components of equipment. The sensor data may be transmitted and relayed through wireless nodes of the sensing system to a control system stored on the cloud. The sensing system is configured to coordinate communication of sensor data in a way that conserves battery life of wireless sensor nodes without sacrificing the ability to detect events based on the sensor data.

According to some embodiments, a distributed intelligent software supports communication to, from, and/or between one or more sensor devices deployed in the field. The term distributed intelligent software herein includes hardware used to implement the logic and collect data associated with the distributed intelligent software. A system for collecting sensor information includes an array of sensor devices, each sensor device located at one of a plurality of locations or coupled to one of a plurality of objects. The sensor devices collect measurements on a relevant property or signal. For example, a sensor device in the array of sensor devices may collect data on temperature measurements, vibration measurements, or some combination thereof. Each sensor device wirelessly communicates with another device, such as another sensor device, and/or a central database and control system. A sensor device may operate in an initial state. The initial state may be a low communication mode when an indicator measurement is within a moderate range, according to some embodiments. In the low communication mode, the sensor device limits the communication with other devices, such as another sensor device, and/or a central database and control system and only transmits a low amount of data periodically. For example, the sensor device may only transmit a root-mean-square (RMS) value periodically, rather than sending a full spectrum of data that includes measurements over multiple frequencies and times. If an event is detected based on the collected data, the state of the sensor device is altered, according to the distributed intelligent software. For example, if an indicator measurement is outside of the moderate range (above a high threshold or below a low threshold), the distributed intelligent software may include instructions located on the sensor device that, when executed in response to the indicator measurement being outside of the moderate range, transitions from the low communication mode to the high communication mode, according to some embodiments. In the high communication mode, the distributed intelligent software may cause the sensor device to transmit a larger volume of data to other devices and/or to the central database and control system than in the low communication mode (e.g., transmitting a full range of data included, such as a full frequency spectrum), according to some embodiments. The sensor device may also transmit data more frequently in the high communication mode than in the low communication mode. The distributed intelligent software that generates the instruction which causes the sensor to transition from low to high communication mode may be located at the sensor device, or at another device, such as another sensor device, a gateway device, and/or the central database and control system.

In further embodiments, the sensor device may take additional actions in the high communication mode. For example, the sensor device may send alerts to the central database and control system, send alerts to other sensor devices in the sensor device array, increase the sampling rate of measurements of the sensor device and/or another sensor device, or some combination thereof. In response to the sensor device entering the high communication mode, the central database and control system and one or more client devices may also take additional actions.

DETAILED DESCRIPTION

Figure 1A:
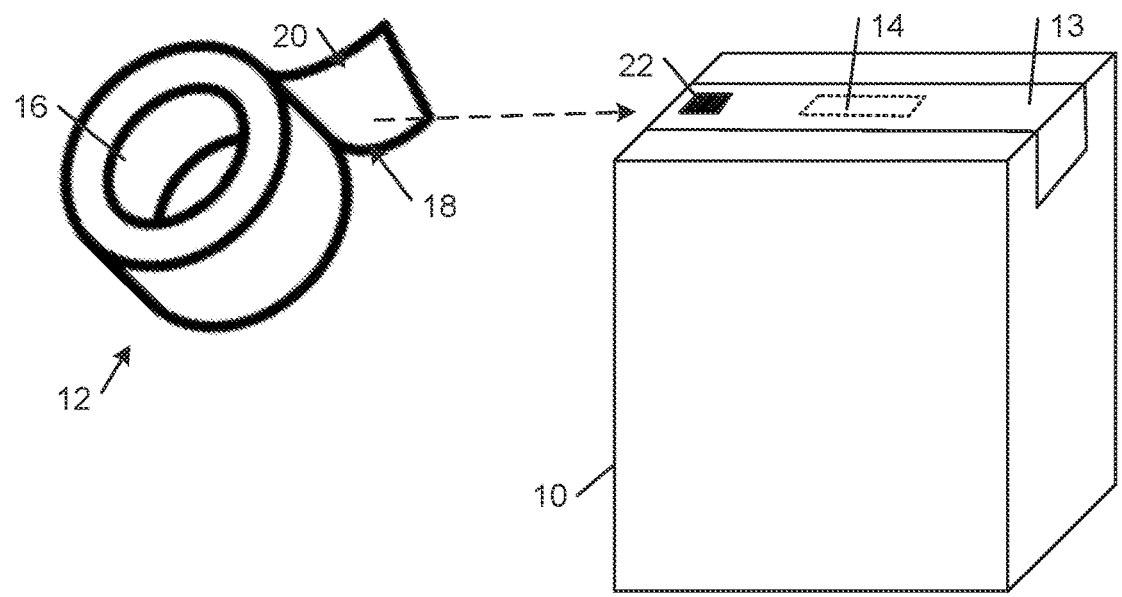
FIG. 1A is a diagrammatic view of an asset that has been sealed for shipment using a segment of an example adhesive tape platform dispensed from a roll.

Disclosed herein is a method and sensing system for monitoring equipment using wireless sensor nodes. The wireless sensor nodes are configured to gather sensor data using sensors integrated into the wireless sensor nodes and wirelessly communicate data with other wireless nodes of the sensing system including communication of the gathered sensor data. The wireless sensor nodes are wireless sensor devices that may be attached or coupled to an object of interest for measuring sensor data relevant to the object of interest. In some embodiments, a wireless sensor node is an embodiment of an adhesive tape platform, examples of which are discussed below with respect to FIGS. 1-5C and 10A-10C. Wireless sensor nodes attached to various components of equipment gather sensor data on the components of equipment. The sensor data may be transmitted and relayed through wireless nodes of the sensing system to a control system stored on the cloud. The sensing system is configured to coordinate communication of sensor data in a way that conserves battery life of wireless sensor nodes without sacrificing the ability to detect events based on the sensor data.

Also disclosed herein is distributed intelligent software for managing a real-time sensing system including one or more of the following members: one or more sensor devices, a central database and control system, and one or more client devices. In some embodiments of the present disclosure, a sensor device (also referred to herein as an "adhesive tape platform") has a form factor of a flexible adhesive tape. The adhesive tape platform includes a flexible substrate with an adhesive on an outer surface of the flexible substrate, a flexible cover layer, a device layer between the flexible substrate and the flexible cover layer, and (optionally) a flexible battery. The adhesive tape platform has a dual functionality as both a sensor device for measuring properties and/or signals relevant to an object of interest and an adhesive tape that can be adhered to the objects of interest or used to seal or close items (e.g., a box).

The distributed intelligent software defines one or more rules, algorithms, protocols, logic, and other methods that analyze sensing data and instructs the one or more sensor devices, the central database and control system, and the one or more client devices based on the sensing data. The distributed intelligent software controls the one or more sensing devices, the central database and control system, and/or the one or more client devices to determine that specific events have occurred based on the sensing data collected by the one or more sensor devices and communications between members of the sensing system. Using the distributed intelligent software, the sensing system is able to automatically alter the operation of the sensing system depending on the various conditions and contexts that may occur in real-time.

The distributed intelligent software may be in the form of executable code that may be run on one or more of a sensor device, a client device (e.g., a computer and/or a smartphone), a server, a central database and control system, or any combination thereof. In some embodiments, the distributed intelligent software may be part of or integrated with an operating system for one or more of a sensor device, a sensing system, a client device, a server, a central database and control system, or any combination thereof.

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements and are not drawn to scale.

As used herein, the term "or" refers an inclusive "or" rather than an exclusive "or." In addition, the articles "a" and "an" as used in the specification and claims mean "one or more" unless specified otherwise or clear from the context to refer the singular form.

Each of the one or more sensor devices (also referred to herein as "wireless sensing nodes") in the sensing system may be a sensor device having an adhesive tape form factor (also referred to herein as an "adhesive tape platform"). The term "tape node" refers to an adhesive tape platform or a segment thereof that is equipped with sensor, processor, memory, energy source/harvesting mechanism, and wireless communications functionality, where the adhesive product has a variety of different form factors, including a multilayer roll or a sheet that includes a plurality of divisible adhesive segments. Once deployed, each tape node can function, for example, as an adhesive tape, label, sticker, decal, or the like, and as a wireless communications device.

The terms "adhesive tape node," "wireless node," or "tape node" may be used interchangeably in certain contexts, and refer to an adhesive tape platform or a segment thereof that is equipped with sensor, processor, memory, energy source/harvesting mechanism, and wireless communications functionality, where the adhesive product has a variety of different form factors, including a multilayer roll or a sheet that includes a plurality of divisible adhesive segments. Once deployed, each tape node or wireless node can function, for example, as an adhesive tape, label, sticker, decal, or the like, and as a wireless communications device. A "peripheral" tape node or wireless node, also referred to as an outer node, leaf node, or terminal node, refers to a node that does not have any child nodes.

In certain contexts, the terms "package," "envelope," "box," "parcel," "container," "pallet," "carton," "wrapping," and the like are used interchangeably herein to refer to an packaged item or items.

In certain contexts, the terms "wireless tracking system," "hierarchical communications network," "distributed agent operating system," and the like are used interchangeably herein to refer to a system or network of wireless nodes.

Adhesive Tape Platform

FIG. 1A shows an example asset 10 that is sealed for shipment using an example adhesive tape platform 12 that includes embedded components of a wireless transducing circuit 14 (collectively referred to herein as a "tape node"). In this example, a length 13 of the adhesive tape platform 12 is dispensed from a roll 16 and affixed to the asset 10. The adhesive tape platform 12 includes an adhesive side 18 and a non-adhesive side 20. The adhesive tape platform 12 can be dispensed from the roll 16 in the same way as any conventional packing tape, shipping tape, or duct tape. For example, the adhesive tape platform 12 may be dispensed from the roll 16 by hand, laid across the seam where the two top flaps of the asset 10 meet, and cut to a suitable length either by hand or using a cutting instrument (e.g., scissors or an automated or manual tape dispenser). Examples of such tapes include tapes having non-adhesive sides 20 that carry one or more coatings or layers (e.g., colored, light reflective, light absorbing, and/or light emitting coatings or layers).

Figure 1B:
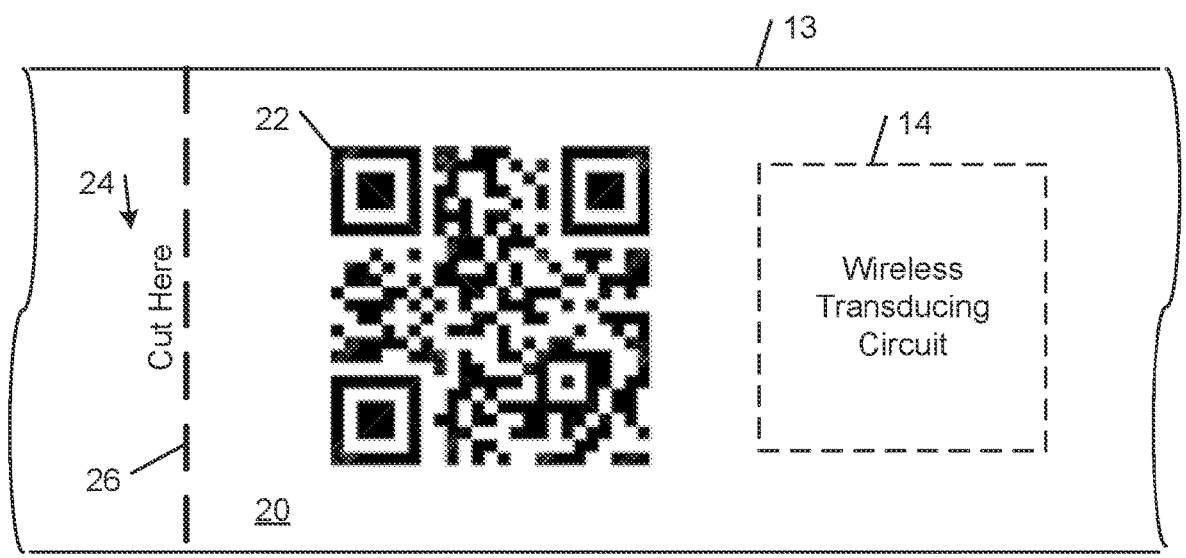
FIG. 1B is a diagrammatic top view of a portion of the segment of the example adhesive tape platform shown in FIG. 1A.

Referring to FIG. 1B, in some examples, the non-adhesive side 20 of the length 13 of the adhesive tape platform 12 includes writing or other markings that convey instructions, warnings, or other information to a person or machine (e.g., a bar code reader), or may simply be decorative and/or entertaining. For example, different types of adhesive tape platforms may be marked with distinctive colorations to distinguish one type of adhesive tape platform from another. In the illustrated example, the length 13 of the adhesive tape platform 12 includes a two-dimensional bar code (e.g., a QR Code) 22, written instructions 24 (i.e., "Cut Here"), and an associated cut line 26 that indicates where the user should cut the adhesive tape platform 12. The written instructions 24 and the cut line 26 typically are printed or otherwise marked on the top non-adhesive surface 20 of the adhesive tape platform 12 during manufacture. The two-dimensional bar code 22, on the other hand, may be marked on the non-adhesive surface 20 of the adhesive tape platform 12 during the manufacture of the adhesive product 12 or, alternatively, may be marked on the non-adhesive surface 20 of the adhesive tape platform 12 as needed using, for example, a printer or other marking device.

In order to avoid damage to the functionality of the segments of the adhesive tape platform 12, the cut lines 26 typically demarcate the boundaries between adjacent segments at locations that are free of any active components of the wireless transducing circuit 14. The spacing between the wireless transducing circuit components 14 and the cut lines 26 may vary depending on the intended communication, transducing and/or adhesive taping application. In the example illustrated in FIG. 1A, the length of the adhesive tape platform 12 that is dispensed to seal the asset 10 corresponds to a single segment of the adhesive tape platform 12. In other examples, the length of the adhesive tape platform 12 needed to seal a asset or otherwise serve the adhesive function for which the adhesive tape platform 12 is being applied may include multiple segments 13 of the adhesive tape platform 12, one or more of which segments 13 may be activated upon cutting the length of the adhesive tape platform 12 from the roll 16 and/or applying the length of the adhesive tape platform to the asset 10.

In some examples, the transducing components 14 that are embedded in one or more segments 13 of the adhesive tape platform 12 are activated when the adhesive tape platform 12 is cut along the cut line 26. In these examples, the adhesive tape platform 12 includes one or more embedded energy sources (e.g., thin film batteries, which may be printed, or conventional cell batteries, such as conventional watch style batteries, rechargeable batteries, or other energy storage device, such as a super capacitor or charge pump) that supply power to the transducing components 14 in one or more segments of the adhesive tape platform 12 in response to being separated from the adhesive tape platform 12 (e.g., along the cut line 26).

In some examples, each segment 13 of the adhesive tape platform 12 includes its own respective energy source including energy harvesting elements that can harvest energy from the environment. In some of these examples, each energy source is configured to only supply power to the components in its respective adhesive tape platform segment regardless of the number of contiguous segments 13 that are in a given length of the adhesive tape platform 12. In other examples, when a given length of the adhesive tape platform 12 includes multiple segments 13, the energy sources in the respective segments 13 are configured to supply power to the transducing components 14 in all of the segments 13 in the given length of the adhesive tape platform 12. In some of these examples, the energy sources are connected in parallel and concurrently activated to power the transducing components 14 in all of the segments 13 at the same time. In other examples, the energy sources are connected in parallel and alternately activated to power the transducing components 14 in respective ones of the adhesive tape platform segments 13 at different time periods, which may or may not overlap.

Figure 2:
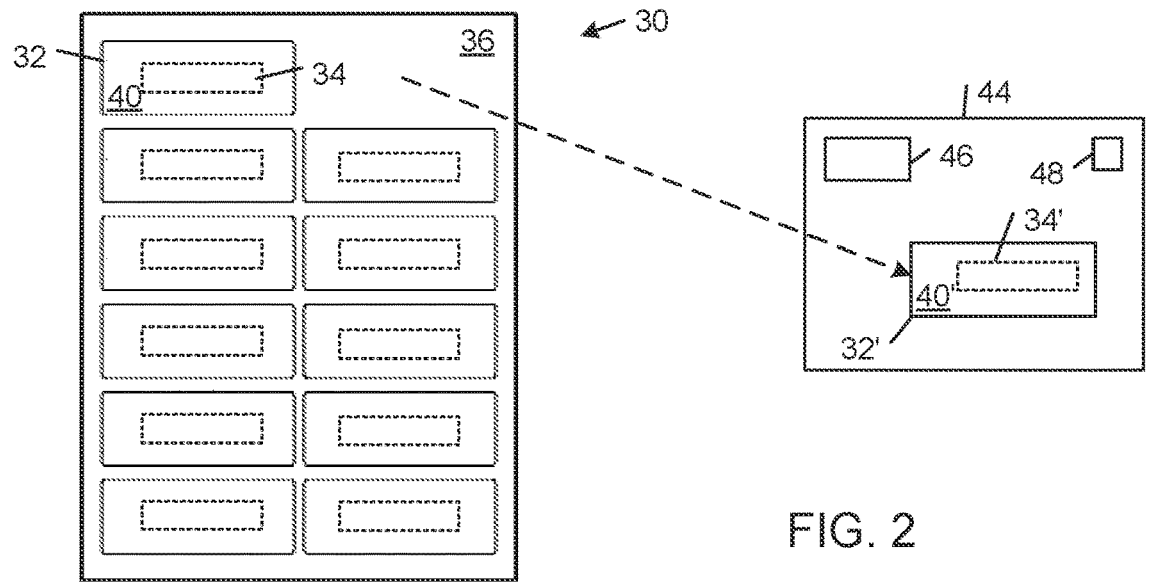
FIG. 2 is a diagrammatic view of an example of an envelope carrying a segment of an example adhesive tape platform dispensed from a backing sheet.

FIG. 2 shows an example adhesive tape platform 30 that includes a set of adhesive tape platform segments 32 each of which includes a respective set of embedded wireless transducing circuit components 34, and a backing sheet 36 with a release coating that prevents the adhesive segments 32 from adhering strongly to the backing sheet 36. Each adhesive tape platform segment 32 includes an adhesive side facing the backing sheet 36, and an opposing non-adhesive side 40. In this example, a particular segment 32' of the adhesive tape platform 30 has been removed from the backing sheet 36 and affixed to an envelope 44. Each segment 32 of the adhesive tape platform 30 can be removed from the backing sheet 36 in the same way that adhesive labels can be removed from a conventional sheet of adhesive labels (e.g., by manually peeling a segment 32 from the backing sheet 36). In general, the non-adhesive side 40' of the segment 32' may include any type of writing, markings, decorative designs, or other ornamentation. In the illustrated example, the non-adhesive side 40' of the segment 32' includes writing or other markings that correspond to a destination address for the envelope 44. The envelope 44 also includes a return address 46 and, optionally, a postage stamp or mark 48.

In some examples, segments of the adhesive tape platform 12 are deployed by a human operator. The human operator may be equipped with a mobile phone or other device that allows the operator to authenticate and initialize the adhesive tape platform 12. In addition, the operator can take a picture of an asset including the adhesive tape platform and any barcodes associated with the asset and, thereby, create a persistent record that links the adhesive tape platform 12 to the asset. In addition, the human operator typically will send the picture to a network service and/or transmit the picture to the adhesive tape platform 12 for storage in a memory component of the adhesive tape platform 12.

In some examples, the wireless transducing circuit components 34 that are embedded in a segment 32 of the adhesive tape platform 12 are activated when the segment 32 is removed from the backing sheet 32. In some of these examples, each segment 32 includes an embedded capacitive sensing system that can sense a change in capacitance when the segment 32 is removed from the backing sheet 36. As explained in detail below, a segment 32 of the adhesive tape platform 30 includes one or more embedded energy sources (e.g., thin film batteries, common disk-shaped cell batteries, or rechargeable batteries or other energy storage devices, such as a super capacitor or charge pump) that can be configured to supply power to the wireless transducing circuit components 34 in the segment 32 in response to the detection of a change in capacitance between the segment 32 and the backing sheet 36 as a result of removing the segment 32 from the backing sheet 36.

Figure 3:
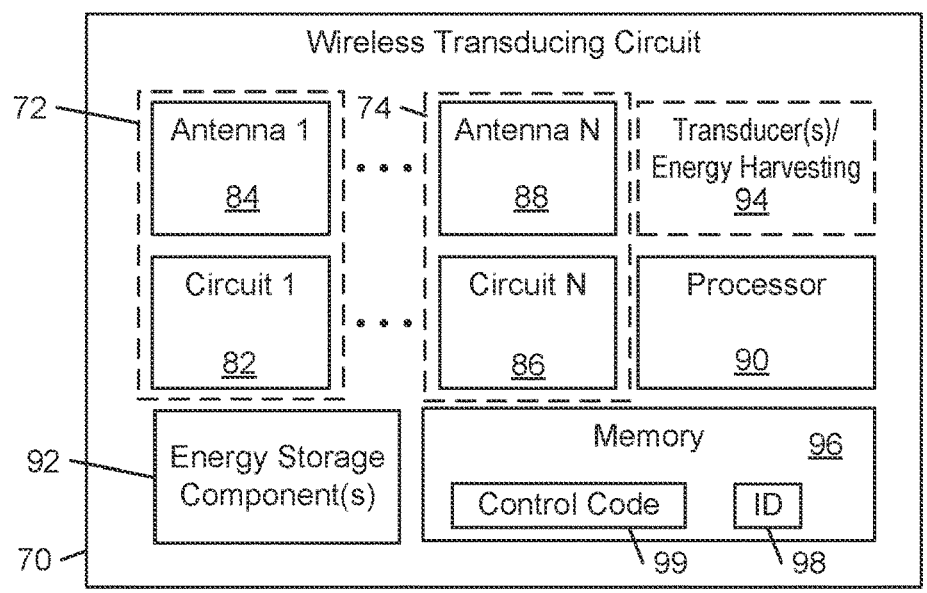
FIG. 3 is a schematic view of an example segment of an adhesive tape platform.

FIG. 3 shows a block diagram of the components of an example wireless transducing circuit 70 that includes a number of communication systems 72, 74. Example communication systems 72, 74 include a GPS system that includes a GPS receiver circuit 82 (e.g., a receiver integrated circuit) and a GPS antenna 84, and one or more wireless communication systems each of which includes a respective transceiver circuit 86 (e.g., a transceiver integrated circuit) and a respective antenna 88. Example wireless communication systems include a cellular communication system (e.g., GSM/GPRS), a Wi-Fi communication system, an RF communication system (e.g., LoRa), a Bluetooth communication system (e.g., a Bluetooth Low Energy system), a Z-wave communication system, and a ZigBee communication system. The wireless transducing circuit 70 also includes a processor 90 (e.g., a microcontroller or microprocessor), one or more energy storage devices 92 (e.g., non-rechargeable or rechargeable printed flexible battery, conventional single or multiple cell battery, and/or a super capacitor or charge pump), one or more transducers 94 (e.g., sensors and/or actuators, and, optionally, one or more energy harvesting transducer components). In some examples, the conventional single or multiple cell battery may be a watch style disk or button cell battery that is associated electrical connection apparatus (e.g., a metal clip) that electrically connects the electrodes of the battery to contact pads on the flexible circuit 116.

Examples of sensing transducers 94 include a capacitive sensor, an altimeter, a gyroscope, an accelerometer, a temperature sensor, a strain sensor, a pressure sensor, a piezoelectric sensor, a weight sensor, an optical or light sensor (e.g., a photodiode or a camera), an acoustic or sound sensor (e.g., a microphone), a smoke detector, a radioactivity sensor, a chemical sensor (e.g., an explosives detector), a biosensor (e.g., a blood glucose biosensor, odor detectors, antibody based pathogen, food, and water contaminant and toxin detectors, DNA detectors, microbial detectors, pregnancy detectors, and ozone detectors), a magnetic sensor, an electromagnetic field sensor, and a humidity sensor. Examples of actuating (e.g., energy emitting) transducers 94 include light emitting components (e.g., light emitting diodes and displays), electro-acoustic transducers (e.g., audio speakers), electric motors, and thermal radiators (e.g., an electrical resistor or a thermoelectric cooler).

In some examples, the wireless transducing circuit 70 includes a memory 96 for storing data, including, e.g., profile data, state data, event data, sensor data, localization data, security data, and one or more unique identifiers (ID) 98 associated with the wireless transducing circuit 70, such as a product ID, a type ID, and a media access control (MAC) ID, and control code 99. In some examples, the memory 96 may be incorporated into one or more of the processor 90 or transducers 94, or may be a separate component that is integrated in the wireless transducing circuit 70 as shown in FIG. 3. The control code typically is implemented as programmatic functions or program modules that control the operation of the wireless transducing circuit 70, including a tape node communication manager that manages the manner and timing of tape node communications, a tape node power manager that manages power consumption, and a tape node connection manager that controls whether connections with other tape nodes are secure connections or unsecure connections, and a tape node storage manager that securely manages the local data storage on the node. The tape node connection manager ensures the level of security required by the end application and supports various encryption mechanisms. The tape node power manager and tape communication manager work together to optimize the battery consumption for data communication. In some examples, execution of the control code by the different types of tape nodes described herein may result in the performance of similar or different functions.

Figure 4:
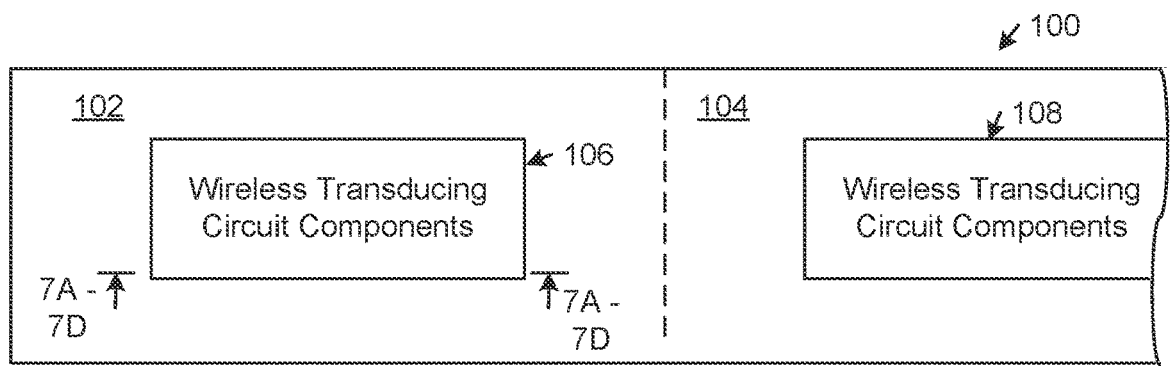
FIG. 4 is a diagrammatic top view of a length of an example adhesive tape platform.

FIG. 4 is a top view of a portion of an example flexible adhesive tape platform 100 that shows a first segment 102 and a portion of a second segment 104. Each segment 102, 104 of the flexible adhesive tape platform 100 includes a respective set 106, 108 of the components of the wireless transducing circuit 70. The segments 102, 104 and their respective sets of components 106, 108 typically are identical and configured in the same way. In some other embodiments, however, the segments 102, 104 and/or their respective sets of components 106, 108 are different and/or configured in different ways. For example, in some examples, different sets of the segments of the flexible adhesive tape platform 100 have different sets or configurations of tracking and/or transducing components that are designed and/or optimized for different applications, or different sets of segments of the flexible adhesive tape platform may have different ornamentations (e.g., markings on the exterior surface of the platform) and/or different (e.g., alternating) lengths.

An example method of fabricating the adhesive tape platform 100 (see FIG. 4) according to a roll-to-roll fabrication process is described in connection with FIGS. 6, 7A, and 7B of U.S. Pat. No. 10,262,255, issued Apr. 15, 2019, the entirety of which is incorporated herein by reference.

The instant specification describes an example system of adhesive tape platforms (also referred to herein as "tape nodes") that can be used to implement a low-cost wireless network infrastructure for performing monitoring, tracking, and other asset management functions relating to, for example, parcels, persons, tools, equipment and other physical assets and objects. The example system includes a set of three different types of tape nodes that have different respective functionalities and different respective cover markings that visually distinguish the different tape node types from one another. In one non-limiting example, the covers of the different tape node types are marked with different colors (e.g., white, green, and black). In the illustrated examples, the different tape node types are distinguishable from one another by their respective wireless communications capabilities and their respective sensing capabilities.

Figure 5A:
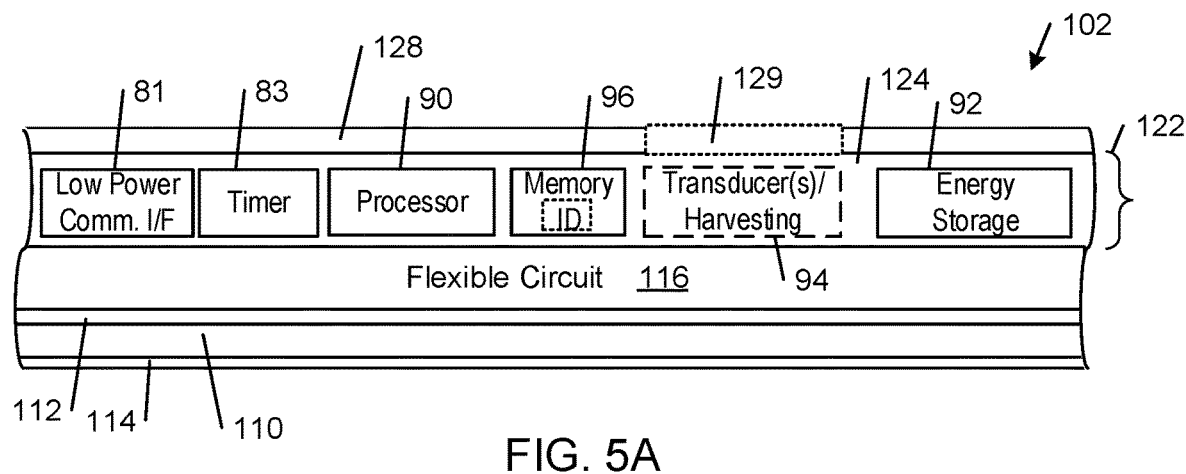
FIGS. 5A-5C show diagrammatic cross-sectional side views of portions of different respective adhesive tape platforms.

FIG. 5A shows a cross-sectional side view of a portion of an example segment 102 of the flexible adhesive tape platform 100 that includes a respective set of the components of the wireless transducing circuit 106 corresponding to the first tape node type (i.e., white). The flexible adhesive tape platform segment 102 includes an adhesive layer 112, an optional flexible substrate 110, and an optional adhesive layer 114 on the bottom surface of the flexible substrate 110. If the bottom adhesive layer 114 is present, a release liner (not shown) may be (weakly) adhered to the bottom surface of the adhesive layer 114. In some examples, the adhesive layer 114 includes an adhesive (e.g., an acrylic foam adhesive) that has a high bond strength that is sufficient to prevent removal of the adhesive segment 102 from a surface on which the adhesive layer 114 is adhered without destroying the physical or mechanical integrity of the adhesive segment 102 and/or one or more of its constituent components. In some examples, the optional flexible substrate 110 is implemented as a prefabricated adhesive tape that includes the adhesive layers 112, 114 and the optional release liner. In other examples, the adhesive layers 112, 114 are applied to the top and bottom surfaces of the flexible substrate 110 during the fabrication of the adhesive tape platform 100. The adhesive layer 112 bonds the flexible substrate 110 to a bottom surface of a flexible circuit 116, that includes one or more wiring layers (not shown) that connect the processor 90, a low power wireless communication interface 81 (e.g., a Zigbee, Bluetooth® Low Energy (BLE) interface, or other low power communication interface), a timer circuit 83, transducing and/or energy harvesting component(s) 94 (if present), the memory 96, and other components in a device layer 122 to each other and to the energy storage component 92 and, thereby, enable the transducing, tracking and other functionalities of the flexible adhesive tape platform segment 102. The low power wireless communication interface 81 typically includes one or more of the antennas 84, 88 and one or more of the wireless circuits 82, 86.

Figure 5B:
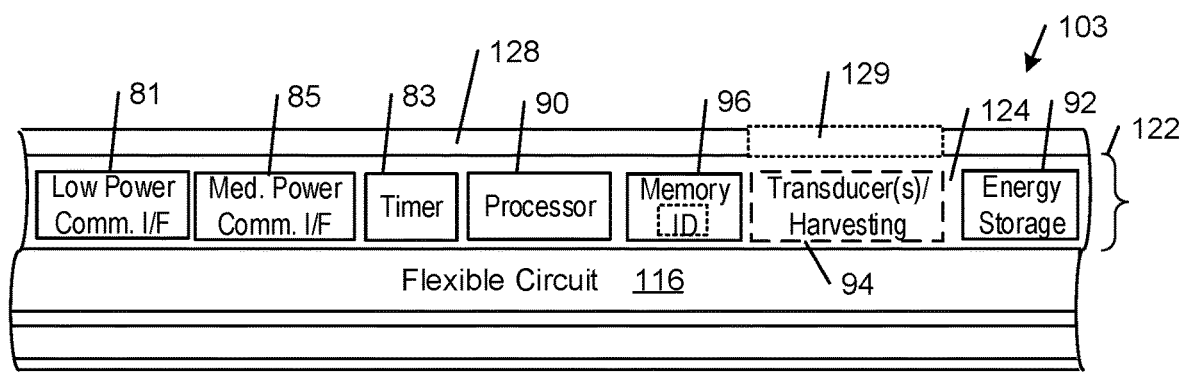

FIG. 5B shows a cross-sectional side view of a portion of an example segment 103 of the flexible adhesive tape platform 100 that includes a respective set of the components of the wireless transducing circuit 106 corresponding to the second tape node type (i.e., green). In this example, the flexible adhesive tape platform segment 103 differs from the segment 102 shown in FIG. 5A by the inclusion of a medium power communication interface 85 (e.g., a LoRa interface) in addition to the low power communications interface that is present in the first tape node type (i.e., white). The medium power communication interface has longer communication range than the low power communication interface. In some examples, one or more other components of the flexible adhesive tape platform segment 103 differ, for example, in functionality or capacity (e.g., larger energy source).

Figure 5C:
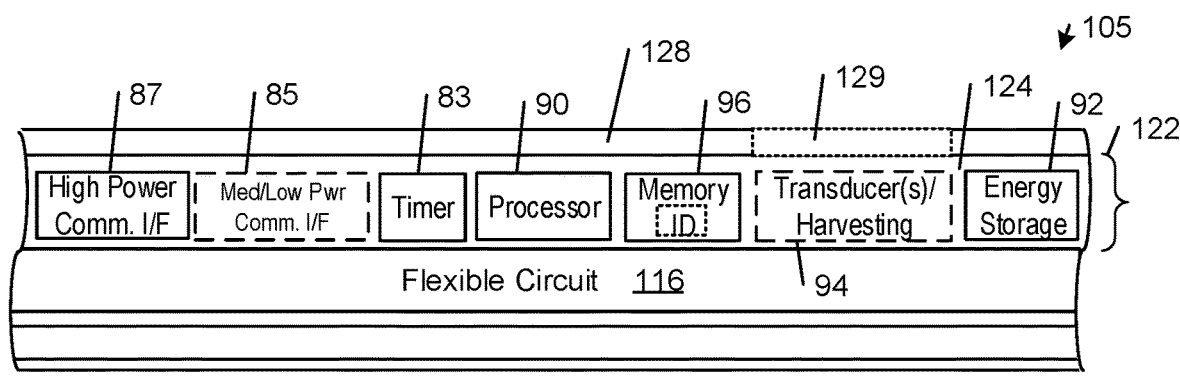

FIG. 5C shows a cross-sectional side view of a portion of an example segment 105 of the flexible adhesive tape platform 100 that includes a respective set of the components of the wireless transducing circuit 106 corresponding to the third tape node type (i.e., black). In this example, the flexible adhesive tape platform segment 105 includes a high power communications interface 87 (e.g., a cellular interface; e.g., GSM/GPRS) and an optional medium and/or low power communications interface 85. The high power communication range provides global coverage to available infrastructure (e.g. the cellular network). In some examples, one or more other components of the flexible adhesive tape platform segment 105 differ, for example, in functionality or capacity (e.g., larger energy source).

FIGS. 5A-5C show examples in which the cover layer 128 of the flexible adhesive tape platform 100 includes one or more interfacial regions 129 positioned over one or more of the transducers 94. In examples, one or more of the interfacial regions 129 have features, properties, compositions, dimensions, and/or characteristics that are designed to improve the operating performance of the platform 100 for specific applications. In some examples, the flexible adhesive tape platform 100 includes multiple interfacial regions 129 over respective transducers 94, which may be the same or different depending on the target applications. Example interfacial regions include an opening, an optically transparent window, and/or a membrane located in the interfacial region 129 of the cover 128 that is positioned over the one or more transducers and/or energy harvesting components 94. Additional details regarding the structure and operation of example interfacial regions 129 are described in U.S. Provisional Patent Application No. 62/680,716, filed Jun. 5, 2018, PCT Patent Application No. PCT/US2018/064919, filed Dec. 11, 2018, U.S. Pat. No. 10,885,420, issued Jan. 4, 2021, U.S. Pat. No. 10,902,310 issued Jan. 25, 2021, and U.S. Provisional Patent Application No. 62/670,712, filed May 11, 2018.

In some examples, a flexible polymer layer 124 encapsulates the device layer 122 and thereby reduces the risk of damage that may result from the intrusion of contaminants and/or liquids (e.g., water) into the device layer 122. The flexible polymer layer 124 also planarizes the device layer 122. This facilitates optional stacking of additional layers on the device layer 122 and also distributes forces generated in, on, or across the adhesive tape platform segment 102 so as to reduce potentially damaging asymmetric stresses that might be caused by the application of bending, torqueing, pressing, or other forces that may be applied to the flexible adhesive tape platform segment 102 during use. In the illustrated example, a flexible cover 128 is bonded to the planarizing polymer 124 by an adhesive layer (not shown).

The flexible cover 128 and the flexible substrate 110 may have the same or different compositions depending on the intended application. In some examples, one or both of the flexible cover 128 and the flexible substrate 110 include flexible film layers and/or paper substrates, where the film layers may have reflective surfaces or reflective surface coatings. Example compositions for the flexible film layers include polymer films, such as polyester, polyimide, polyethylene terephthalate (PET), and other plastics. The optional adhesive layer on the bottom surface of the flexible cover 128 and the adhesive layers 112, 114 on the top and bottom surfaces of the flexible substrate 110 typically include a pressure-sensitive adhesive (e.g., a silicon-based adhesive). In some examples, the adhesive layers are applied to the flexible cover 128 and the flexible substrate 110 during manufacture of the adhesive tape platform 100 (e.g., during a roll-to-roll or sheet-to-sheet fabrication process). In other examples, the flexible cover 128 may be implemented by a prefabricated single-sided pressure-sensitive adhesive tape and the flexible substrate 110 may be implemented by a prefabricated double-sided pressure-sensitive adhesive tape; both kinds of tape may be readily incorporated into a roll-to-roll or sheet-to-sheet fabrication process. In some examples, the flexible polymer layer 124 is composed of a flexible epoxy (e.g., silicone).

In some examples, the energy storage device 92 is a flexible battery that includes a printed electrochemical cell, which includes a planar arrangement of an anode and a cathode and battery contact pads. In some examples, the flexible battery may include lithium-ion cells or nickel-cadmium electro-chemical cells. The flexible battery typically is formed by a process that includes printing or laminating the electro-chemical cells on a flexible substrate (e.g., a polymer film layer). In some examples, other components may be integrated on the same substrate as the flexible battery. For example, the low power wireless communication interface 81 and/or the processor(s) 90 may be integrated on the flexible battery substrate. In some examples, one or more of such components also (e.g., the flexible antennas and the flexible interconnect circuits) may be printed on the flexible battery substrate.

In some examples, the flexible circuit 116 is formed on a flexible substrate by printing, etching, or laminating circuit patterns on the flexible substrate. In some examples, the flexible circuit 116 is implemented by one or more of a single-sided flex circuit, a double access or back bared flex circuit, a sculpted flex circuit, a double-sided flex circuit, a multi-layer flex circuit, a rigid flex circuit, and a polymer thick film flex circuit. A single-sided flexible circuit has a single conductor layer made of, for example, a metal or conductive (e.g., metal filled) polymer on a flexible dielectric film. A double access or back bared flexible circuit has a single conductor layer but is processed so as to allow access to selected features of the conductor pattern from both sides. A sculpted flex circuit is formed using a multi-step etching process that produces a flex circuit that has finished copper conductors that vary in thickness along their respective lengths. A multilayer flex circuit has three of more layers of conductors, where the layers typically are interconnected using plated through holes. Rigid flex circuits are a hybrid construction of flex circuit consisting of rigid and flexible substrates that are laminated together into a single structure, where the layers typically are electrically interconnected via plated through holes. In polymer thick film (PTF) flex circuits, the circuit conductors are printed onto a polymer base film, where there may be a single conductor layer or multiple conductor layers that are insulated from one another by respective printed insulating layers.

In the example flexible adhesive tape platform segments 102 shown in FIGS. 5A-5C, the flexible circuit 116 is a single access flex circuit that interconnects the components of the adhesive tape platform on a single side of the flexible circuit 116. In other examples, the flexible circuit 116 is a double access flex circuit that includes a front-side conductive pattern that interconnects the low power communications interface 81, the timer circuit 83, the processor 90, the one or more transducers 94 (if present), and the memory 96, and allows through-hole access (not shown) to a back-side conductive pattern that is connected to the flexible battery (not shown). In these examples, the front-side conductive pattern of the flexible circuit 116 connects the communications circuits 82, 86 (e.g., receivers, transmitters, and transceivers) to their respective antennas 84, 88 and to the processor 90, and also connects the processor 90 to the one or more sensors 94 and the memory 96. The backside conductive pattern connects the active electronics (e.g., the processor 90, the communications circuits 82, 86, and the transducers) on the front-side of the flexible circuit 116 to the electrodes of the flexible battery 116 via one or more through holes in the substrate of the flexible circuit 116.

Depending on the target application, the wireless transducing circuits 70 are distributed across the flexible adhesive tape platform 100 according to a specified sampling density, which is the number of wireless transducing circuits 70 for a given unit size (e.g., length or area) of the flexible adhesive tape platform 100. In some examples, a set of multiple flexible adhesive tape platforms 100 are provided that include different respective sampling densities in order to seal different asset sizes with a desired number of wireless transducing circuits 70. In particular, the number of wireless transducing circuits per asset size is given by the product of the sampling density specified for the adhesive tape platform and the respective size of the adhesive tape platform 100 needed to seal the asset. This allows an automated packaging system to select the appropriate type of flexible adhesive tape platform 100 to use for sealing a given asset with the desired redundancy (if any) in the number of wireless transducer circuits 70. In some example applications (e.g., shipping low value goods), only one wireless transducing circuit 70 is used per asset, whereas in other applications (e.g., shipping high value goods) multiple wireless transducing circuits 70 are used per asset. Thus, a flexible adhesive tape platform 100 with a lower sampling density of wireless transducing circuits 70 can be used for the former application, and a flexible adhesive tape platform 100 with a higher sampling density of wireless transducing circuits 70 can be used for the latter application. In some examples, the flexible adhesive tape platforms 100 are color-coded or otherwise marked to indicate the respective sampling densities with which the wireless transducing circuits 70 are distributed across the different types of adhesive tape platforms 100.

Figure 11:
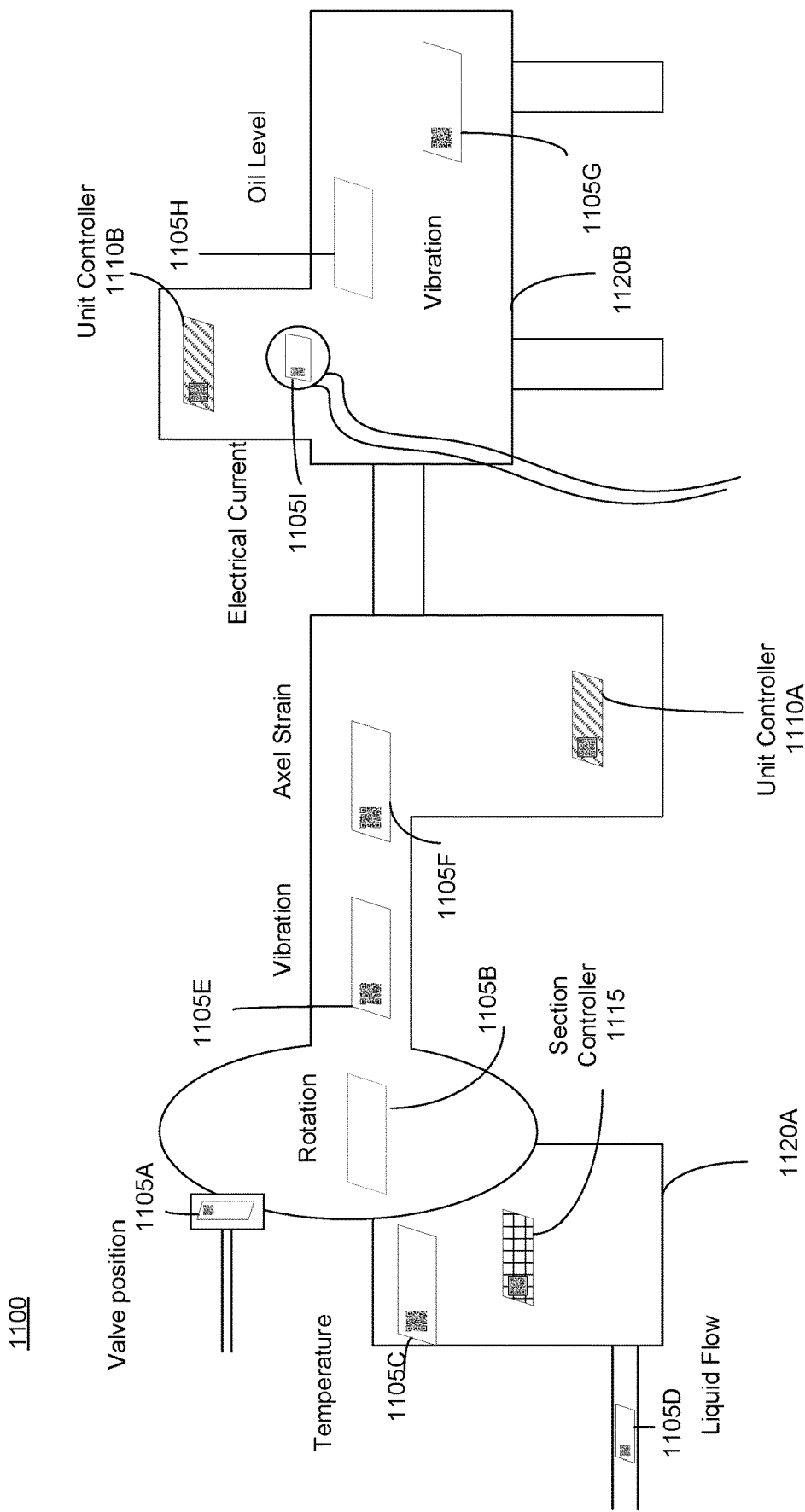
FIG. 11 shows an example environment for a fleet of wireless sensor nodes and wireless nodes of the sensing system for generating sensing data on a section of equipment and communicating the sensing data with the sensing system, according to some embodiments.
Figure 12:
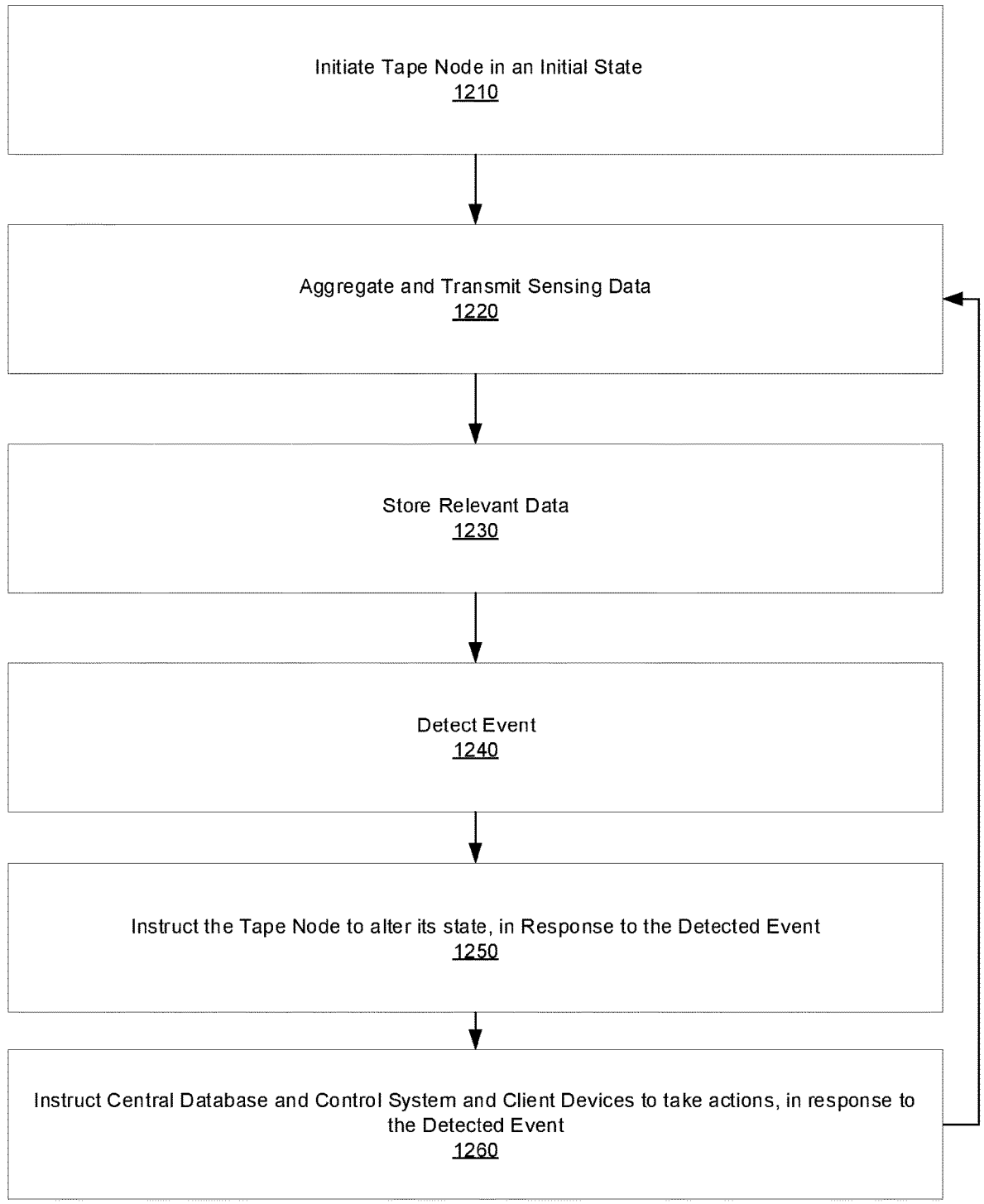
FIG. 12 is a flow chart depicting steps implemented, via execution by one or more processors of the adhesive tape platform, central database and control system, client device, or any combination thereof, by the distributed intelligent software, according to some embodiments, according to some embodiments.
Figure 13:
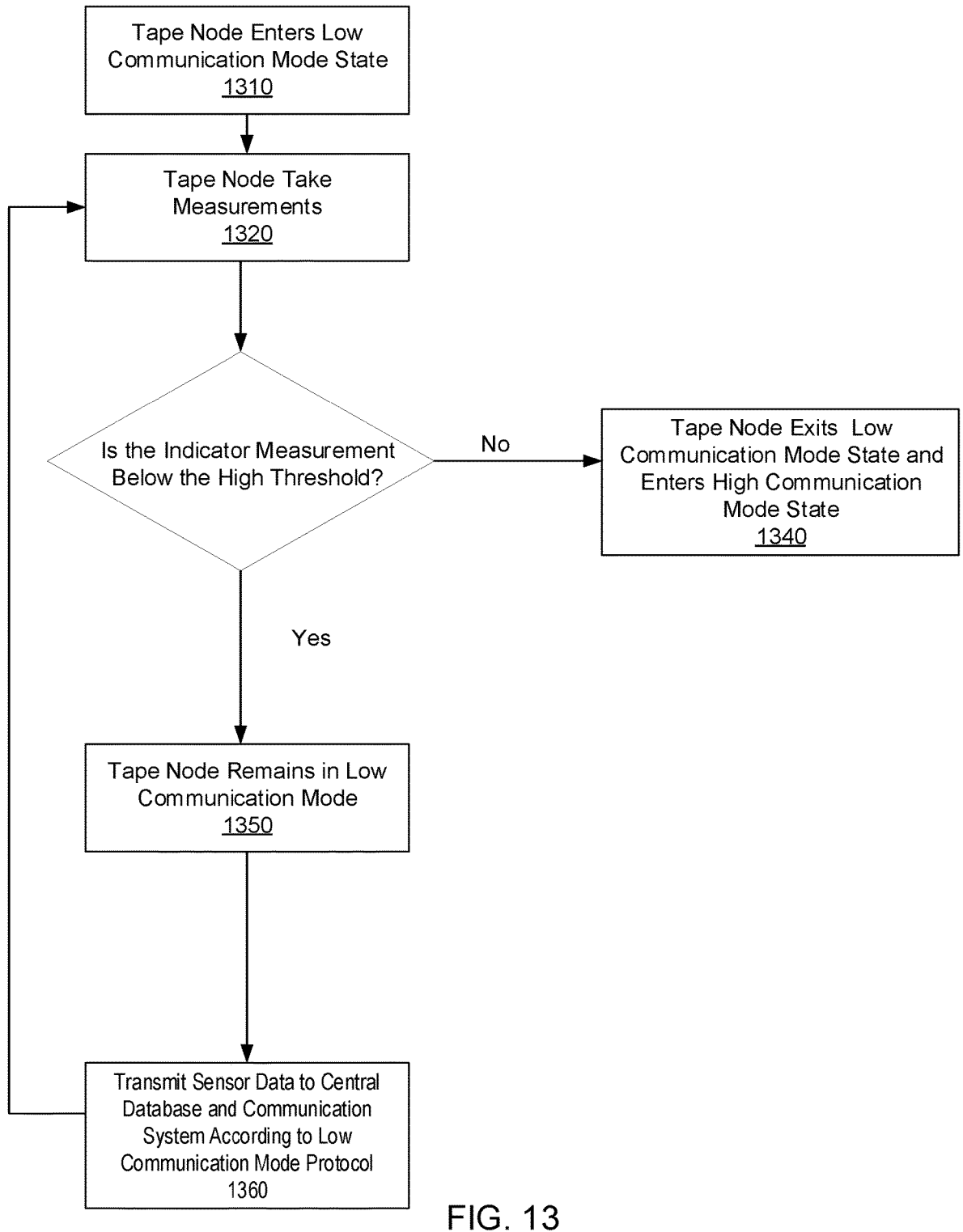
FIG. 13 is a flowchart showing example steps executed according to the distributed intelligent software, according to some embodiments.

In some embodiments, the adhesive tape platforms discussed in conjunction with FIGS. 1A-5C are dispensed by a handheld tape dispenser, as discussed further in conjunction with FIGS. 11-13. The handheld tape dispenser is configured to receive a roll of tape, the roll of tape comprising a plurality of adhesive tape platforms distributed throughout the roll, e.g., in uniform length segments, and to dispense the roll of tape for use by a sensing system, e.g., in an environment as illustrated in FIGS. 6A and 6B.

Deployment of Tape Nodes

Figure 6A:
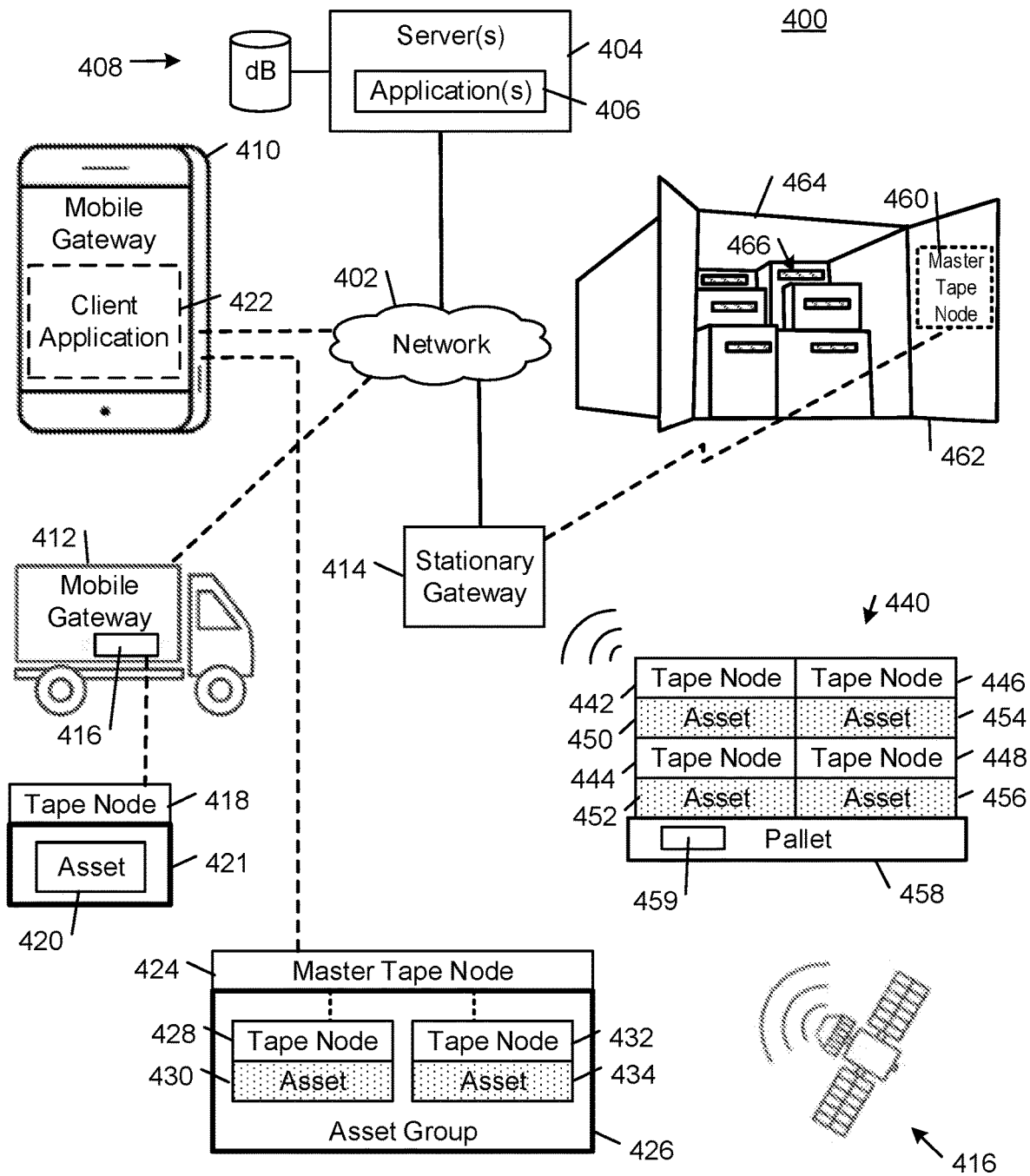
FIG. 6A is a diagrammatic view of an example of a network environment supporting communications with segments of an adhesive tape platform.
Figure 6B:
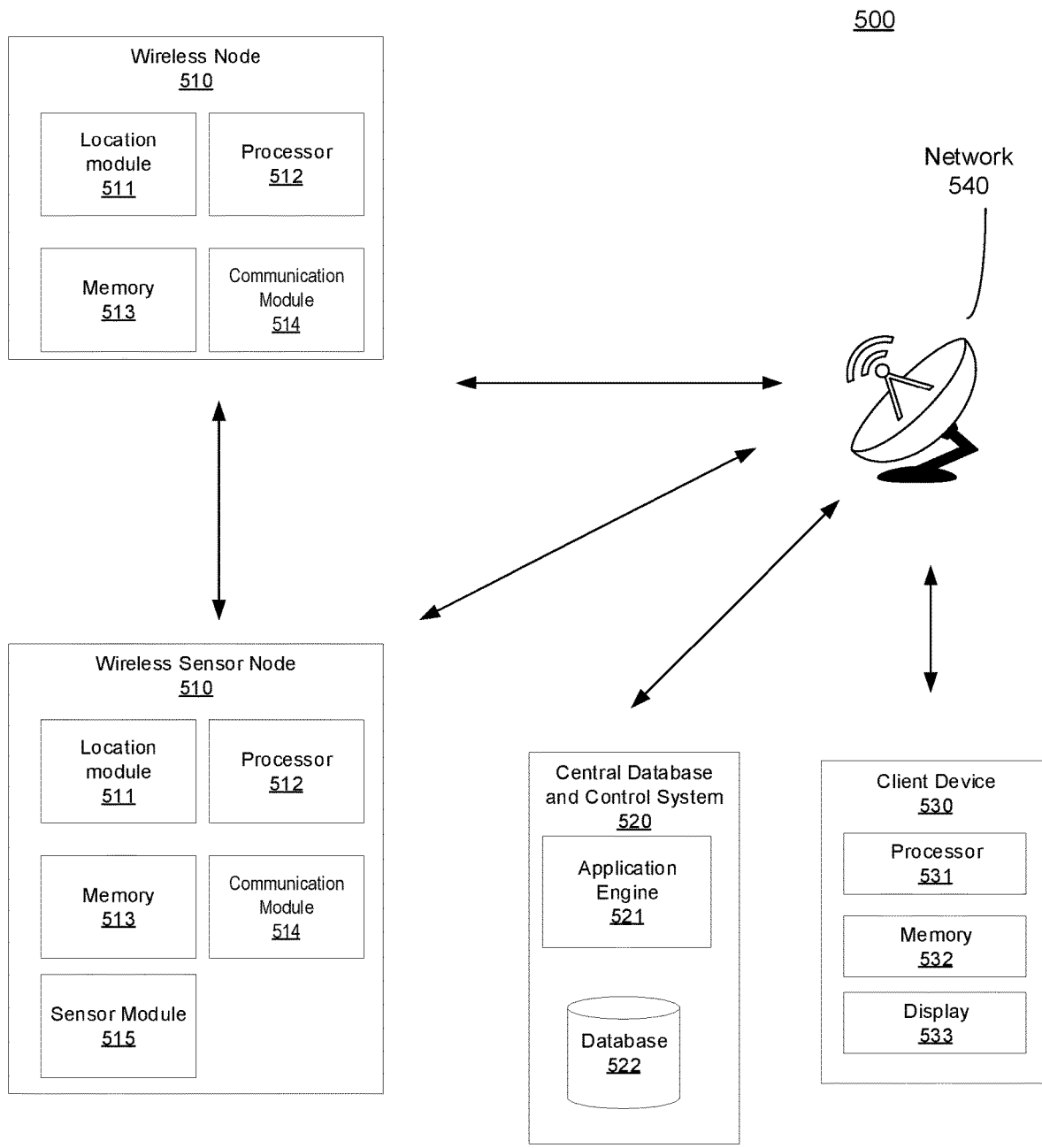
FIG. 6B is a diagram showing an example system environment for the sensing system including the adhesive tape platform, according to some embodiments.

FIG. 6A shows an example network communications environment 400 that includes a network 402 that supports communications between one or more servers 404 executing one or more applications of a network service 408, mobile gateways 410, 412, a stationary gateway 414, and various types of tape nodes that are associated with various assets (e.g., parcels, equipment, tools, persons, and other things). The example network communication environment 400 may also be referred to as a sensing system 400 or wireless tracking system 400. The nodes of the sensing system 400 may refer to the tape nodes, other wireless devices, the gateway devices, client devices, servers, and other components of the wireless sensing system 400. In some examples, the network 402 includes one or more network communication systems and technologies, including any one or more of wide area networks, local area networks, public networks (e.g., the internet), private networks (e.g., intranets and extranets), wired networks, and wireless networks. For example, the network 402 includes communications infrastructure equipment, such as a geolocation satellite system 416 (e.g., GPS, GLONASS, and NAVSTAR), cellular communication systems (e.g., GSM/GPRS), Wi-Fi communication systems, RF communication systems (e.g., LoRa), Bluetooth communication systems (e.g., a Bluetooth Low Energy system), Z-wave communication systems, and ZigBee communication systems.

In some examples, the one or more network service applications 406 leverage the above-mentioned communications technologies to create a hierarchical wireless network of tape nodes that improves asset management operations by reducing costs and improving efficiency in a wide range of processes, from asset packaging, asset transporting, asset tracking, asset condition monitoring, asset inventorying, and asset security verification. Communication across the network is secured by a variety of different security mechanisms. In the case of existing infrastructure, a communication link the communication uses the infrastructure security mechanisms. In case of communications among tapes nodes, the communication is secured through a custom security mechanism. In certain cases, tape nodes can also be configured to support block chain to protect the transmitted and stored data.

A set of tape nodes can be configured by the network service 408 to create hierarchical communications network. The hierarchy can be defined in terms of one or more factors, including functionality (e.g., wireless transmission range or power), role (e.g., master tape node vs. peripheral tape node), or cost (e.g., a tape node equipped with a cellular transceiver vs. a peripheral tape node equipped with a Bluetooth LE transceiver). Tape nodes can be assigned to different levels of a hierarchical network according to one or more of the above-mentioned factors. For example, the hierarchy can be defined in terms of communication range or power, where tape nodes with higher power or longer communication range transceivers are arranged at a higher level of the hierarchy than tape nodes with lower power or lower range transceivers. In another example, the hierarchy is defined in terms of role, where, e.g., a master tape node is programmed to bridge communications between a designated group of peripheral tape nodes and a gateway node or server node. The problem of finding an optimal hierarchical structure can be formulated as an optimization problem with battery capacity of nodes, power consumption in various modes of operation, desired latency, external environment, etc. and can be solved using modern optimization methods e.g. neural networks, artificial intelligence, and other machine learning computing systems that take expected and historical data to create an optimal solution and can create algorithms for modifying the system's behavior adaptively in the field.

The tape nodes may be deployed by automated equipment or manually. As described in the embodiments of FIGS. 11-14, the tape nodes are deployed by an automated handheld tape dispenser. In this process, a tape node typically is separated from a roll or sheet and adhered to an asset, or other stationary or mobile object (e.g., a structural element of a warehouse, or a vehicle, such as a delivery truck) or stationary object (e.g., a structural element of a building). This process activates the tape node and causes the tape node to communicate with a server 404 of the network service 408. In this process, the tape node may communicate through one or more other tape nodes in the communication hierarchy. In this process, the network server 404 executes the network service application 406 to programmatically configure tape nodes that are deployed in the environment 400. In some examples, there are multiple classes or types of tape nodes, where each tape node class has a different respective set of functionalities and/or capacities.

In some examples, the one or more network service servers 404 communicate over the network 402 with one or more gateways that are configured to send, transmit, forward, or relay messages to the network 402 and activated tape nodes that are associated with respective assets and within communication range. Example gateways include mobile gateways 410, 412 and a stationary gateway 414. In some examples, the mobile gateways 410, 412, and the stationary gateway 414 are able to communicate with the network 402 and with designated sets or groups of tape nodes.

In some examples, the mobile gateway 412 is a vehicle (e.g., a delivery truck or other mobile hub) that includes a wireless communications unit 416 that is configured by the network service 408 to communicate with a designated set of tape nodes, including a peripheral tape node 418 in the form of a label that is adhered to an asset 420 contained within a parcel 421 (e.g., an envelope), and is further configured to communicate with the network service 408 over the network 402. In some examples, the peripheral tape node 418 includes a lower power wireless communications interface of the type used in, e.g., tape node 102 (shown in FIG. 5A), and the wireless communications unit 416 is implemented by a tape node (e.g., one of tape node 103 or tape node 105, respectively shown in FIGS. 5B and 5C) that includes a lower power communications interface for communicating with tape nodes within range of the mobile gateway 412 and a higher power communications interface for communicating with the network 402. In this way, the tape nodes 418 and 416 create a hierarchical wireless network of nodes for transmitting, forwarding, bridging, relaying, or otherwise communicating wireless messages to, between, or on behalf of the peripheral tape node 418 and the network service 408 in a power-efficient and cost-effective way.

In some examples, the mobile gateway 410 is a mobile phone that is operated by a human operator and executes a client application 422 that is configured by the network service 408 to communicate with a designated set of tape nodes, including a master tape node 424 that is adhered to a parcel 426 (e.g., a box), and is further configured to communicate with the network service 408 over the network 402. In the illustrated example, the parcel 426 contains a first parcel labeled or sealed by a tape node 428 and containing a first asset 430, and a second parcel labeled or sealed by a tape node 432 and containing a second asset 434. As explained in detail below, the master tape node 424 communicates with each of the peripheral tape nodes 428, 432 and communicates with the mobile gateway 408 in accordance with a hierarchical wireless network of tape nodes. In some examples, each of the peripheral tape nodes 428, 432 includes a lower power wireless communications interface of the type used in, e.g., tape node 102 (shown in FIG. 5A), and the master tape node 424 is implemented by a tape node (e.g., tape node 103, shown in FIG. 5B) that includes a lower power communications interface for communicating with the peripheral tape nodes 428, 432 contained within the parcel 426, and a higher power communications interface for communicating with the mobile gateway 410. The master tape node 424 is operable to relay wireless communications between the tape nodes 428, 432 contained within the parcel 426 and the mobile gateway 410, and the mobile gateway 410 is operable to relay wireless communications between the master tape node 424 and the network service 408 over the wireless network 402. In this way, the master tape node 424 and the peripheral tape nodes 428 and 432 create a hierarchical wireless network of nodes for transmitting, forwarding, relaying, or otherwise communicating wireless messages to, between, or on behalf of the peripheral tape nodes 428, 432 and the network service 408 in a power-efficient and cost-effective way.

In some examples, the stationary gateway 414 is implemented by a server executing a server application that is configured by the network service 408 to communicate with a designated set 440 of tape nodes 442, 444, 446, 448 that are adhered to respective parcels containing respective assets 450, 452, 454, 456 on a pallet 458. In other examples, the stationary gateway 414 is implemented by a tape node (e.g., one of tape node 103 or tape node 105, respectively shown in FIGS. 5B and 5C) that is adhered to, for example, a wall, column or other infrastructure component of the environment 400, and includes a lower power communications interface for communicating with tape nodes within range of the stationary gateway 414 and a higher power communications interface for communicating with the network 402. In one embodiment, each of the tape nodes 442-448 is a peripheral tape node and is configured by the network service 408 to communicate individually with the stationary gateway 414, which relays communications from the tape nodes 442-448 to the network service 408 through the stationary gateway 414 and over the communications network 402. In another embodiment, one of the tape nodes 442-448 at a time is configured as a master tape node that transmits, forwards, relays, or otherwise communicate wireless messages to, between, or on behalf of the other tape nodes on the pallet 458. In this embodiment, the master tape node may be determined by the tape nodes 442-448 or designated by the network service 408. In some examples, the tape node with the longest range or highest remaining power level is determined to be the master tape node. In some examples, when the power level of the current master tape node drops below a certain level (e.g., a fixed power threshold level or a threshold level relative to the power levels of one or more of the other tape nodes), another one of the tape nodes assumes the role of the master tape node. In some examples, a master tape node 459 is adhered to the pallet 458 and is configured to perform the role of a master node for the tape nodes 442-448. In these ways, the tape nodes 442-448, 458 are configurable to create different hierarchical wireless networks of nodes for transmitting, forwarding, relaying, bridging, or otherwise communicating wireless messages with the network service 408 through the stationary gateway 414 and over the network 402 in a power-efficient and cost-effective way.

In the illustrated example, the stationary gateway 414 also is configured by the network service 408 to communicate with a designated set of tape nodes, including a master tape node 460 that is adhered to the inside of a door 462 of a shipping container 464, and is further configured to communicate with the network service 408 over the network 402. In the illustrated example, the shipping container 464 contains a number of parcels labeled or sealed by respective peripheral tape nodes 466 and containing respective assets. The master tape node 416 communicates with each of the peripheral tape nodes 466 and communicates with the stationary gateway 415 in accordance with a hierarchical wireless network of tape nodes. In some examples, each of the peripheral tape nodes 466 includes a lower power wireless communications interface of the type used in, e.g., tape node 102 (shown in FIG. 5A), and the master tape node 460 is implemented by a tape node (e.g., tape node 103, shown in FIG. 5B) that includes a lower power communications interface for communicating with the peripheral tape nodes 466 contained within the shipping container 464, and a higher power communications interface for communicating with the stationary gateway 414.

In some examples, when the doors of the shipping container 464 are closed, the master tape node 460 is operable to communicate wirelessly with the peripheral tape nodes 466 contained within the shipping container 464. In an example, the master tape node 460 is configured to collect sensor data from the peripheral tape nodes and, in some embodiments, process the collected data to generate, for example, one or more histograms from the collected data. When the doors of the shipping container 464 are open, the master tape node 460 is programmed to detect the door opening (e.g., with an accelerometer component of the master tape node 460) and, in addition to reporting the door opening event to the network service 408, the master tape node 460 is further programmed to transmit the collected data and/or the processed data in one or more wireless messages to the stationary gateway 414. The stationary gateway 414, in turn, is operable to transmit the wireless messages received from the master tape node 460 to the network service 408 over the wireless network 402. Alternatively, in some examples, the stationary gateway 414 also is operable to perform operations on the data received from the master tape node 460 with the same type of data produced by the master node 459 based on sensor data collected from the tape nodes 442-448. In this way, the master tape node 460 and the peripheral tape nodes 466 create a hierarchical wireless network of nodes for transmitting, forwarding, relaying, or otherwise communicating wireless messages to, between, or on behalf of the peripheral tape nodes 466 and the network service 408 in a power-efficient and cost-effective way.

In an example of the embodiment shown in FIG. 6A, there are three classes of tape nodes: a short range tape node, a medium range tape node, and a long range tape node, as respectively shown in FIGS. 5A-5C. The short range tape nodes typically are adhered directly to parcels containing assets. In the illustrated example, the tape nodes 418, 428, 432, 442-448, 466 are short range tape nodes. The short range tape nodes typically communicate with a low power wireless communication protocol (e.g., Bluetooth LE, Zigbee, or Z-wave). The medium range tape nodes typically are adhered to objects (e.g., a box 426 and a shipping container 460) that are associated with multiple parcels or assets that are separated from the medium range tape nodes by a barrier or a large distance. In the illustrated example, the tape nodes 424 and 460 are medium range tape nodes. The medium range tape nodes typically communicate with a medium power wireless communication protocol (e.g., LoRa or Wi-Fi). The long-range tape nodes typically are adhered to mobile or stationary infrastructure of the wireless communication environment 400. In the illustrated example, the mobile gateway tape node 412 and the stationary gateway tape node 414 are long range tape nodes. The long range tape nodes typically communicate with other nodes using a high power wireless communication protocol (e.g., a cellular data communication protocol). In some examples, the mobile gateway tape node 436 is adhered to a mobile vehicle (e.g., a truck). In these examples, the mobile gateway 412 may be moved to different locations in the environment 400 to assist in connecting other tape nodes to the server 404. In some examples, the stationary gateway tape node 414 may be attached to a stationary structure (e.g., a wall) in the environment 400 with a known geographic location. In these examples, other tape nodes in the environment can determine their geographic location by querying the gateway tape node 414.

System Environment

FIG. 6B is a diagram showing an example system environment for the sensing system 500 including the adhesive tape platform 510. The sensing system 500 includes one or more sections of an adhesive tape platform 510, a central database and control system 520, one or more client devices 530, and a network 540.

Embodiments of the adhesive tape platform 510 are also described above with respect to FIGS. 1A-1B, 2A-2C, 3, and 4A-4C. Each section of the adhesive tape platform 510 may include a location module 511, a processor 512, memory 513, a communication module 514, and a sensor module 515, according to some embodiments. A section of the adhesive tape platform 510 may also include additional and/or different components not shown in FIG. 6B, according to some embodiments. The location module 511 collects data relevant to the location of the corresponding section of the adhesive tape platform 510. The location data collected by the location module may be stored in the memory 513. The location data may also have computations performed on it by the processor 512 and may be transmitted by the communication module 514 to the central database and control system 520 and/or one or more of the client devices 530 via the network 540. The location data may include geographic locations ascertained from systems including GPS, cellular network systems (e.g., GSM), wireless local area networks (e.g., a system of Wi-Fi access points), a dead-reckoning system, some other location system, or some combination thereof.

The sensing system 500 may also include sensing devices and components deployed in the field other than devices with the flexible adhesive tape form factor. For example, an embodiment of the tape node 510 may include a non-flexible sensing device that may be used to track assets, interact with other tape nodes 510, communicate with the central database and control system 520 and client devices 530, perform other functions, or some combination thereof. The tape node 510 may also include gateway devices or other communication devices that perform functions in conjunction with the adhesive tape platform and the sensing system 500. In some embodiments, multiple tape nodes 510 may have multiple different functionalities, such as performing different types of communication (e.g., long-range, medium-range, short-range), and may be deployed and operate together in the sensing system 500.

The location module 511 may include the one or more antennas and one or more wireless communication interface circuits of the communication interface 81, according to some embodiments. The location module 511 may include, for example, a GPS system that includes a GPS receiver circuit (e.g., a receiver integrated circuit) and a GPS antenna. In some embodiments, the location module 511 also includes one or more wireless communication systems each of which includes a respective transceiver circuit (e.g., a transceiver integrated circuit) and a respective antenna. Example wireless communication systems include a cellular communication system (e.g., GSM/GPRS), a Wi-Fi communication system, an RF communication system (e.g., LoRa), a Bluetooth communication system (e.g., a Bluetooth Low Energy system), a Z-wave communication system, and a ZigBee communication system.

The processor 512 may be a microcontroller or microprocessor, according to some embodiments. The processor 512 may be an embodiment of the processor 90. In some embodiments, each section of the adhesive tape platform includes more than one processor 512. The memory 513 stores sensing data, location data, and other data necessary for the functioning of the adhesive tape platform 510. The memory 513 may be incorporated into the one or more of the processor 512 or may be a separate component. The memory 513 may be an embodiment of the memory 96.

The communication module 514 enables communication between the adhesive tape platform 510 and the other members of the sensing system 500 via the network 540. The communication module may include embodiments of the communication interface 81. In some embodiments, the communication module 514 enables a segment of the adhesive tape platform 510 to communicate with another segment of the adhesive tape platform 510. The communication module includes one or more wireless communication systems each of which includes a respective transceiver circuit (e.g., a transceiver integrated circuit) and a respective antenna. Example wireless communication systems include a cellular communication system (e.g., GSM/GPRS), a Wi-Fi communication system, an RF communication system (e.g., LoRa), a Bluetooth communication system (e.g., a Bluetooth Low Energy system), a Z-wave communication system, and a ZigBee communication system. The one or more wireless communication systems in the communication module 514 may be shared with the location module 511.

The sensor module 515 includes one or more sensors and/or sensor devices. The one or more sensors may include the examples of sensing transducers 94 described above with respect to FIG. 3. The sensor module 515 collects sensor data which may be stored in the memory 513, have computations performed on it by the processor 512, be transmitted to one or more of the central database and control system 520 and the one or more client devices 530, or some combination thereof. The sensor data may include acceleration data, velocity data, vibration data, capacitive sensing data, humidity data, audio recording data, optical sensor data, infrared sensor data, temperature data, other sensor data, or some combination thereof. The sensor data may include examples of data collected by sensors not described herein.

In some embodiments, different segments of the adhesive tape platform 510 include different communication modules that have corresponding communication ranges. For example, a first tape node 510 may only include short-range communication capabilities (e.g., Bluetooth communications), while a second tape node 510 may include the shortrange communication capabilities and longer range communication capabilities (e.g., LoRA, cellular communications, or WiFi). The second tape node 510 may be positioned in a location within the communication range of the first tape node 510. In this case, the first tape node 510 may communicate with other members of the sensing system 500 by communicating data to the second tape node 510 via the short-range communication. The second tape node 510, in turn, relays the data to and/or from the other members of the sensing system 500. In some embodiments, the communication is relayed from and to the first tape node 510 by a gateway device (stationary or mobile) that may have a form factor different than that of an adhesive tape.

The distributed intelligent software may define how one or more devices of the system process and operate in response to data (also referred to herein as sensor data) collected by the adhesive tape platform 510. The sensing data includes the location data collected by the location module 511, the sensor data collected by the sensor module 515, data received by the communication module 514 from the central database and control system 520 and/or the one or more client devices 530, or some combination thereof. Based on the sensing data, the distributed intelligent software may alter the state of the adhesive tape platform 510. Altering the state of the adhesive tape platform 510 alters the actions, functions, and behavior of the location module 511, processor 512, communication module 513, and the sensor module 515 of the adhesive tape platform 510. In some embodiments, altering the state of the adhesive tape platform 510 alters other aspects of the adhesive tape platform. The processor 512 of the adhesive tape platform executes computations and functions based on instructions of the distributed intelligent software to alter the state of the adhesive tape platform 510. Examples of various states are discussed below, with respect to FIG. 6. Instructions to alter the state of the tape node 510 may be in the form of executable programmatic code, according to some embodiments.

In some embodiments, logic relevant to the distributed intelligent software is stored in the memory 513 of the adhesive tape platform 510, or multiple segments thereof. The processor 512 may then generate and execute the instructions for altering the state of the adhesive tape platform 510 based on the stored logic and corresponding sensing data. In other embodiments, the communication module 514 receives the instructions from the central database and control center 520, the client devices 530, or some combination thereof. In other embodiments, the logic is distributed between some combination of any one or more of the adhesive tape platform 510, other adhesive tape platforms, the central database and control system 520, and the client devices 530.

The central database and control system 520 is a system for storing data (including sensing data), running applications, transmitting/receiving data to the adhesive tape platform 510 and the one or more client devices 530, and communicating with the adhesive tape platform 510 and the one or more client devices 530. According to some embodiments, the central database and control system 520 is hosted on one or more servers. The central database and control system 520 includes an application engine 521 and a database 522, according to some embodiments. The central database and control system 520 may include additional and/or different components than are shown in FIG. 6B.

The application engine 521 executes applications associated with the sensing system 500. For example, the application engine 521 may receive communications and data from the adhesive tape platform 510 and update the database 522 based on the data received from the adhesive tape platform 510. In another example, the application engine 521 may provide data from the database 424 to one or more of the client devices 530 and communicate instructions to display the data on the display 533 of the client device.

In some embodiments, the application engine 521 performs tasks according to the distributed intelligent software. For example, the application engine 521 detects that an event has occurred based on sensing data received from the adhesive tape platform 510. In response to the detected event, the application engine 521 generates instructions to alter the state of the adhesive tape platform 510 according to the distributed intelligent software and transmits the instructions to the adhesive tape platform 510. In some embodiments, the application engine 521 also generates instructions for the central database and control system 520 and executes the instructions, in response to the detected event. The application engine 521 may also generate instructions for the client device 530, in response to the detected event, according to some embodiments.

The database 522 stores data and logs relevant to the adhesive tape platform 510. The database 522 stores sensing data that it receives from the adhesive tape platform 510 via the network 540. The sensing data may include location data (e.g., GPS coordinates, geographic coordinates, etc.), sensor data, other data relevant to monitoring an item with the adhesive tape platform 510, or some combination thereof. The database 522 may also store data received from one or more client devices 530. For example, a client device 530 may scan a barcode on the adhesive tape node 510 or on an asset being tracked by the adhesive tape node 510. The client device 530 then transmits a notification regarding the scanning of the barcode to the central database and control system 520 which the application engine 521 logs on the database 522, creating a comprehensive log of data relevant to the tracking and monitoring of items using the sensing system 500.

The application engine 521 may perform calculations on the sensing data stored on the database 522 and store calculated values on the database 522. For example, if the central database and control system receives time-domain sensor data, the application engine 521 may calculate a frequency spectrum for the sensor data by performing a fast Fourier transform (FFT) on the time-domain sensor data and store the frequency spectrum on the database 522. In some embodiments, the application engine 521 uses a trained machine learning model to perform computations relevant to the adhesive tape platform 510. A trained machine learning model may be used to detect events in the stored sensing data and determine rules that are part of the distributed intelligent software, according to some embodiments. For example, the application engine 521 may input sensing data from the adhesive tape platform 510 to a trained machine learning model which outputs instructions for altering the state of the adhesive tape platform 510 in response. The use of a machine learning model to generate instructions according to the distributed intelligent software is described in further detail below, with respect to FIGS. 13 and 14.

The one or more client devices 530 includes computing devices used by users, human operators, and/or administrators of the sensing system 500. Examples of the client devices 530 include personal computers, smartphones, barcode scanning devices, and other computational devices. A client device 530 may be a dedicated computing device for interacting with the adhesive tape platform 510 and the central database and control system 520. Each client device 530 includes a processor 531, memory 532, and optionally a display 533, according to some embodiments. A client device 530 may also include a camera, a sensor, a barcode scanning apparatus, communication systems, other components, or some combination thereof. Each client device may execute one or more applications for interacting with the adhesive tape platform 510 and the central database and control system 520. For example, a client device may run an application that receives sensing data collected by the adhesive tape platform and provided from the central database and control system 520, store the sensing data in the memory 532, and display the sensing data on the display 533. A client device 530 may include additional and/or different components than are shown in FIG. 6B, according to some embodiments.

In some examples, a human operator uses one or more client devices 530 to interact directly with the adhesive tape platform. The human operator may be equipped with a client device 530 (e.g., mobile phone or other device) that allows the operator to authenticate and initialize the adhesive tape platform 510. In addition, the operator can take a picture of an asset using the client device 530 including the adhesive tape platform 510 and any barcodes associated with the asset and, thereby, create a persistent record that links the adhesive tape platform 510 to the asset. In addition, the human operator typically sends the picture to a network service and/or transmit the picture to the adhesive tape platform 510 for storage in the memory 513 and/or to the central database and control system 520 for storage in the database 424. The display 533 may display sensing data, notifications, instructions, a user interface, or some combination thereof. In some embodiments, a client device 530 may communicate directly with the adhesive tape platform 510, for example, using Bluetooth communications, near-field communications (NFC), Wi-Fi, some other communication method, or some combination thereof. In further embodiments, the adhesive tape platform 510 transmits sensing data directly to one or more client devices 530.

In some embodiments, the client device 530 performs tasks based on the distributed intelligent software. An application running on the processor 531 detects that an event has occurred based on sensing data received from the adhesive tape platform 510 and/or from the central database and control system 520. Alternatively, the processor 431 may receive an indication from the adhesive tape platform 510 or the central database and control system 420 indicating such event has occurred, without requiring the processor 531 to processes the sensing data and expressly detect the event therein. In response to the detected event, the processor 531 generates instructions to alter the state of the adhesive tape platform 510 based on the distributed intelligent software (part of which may be stored on the memory 532) and transmits the instructions to the adhesive tape platform 510. In some embodiments, the processor 531 also generates instructions for the central database and control system 520 and the client device 530 transmits the instructions to the central database and control system 520, in response to the detected event. The processor 531 may also generate instructions for the client device 530 and execute the generated instructions, in response to the detected event, according to some embodiments.

The adhesive tape platform 510, the central database and control system 520, and the client devices 530 are configured to communicate via the network 540, which may comprise any combination of local area networks, wide area networks, public network (e.g., the internet), private networks (e.g., intranets and extranets), using wired and/or wireless communication system. In one embodiment, the network 540 uses standard communications technologies and/or protocols. For example, the network 540 includes communication links using technologies such as Ethernet, 802.11, worldwide interoperability for microwave access (WiMAX), 3G, 4G, code division multiple access (CDMA), digital subscriber line (DSL), geolocation satellite systems (e.g., GPS, GLONASS, and NAVSTAR), cellular communication systems (e.g., GSM/GPRS), Wi-Fi communication systems, RF communication systems (e.g., LoRa), Bluetooth communication systems (e.g., a Bluetooth Low Energy system), Z-wave communication systems, ZigBee communication systems, etc. Examples of networking protocols used for communicating via the network 540 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 540 may be encrypted using any suitable technique or techniques.

The distributed intelligent software includes logic for managing each of the adhesive tape platform segments 510, the central database and control system 520, and the client devices 530. In some embodiments, computation related to the distributed intelligent software is distributed among one or more of the adhesive tape platform 510, other adhesive tape platforms, the central database and control system 520, and the client devices 530, and combinations thereof. For example, logic relevant to the behavior of the tape nodes 510 may be stored locally on the memory 513 of each of the tape nodes 510. The processor 512 of the tape node 510 may then access the stored logic and execute the logic based on sensing data that the sensor module 515, the location module 511, and the communication module 515 has collected, altering the state of the tape node 510 without receiving any commands from the central database and control system 520 and/or a client device 530.

In other embodiments, the logic relevant to the behavior of the tape nodes 510 may be stored and executed on the central database and control system 520. For example, the distributed intelligence engine 521 may execute the logic in response to receiving sensing data from one of the tape nodes 510 and transmit instructions to the tape node 510 to alter its state. In further embodiments, the processor 512 of the tape nodes 510 does not execute any of the intelligent software logic and only alters the state of the tape node 510 in response to commands received from the central database and control system 520 or the client devices 530.

In some embodiments, the logic relevant to the behavior of the tape nodes 510 may be stored on the memory 532 of the client device 530 and executed by the processor 531. For example, the processor 531 may execute the logic in response to receiving sensing data from one of the tape nodes 510, resulting in the client device 530 transmitting one or more instruction to the tape node 510 to alter its state.

Hierarchical Wireless Communications Network

Figure 7:
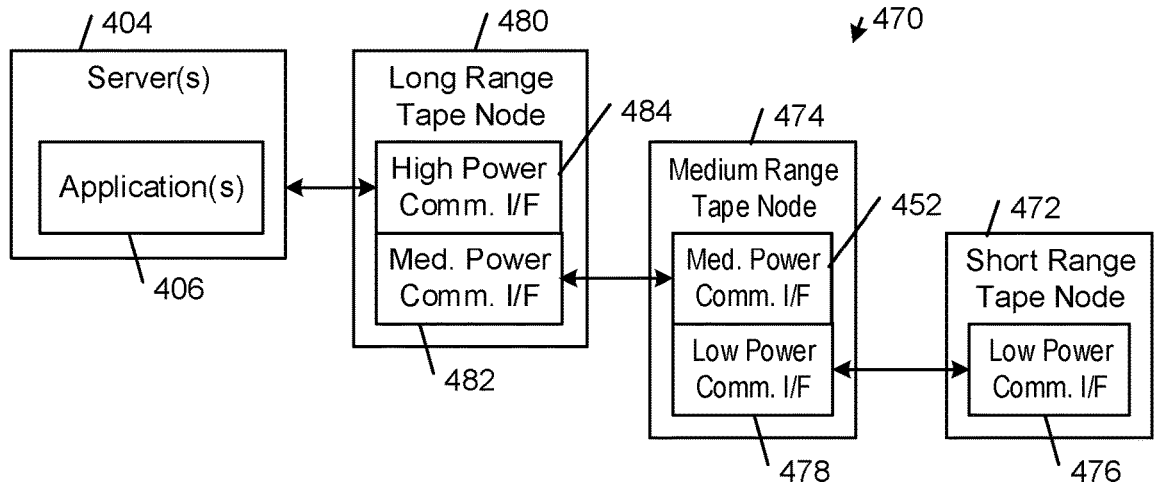
FIG. 7 is a diagrammatic view of a hierarchical communications network.

FIG. 7 shows an example hierarchical wireless communications network of tape nodes 470. In this example, the short range tape node 472 and the medium range tape node 474 communicate with one another over their respective low power wireless communication interfaces 476, 478. The medium range tape node 474 and the long range tape node 480 communicate with one another over their respective medium power wireless communication interfaces 478, 482. The long range tape node 480 and the network server 404 communicate with one another over the high power wireless communication interface 484. In some examples, the low power communication interfaces 476, 478 establish wireless communications with one another in accordance with the Bluetooth LE protocol, the medium power communication interfaces 452, 482 establish wireless communications with one another in accordance with the LoRa communications protocol, and the high power communication interface 484 establishes wireless communications with the server 404 in accordance with a cellular communications protocol.

In some examples, the different types of tape nodes are deployed at different levels in the communications hierarchy according to their respective communications ranges, with the long range tape nodes generally at the top of the hierarchy, the medium range tape nodes generally in the middle of the hierarchy, and the short range tape nodes generally at the bottom of the hierarchy. In some examples, the different types of tape nodes are implemented with different feature sets that are associated with component costs and operational costs that vary according to their respective levels in the hierarchy. This allows system administrators flexibility to optimize the deployment of the tape nodes to achieve various objectives, including cost minimization, asset tracking, asset localization, and power conservation.

In some examples, a server 404 of the network service 408 designates a tape node at a higher level in a hierarchical communications network as a master node of a designated set of tape nodes at a lower level in the hierarchical communications network. For example, the designated master tape node may be adhered to a parcel (e.g., a box, pallet, or shipping container) that contains one or more tape nodes that are adhered to one or more packages containing respective assets. In order to conserve power, the tape nodes typically communicate according to a schedule promulgated by the server 404 of the network service 408. The schedule usually dictates all aspects of the communication, including the times when particular tape nodes should communicate, the mode of communication, and the contents of the communication. In one example, the server 404 transmits programmatic Global Scheduling Description Language (GSDL) code to the master tape node and each of the lower-level tape nodes in the designated set. In this example, execution of the GSDL code causes each of the tape nodes in the designated set to connect to the master tape node at a different respective time that is specified in the GSDL code, and to communicate a respective set of one or more data packets of one or more specified types of information over the respective connection. In some examples, the master tape node simply forwards the data packets to the server network node 404, either directly or indirectly through a gateway tape node (e.g., the long range tape node 416 adhered to the mobile vehicle 412 or the long range tape node 414 adhered to an infrastructure component of the environment 400). In other examples, the master tape node processes the information contained in the received data packets and transmits the processed information to the server network node 404.

Figure 8:
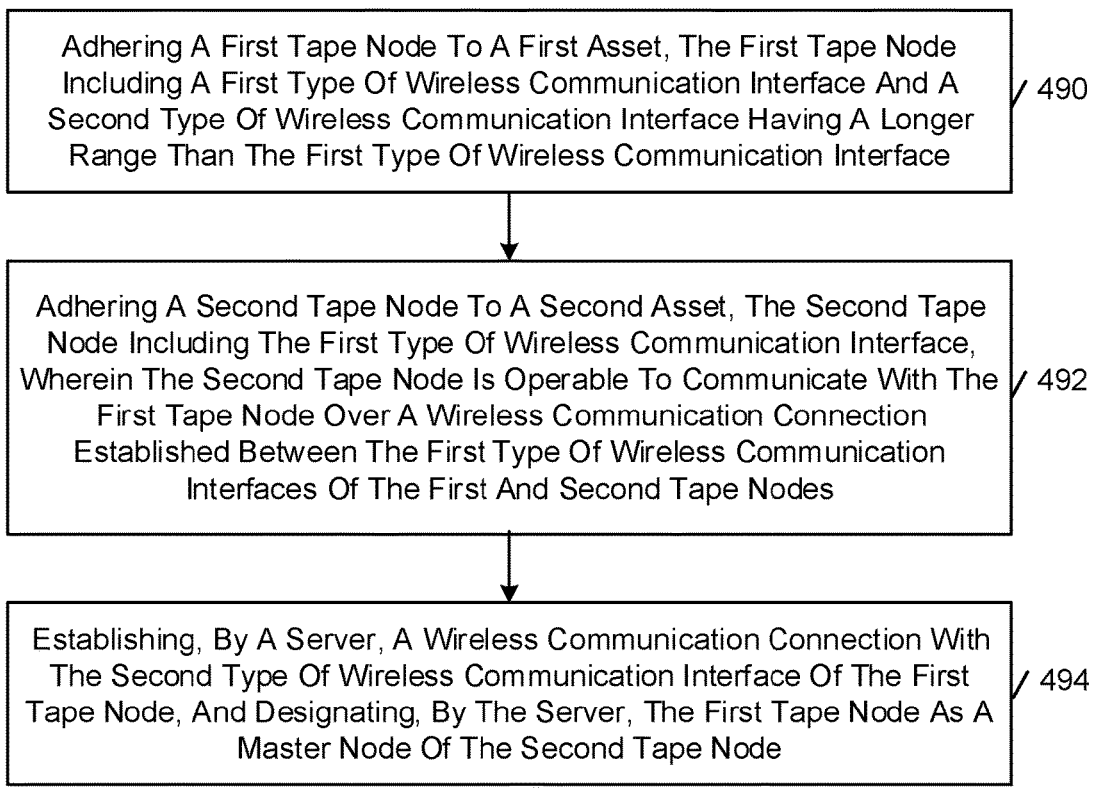
FIG. 8 is a flow diagram of a method of creating a hierarchical communications network.

FIG. 8 shows an example method of creating a hierarchical communications network. In accordance with this method, a first tape node is adhered to a first asset in a set of associated assets, the first tape node including a first type of wireless communication interface and a second type of wireless communication interface having a longer range than the first type of wireless communication interface (FIG. 8, block 490). A second tape node is adhered to a second asset in the set, the second tape node including the first type of wireless communication interface, wherein the second tape node is operable to communicate with the first tape node over a wireless communication connection established between the first type of wireless communication interfaces of the first and second tape nodes (FIG. 8, block 492). An application executing on a computer system (e.g., a server 404 of a network service 408) establishes a wireless communication connection with the second type of wireless communication interface of the first tape node, and the application transmits programmatic code executable by the first tape node to function as a master tape node with respect to the second tape node (FIG. 8, block 494).

In some embodiments, the second tape node is assigned the role of the master tape node with respect to the first tape node.

Distributed Agent Operating System

As used herein, the term "node" refers to both a tape node and a non-tape node unless the node is explicitly designated as a "tape node" or a "non-tape node." In some embodiments, a non-tape node may have the same or similar communication, sensing, processing and other functionalities and capabilities as the tape nodes described herein, except without being integrated into a tape platform. In some embodiments, non-tape nodes can interact seamlessly with tape nodes. Each node is assigned a respective unique identifier.

The following disclosure describes a distributed software operating system that is implemented by distributed hardware nodes executing intelligent agent software to perform various tasks or algorithms. In some embodiments, the operating system distributes functionalities (e.g., performing analytics on data or statistics collected or generated by nodes) geographically across multiple intelligent agents that are bound to items (e.g., parcels, containers, packages, boxes, pallets, a loading dock, a door, a light switch, a vehicle such as a delivery truck, a shipping facility, a port, a hub, etc.). In addition, the operating system dynamically allocates the hierarchical roles (e.g., master and slave roles) that nodes perform over time in order to improve system performance, such as optimizing battery life across nodes, improving responsiveness, and achieving overall objectives. In some embodiments, optimization is achieved using a simulation environment for optimizing key performance indicators (PKIs).

In some embodiments, the nodes are programmed to operate individually or collectively as autonomous intelligent agents. In some embodiments, nodes are configured to communicate and coordinate actions and respond to events. In some embodiments, a node is characterized by its identity, its mission, and the services that it can provide to other nodes. A node's identity is defined by its capabilities (e.g., battery life, sensing capabilities, and communications interfaces). A node's mission (or objective) is defined by the respective program code, instructions, or directives it receives from another node (e.g., a server or a master node) and the actions or tasks that it performs in accordance with that program code, instructions, or directives (e.g., sense temperature every hour and send temperature data to a master node to upload to a server). A node's services define the functions or tasks that it is permitted to perform for other nodes (e.g., retrieve temperature data from a peripheral node and send the received temperature data to the server). At least for certain tasks, once programmed and configured with their identities, missions, and services, nodes can communicate with one another and request services from and provide services to one another independently of the server.

Thus, in accordance with the runtime operating system every agent knows its objectives (programmed). Every agent knows which capabilities/resources it needs to fulfill objective. Every agent communicates with every other node in proximity to see if it can offer the capability. Examples include communicate data to the server, authorize going to lower power level, temperature reading, send an alert to local hub, send location data, triangulate location, any boxes in same group that already completed group objectives.

Nodes can be associated with items. Examples of an item includes, but are not limited to for example, a package, a box, pallet, a container, a truck or other conveyance, infrastructure such as a door, a conveyor belt, a light switch, a road, or any other thing that can be tracked, monitored, sensed, etc. or that can transmit data concerning its state or environment. In some examples, a server or a master node may associate the unique node identifiers with the items.

Communication paths between tape and/or non-tape nodes may be represented by a graph of edges between the corresponding assets (e.g., a storage unit, truck, or hub). In some embodiments, each node in the graph has a unique identifier. A set of connected edges between nodes is represented by a sequence of the node identifiers that defines a communication path between a set of nodes.

Figure 9A:
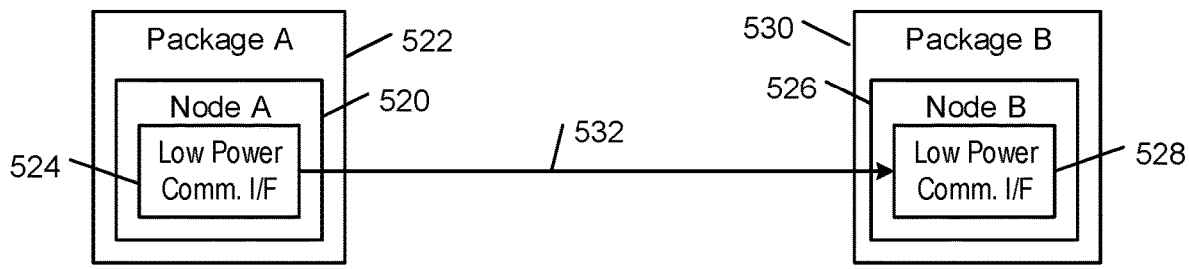
FIGS. 9A-9E are diagrammatic views of exemplary use cases for a distributed agent operating system.

Referring to FIG. 9A, a node 520 (Node A) is associated with a package 522 (Package A). In some embodiments, the node 520 may be implemented as a tape node that is used to seal the package 522 or it may be implemented as a label node that is used to label the package 522; alternatively, the node 520 may be implemented as a non-tape node that is inserted within the package 522 or embedded in or otherwise attached to the interior or exterior of the package 522. In the illustrated embodiment, the node 520 includes a low power communications interface 524 (e.g., a Bluetooth Low Energy communications interface). Another node 526 (Node B), which is associated with another package 530 (Package B), is similarly equipped with a compatible low power communications interface 528 (e.g., a Bluetooth Low Energy communications interface).

In an example scenario, in accordance with the programmatic code stored in its memory, node 526 (Node B) requires a connection to node 520 (Node A) to perform a task that involves checking the battery life of Node A. Initially, Node B is unconnected to any other nodes. In accordance with the programmatic code stored in its memory, Node B periodically broadcasts advertising packets into the surrounding area. When the other node 520 (Node A) is within range of Node B and is operating in a listening mode, Node A will extract the address of Node B and potentially other information (e.g., security information) from an advertising packet. If, according to its programmatic code, Node A determines that it is authorized to connect to Node B, Node A will attempt to pair with Node B. In this process, Node A and Node B determine each other's identities, capabilities, and services. For example, after successfully establishing a communication path 532 with Node A (e.g., a Bluetooth Low Energy formatted communication path), Node B determines Node A's identity information (e.g., master node), Node A's capabilities include reporting its current battery life, and Node A's services include transmitting its current battery life to other nodes. In response to a request from Node B, Node A transmits an indication of its current battery life to Node B.

Figure 9B:
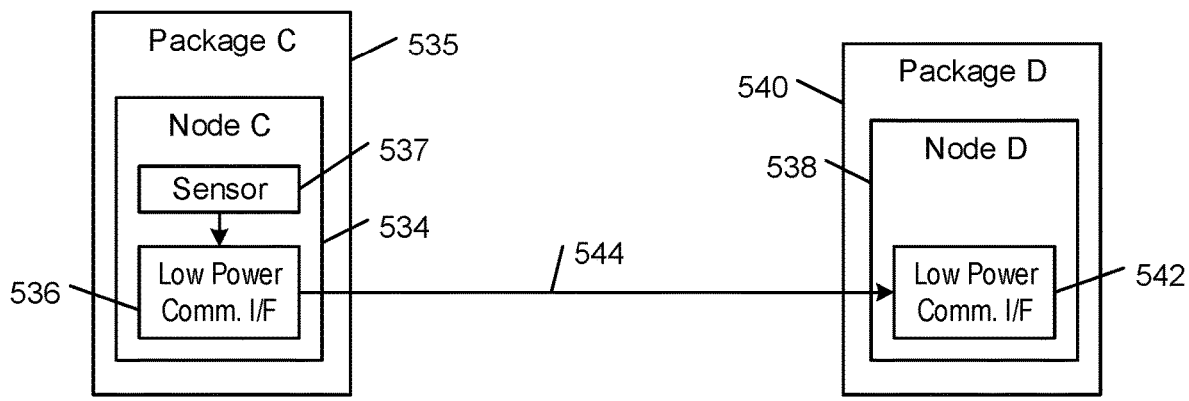

Referring to FIG. 9B, a node 534 (Node C) is associated with a package 535 (Package C). In the illustrated embodiment, the Node C includes a low power communications interface 536 (e.g., a Bluetooth Low Energy communications interface), and a sensor 537 (e.g., a temperature sensor). Another node 538 (Node D), which is associated with another package 540 (Package D), is similarly equipped with a compatible low power communications interface 542 (e.g., a Bluetooth Low Energy communications interface).

In an example scenario, in accordance with the programmatic code stored in its memory, Node D requires a connection to Node C to perform a task that involves checking the temperature in the vicinity of Node C. Initially, Node D is unconnected to any other nodes. In accordance with the programmatic code stored in its memory, Node D periodically broadcasts advertising packets in the surrounding area. When Node C is within range of Node D and is operating in a listening mode, Node C will extract the address of Node D and potentially other information (e.g., security information) from the advertising packet. If, according to its programmatic code, Node C determines that it is authorized to connect to Node D, Node C will attempt to pair with Node D. In this process, Node C and Node D determine each other's identities, capabilities, and services. For example, after successfully establishing a communication path 544 with Node C (e.g., a Bluetooth Low Energy formatted communication path), Node D determines Node C's identity information (e.g., a peripheral node), Node C's capabilities include retrieving temperature data, and Node C's services include transmitting temperature data to other nodes. In response to a request from Node D, Node C transmits its measured and/or locally processed temperature data to Node D.

Figure 9C:
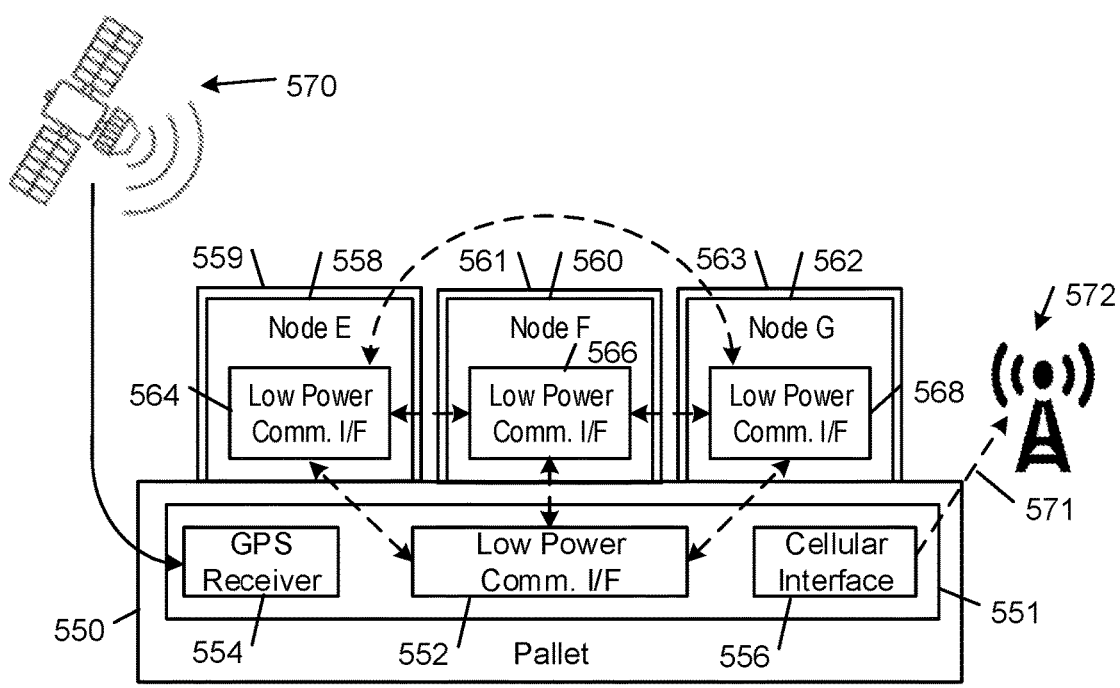

Referring to FIG. 9C, a pallet 550 is associated with a master node 551 that includes a low power communications interface 552, a GPS receiver 554, and a cellular communications interface 556. In some embodiments, the master node 551 may be implemented as a tape node or a label node that is adhered to the pallet 550. In other embodiments, the master node 551 may be implemented as a non-tape node that is inserted within the body of the pallet 550 or embedded in or otherwise attached to the interior or exterior of the pallet 550.

The pallet 550 provides a structure for grouping and containing packages 559, 561, 563 each of which is associated with a respective peripheral node 558, 560, 562 (Node E, Node F, and Node G). Each of the peripheral nodes 558, 560, 562 includes a respective low power communications interface 564, 566, 568 (e.g., Bluetooth Low Energy communications interface). In the illustrated embodiment, each of the nodes E, F, G and the master node 551 are connected to each of the other nodes over a respective low power communications path (shown by dashed lines).

In some embodiments, the packages 559, 561, 563 are grouped together because they are related. For example, the packages 559, 561, 563 may share the same shipping itinerary or a portion thereof. In an example scenario, the master pallet node 550 scans for advertising packets that are broadcasted from the peripheral nodes 558, 560, 562. In some examples, the peripheral nodes broadcast advertising packets during respective scheduled broadcast intervals. The master node 551 can determine the presence of the packages 559, 561, 563 in the vicinity of the pallet 550 based on receipt of one or more advertising packets from each of the nodes E, F, and G. In some embodiments, in response to receipt of advertising packets broadcasted by the peripheral nodes 558, 560, 562, the master node 551 transmits respective requests to the server to associate the master node 551 and the respective peripheral nodes 558, 560, 562. In some examples, the master tape node requests authorization from the server to associate the master tape node and the peripheral tape nodes. If the corresponding packages 559, 561, 563 are intended to be grouped together (e.g., they share the same itinerary or certain segments of the same itinerary), the server authorizes the master node 551 to associate the peripheral nodes 558, 560, 562 with one another as a grouped set of packages. In some embodiments, the server registers the master node and peripheral tape node identifiers with a group identifier. The server also may associate each node ID with a respective physical label ID that is affixed to the respective package.

In some embodiments, after an initial set of packages is assigned to a multi-package group, the master node 551 may identify another package arrives in the vicinity of the multi-package group. The master node may request authorization from the server to associate the other package with the existing multi-package group. If the server determines that the other package is intended to ship with the multi-package group, the server instructs the master node to merge one or more other packages with currently grouped set of packages. After all packages are grouped together, the server authorizes the multi-package group to ship. In some embodiments, this process may involve releasing the multi-package group from a containment area (e.g., customs holding area) in a shipment facility.

In some embodiments, the peripheral nodes 558, 560, 562 include environmental sensors for obtaining information regarding environmental conditions in the vicinity of the associated packages 559, 561, 563. Examples of such environmental sensors include temperature sensors, humidity sensors, acceleration sensors, vibration sensors, shock sensors, pressure sensors, altitude sensors, light sensors, and orientation sensors.

In the illustrated embodiment, the master node 551 can determine its own location based on geolocation data transmitted by a satellite-based radio navigation system 570 (e.g., GPS, GLONASS, and NAVSTAR) and received by the GPS receiver 554 component of the master node 551. In an alternative embodiment, the location of the master pallet node 551 can be determined using cellular based navigation techniques that use mobile communication technologies (e.g., GSM, GPRS, CDMA, etc.) to implement one or more cell-based localization techniques. After the master node 551 has ascertained its location, the distance of each of the packages 559, 561, 563 from the master node 551 can be estimated based on the average signal strength of the advertising packets that the master node 551 receives from the respective peripheral node. The master node 551 can then transmit its own location and the locations of the package nodes E, F, and G to a server over a cellular interface connection with a cell tower 572. Other methods of determining the distance of each of the packages 559, 561, 563 from the master node 551, such as Received Signal-Strength Index (RSSI) based indoor localization techniques, also may be used.

In some embodiments, after determining its own location and the locations of the peripheral nodes, the master node 551 reports the location data and the collected and optionally processed (e.g., either by the peripheral nodes peripheral nodes 558, 560, 562 or the master node 551) sensor data to a server over a cellular communication path 571 on a cellular network 572.

In some examples, nodes are able to autonomously detect logistics execution errors if packages that are supposed to travel together no longer travel together, and raise an alert. For example, a node (e.g., the master node 551 or one of the peripheral nodes 558, 560, 562) alerts the server when the node determines that a particular package 559 is being or has already been improperly separated from the group of packages. The node may determine that there has been an improper separation of the particular package 559 in a variety of ways. For example, the associated node 558 that is bound to the particular package 559 may include an accelerometer that generates a signal in response to movement of the package from the pallet. In accordance with its intelligent agent program code, the associated node 558 determines that the master node 551 has not disassociated the particular package 559 from the group and therefore broadcasts advertising packets to the master node, which causes the master node 551 to monitor the average signal strength of the advertising packets and, if the master node 551 determines that the signal strength is decreasing over time, the master node 551 will issue an alert either locally (e.g., through a speaker component of the master node 551) or to the server.

Figure 9D:
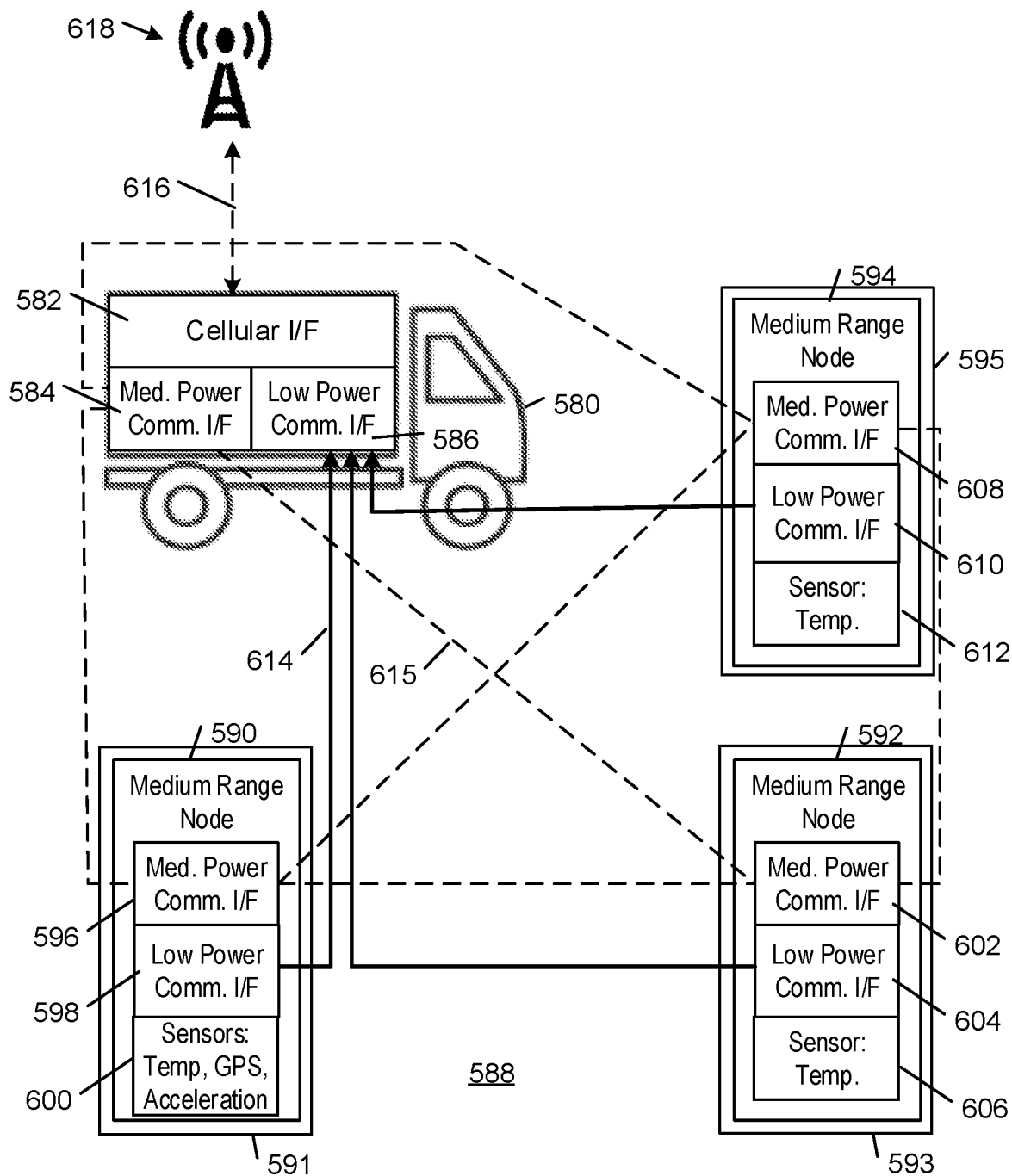

Referring to FIG. 9D, a truck 580 is configured as a mobile node or mobile hub that includes a cellular communications interface 582, a medium power communications interface 584, and a low power communications interface 586. The communications interfaces 580-586 may be implemented on one or more tape and non-tape nodes. In an illustrative scenario, the truck 580 visits a storage facility, such as a warehouse 588, to wirelessly obtain temperature data generated by temperature sensors in the medium range nodes 590, 592, 594. The warehouse 588 contains nodes 590, 592, and 594 that are associated with respective packages 591, 593, 595. In the illustrated embodiment, each node 590-594 is a medium range node that includes a respective medium power communications interface 596, 602, 608, a respective low power communications interface 598, 604, 610 and one or more respective sensors 600, 606, 612. In the illustrated embodiment, each of the package nodes 590, 592, 594 and the truck 580 is connected to each of the other ones of the package nodes through a respective medium power communications path (shown by dashed lines). In some embodiments, the medium power communications paths are LoRa formatted communication paths.

In some embodiments, the communications interfaces 584 and 586 (e.g., a LoRa communications interface and a Bluetooth Low Energy communications interface) on the node on the truck 580 is programmed to broadcast advertisement packets to establish connections with other network nodes within range of the truck node. A warehouse 588 includes medium range nodes 590, 592, 594 that are associated with respective containers 591, 593, 595 (e.g., packages, boxes, pallets, and the like). When the truck node's low power interface 586 is within range of any of the medium range nodes 590, 592, 594 and one or more of the medium range nodes is operating in a listening mode, the medium range node will extract the address of truck node and potentially other information (e.g., security information) from the advertising packet. If, according to its programmatic code, the truck node determines that it is authorized to connect to one of the medium range nodes 590, 592, 594, the truck node will attempt to pair with the medium range node. In this process, the truck node and the medium range node determine each other's identities, capabilities, and services. For example, after successfully establishing a communication path with the truck node (e.g., a Bluetooth Low Energy formatted communication path 614 or a LoRa formatted communication path 617), the truck node determines the identity information for the medium range node 590 (e.g., a peripheral node), the medium range node's capabilities include retrieving temperature data, and the medium range node's services include transmitting temperature data to other nodes. Depending of the size of the warehouse 588, the truck 580 initially may communicate with the nodes 590, 592, 594 using a low power communications interface (e.g., Bluetooth Low Energy interface). If any of the anticipated nodes fails to respond to repeated broadcasts of advertising packets by the truck 580, the truck 580 will try to communicate with the non-responsive nodes using a medium power communications interface (e.g., LoRa interface). In response to a request from the truck node 584, the medium range node 590 transmits an indication of its measured temperature data to the truck node. The truck node repeats the process for each of the other medium range nodes 592, 594 that generate temperature measurement data in the warehouse 588. The truck node reports the collected (and optionally processed, either by the medium range nodes 590, 592, 594 or the truck node) temperature data to a server over a cellular communication path 616 with a cellular network 618.

Figure 9E:
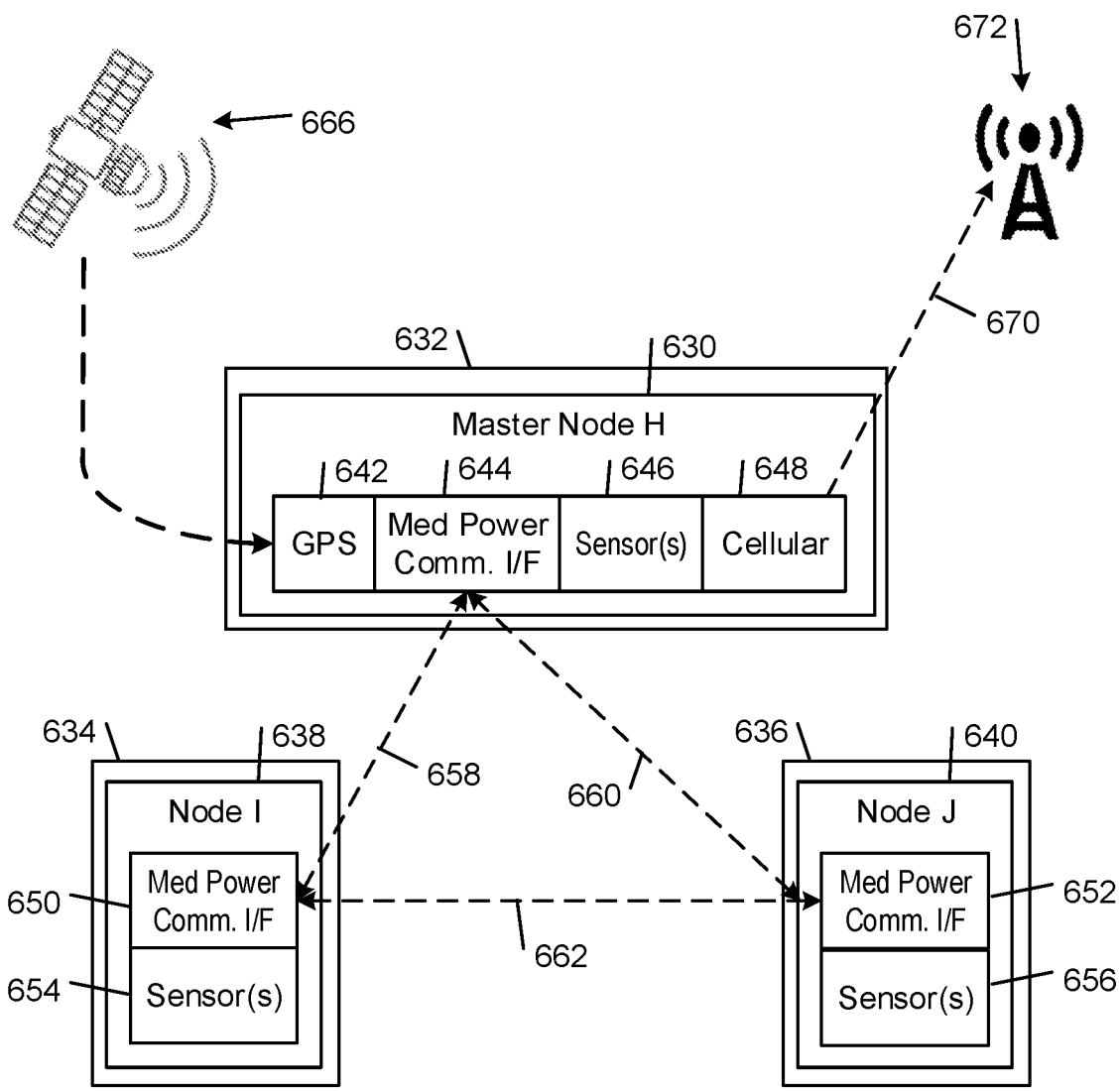

Referring to FIG. 9E, a master node 630 is associated with an item 632 (e.g., a package) and grouped together with other items 634, 636 (e.g., packages) that are associated with respective peripheral nodes 638, 640. The master node 630 includes a GPS receiver 642, a medium power communications interface 644, one or more sensors 646, and a cellular communications interface 648. Each of the peripheral nodes 638, 640 includes a respective medium power communications interface 650, 652 and one or more respective sensors 654, 656. In the illustrated embodiment, the peripheral and master nodes are connected to one another other over respective pairwise communications paths (shown by dashed lines). In some embodiments, the nodes 630 638, 640 communicate through respective LoRa communications interfaces over LoRa formatted communications paths 658, 660, 662.

In the illustrated embodiment, the master and peripheral nodes 638, 638, 640 include environmental sensors for obtaining information regarding environmental conditions in the vicinity of the associated packages 632, 634, 636. Examples of such environmental sensors include temperature sensors, humidity sensors, acceleration sensors, vibration sensors, shock sensors, pressure sensors, altitude sensors, light sensors, and orientation sensors.

In accordance with the programmatic code stored in its memory, the master node 630 periodically broadcasts advertising packets in the surrounding area. When the peripheral nodes 638, 640 are within range of master node 630, and are operating in a listening mode, the peripheral nodes 638, 640 will extract the address of master node 630 and potentially other information (e.g., security information) from the advertising packets. If, according to their respective programmatic code, the peripheral nodes 638, 640 determine that they are authorized to connect to the master node 630, the peripheral nodes 638, 640 will attempt to pair with the master node 630. In this process, the peripheral nodes 638, 640 and the master node and the peripheral nodes determine each other's identities, capabilities, and services. For example, after successfully establishing a respective communication path 658, 660 with each of the peripheral nodes 638, 640 (e.g., a LoRa formatted communication path), the master node 630 determines certain information about the peripheral nodes 638, 640, such as their identity information (e.g., peripheral nodes), their capabilities (e.g., measuring temperature data), and their services include transmitting temperature data to other nodes.

After establishing LoRa formatted communications paths 658, 660 with the peripheral nodes 638, 640, the master node 630 transmits requests for the peripheral nodes 638, 640 to transmit their measured and/or locally processed temperature data to the master node 630.

In the illustrated embodiment, the master node 630 can determine its own location based on geolocation data transmitted by a satellite-based radio navigation system 666 (e.g., GPS, GLONASS, and NAVSTAR) and received by the GPS receiver 642 component of the master node 630. In an alternative embodiment, the location of the master node 630 can be determined using cellular based navigation techniques that use mobile communication technologies (e.g., GSM, GPRS, CDMA, etc.) to implement one or more cell-based localization techniques. After the master node 630 has ascertained its location, the distance of each of the packages 634, 636 from the master node 630 can be estimated based on the average signal strength of the advertising packets that the master node 630 receives from the respective peripheral node. The master node 630 can then transmit its own location and the locations of the package nodes E, F, and G to a server over a cellular interface connection with a cell tower 672. Other methods of determining the distance of each of the packages 634, 636 from the master node 630, such as Received Signal-Strength Index (RSSI) based indoor localization techniques, also may be used.

In some embodiments, after determining its own location and the locations of the peripheral nodes, the master node 630 reports the location data the collected and optionally processed (e.g., either by the peripheral nodes peripheral nodes 634, 636 or the master node 630) sensor data to a server over a cellular communication path 670 on a cellular network 672.

Figure 10A:
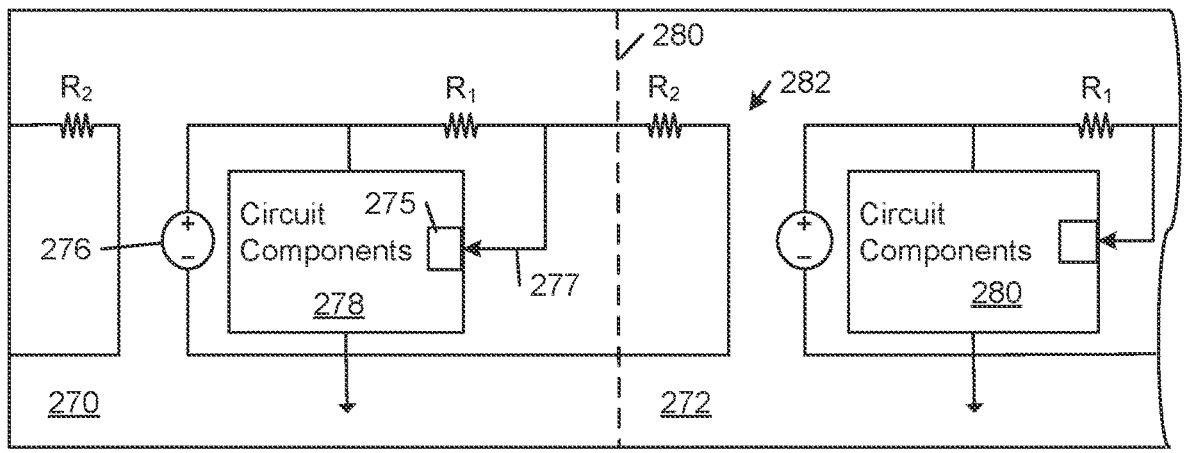
FIGS. 10A-10C are diagrammatic top views of a length of an example tracking adhesive product.

Referring to FIG. 10A, in some examples, each of one or more of the segments 270, 272 of a tracking adhesive product 274 includes a respective circuit 275 that delivers power from the respective energy source 276 to the respective tracking circuit 278 (e.g., a processor and one or more wireless communications circuits) in response to an event. In some of these examples, the wake circuit 275 is configured to transition from an off state to an on state when the voltage on the wake node 277 exceeds a threshold level, at which point the wake circuit transitions to an on state to power-on the segment 270. In the illustrated example, this occurs when the user separates the segment from the tracking adhesive product 274, for example, by cutting across the tracking adhesive product 274 at a designated location (e.g., along a designated cut-line 280). In particular, in its initial, un-cut state, a minimal amount of current flows through the resistors R1 and R2. As a result, the voltage on the wake node 270 remains below the threshold turn-on level. After the user cuts across the tracking adhesive product 274 along the designated cut-line 280, the user creates an open circuit in the loop 282, which pulls the voltage of the wake node above the threshold level and turns on the wake circuit 275. As a result, the voltage across the energy source 276 will appear across the tracking circuit 278 and, thereby, turn on the segment 270. In particular embodiments, the resistance vale of resistor R1 is greater than the resistance value of R2. In some examples, the resistance values of resistors R1 and R2 are selected based on the overall design of the adhesive product system (e.g., the target wake voltage level and a target leakage current).

In some examples, each of one or more of the segments of a tracking adhesive product includes a respective sensor and a respective wake circuit that delivers power from the respective energy source to the respective one or more of the respective tracking components 278 in response to an output of the sensor. In some examples, the respective sensor is a strain sensor that produces a wake signal based on a change in strain in the respective segment. In some of these examples, the strain sensor is affixed to a tracking adhesive product and configured to detect the stretching of the tracking adhesive product segment as the segment is being peeled off a roll or a sheet of the tracking adhesive product. In some examples, the respective sensor is a capacitive sensor that produces a wake signal based on a change in capacitance in the respective segment. In some of these examples, the capacitive sensor is affixed to a tracking adhesive product and configured to detect the separation of the tracking adhesive product segment from a roll or a sheet of the tracking adhesive product. In some examples, the respective sensor is a flex sensor that produces a wake signal based on a change in curvature in the respective segment. In some of these examples, the flex sensor is affixed to a tracking adhesive product and configured to detect bending of the tracking adhesive product segment as the segment is being peeled off a roll or a sheet of the tracking adhesive product. In some examples, the respective sensor is a near field communications sensor that produces a wake signal based on a change in inductance in the respective segment.

Figure 10B:
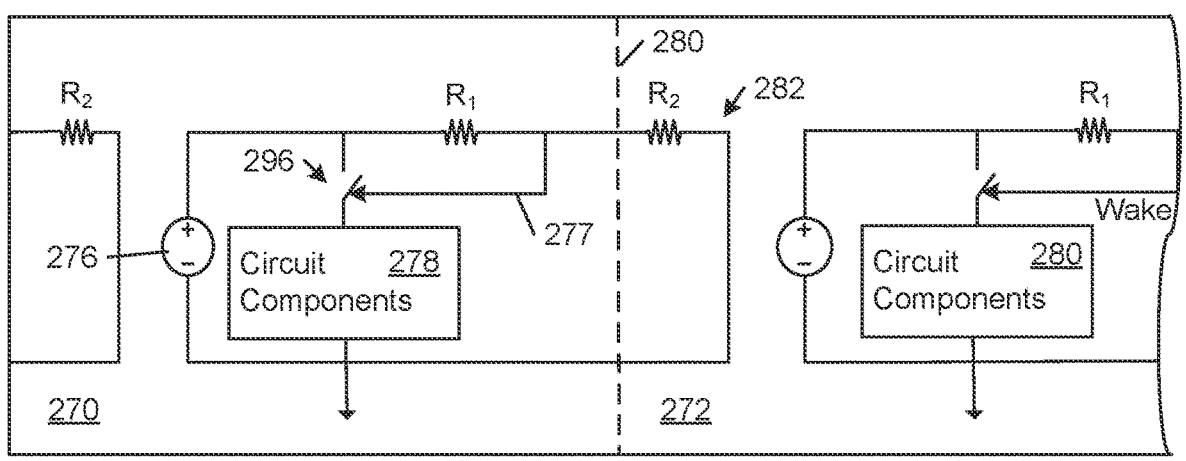

FIG. 10B shows another example of a tracking adhesive product 294 that delivers power from the respective energy source 276 to the respective tracking circuit 278 (e.g., a processor and one or more wireless communications circuits) in response to an event. This example is similar in structure and operation as the tracking adhesive product 294 shown in FIG. 10A, except that the wake circuit 275 is replaced by a switch 296 that is configured to transition from an open state to a closed state when the voltage on the switch node 277 exceeds a threshold level. In the initial state of the tracking adhesive product 294, the voltage on the switch node is below the threshold level as a result of the low current level flowing through the resistors R1 and R2. After the user cuts across the tracking adhesive product 294 along the designated cut-line 280, the user creates an open circuit in the loop 282, which pulls up the voltage on the switch node above the threshold level to close the switch 296 and turn on the tracking circuit 278.

Figure 10C:
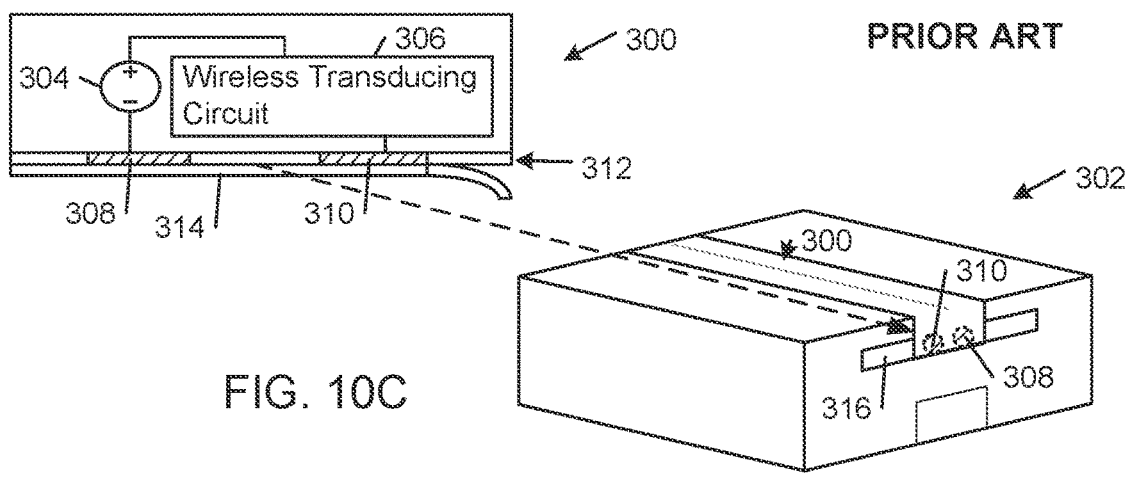

FIG. 10C shows a diagrammatic cross-sectional front view of an example adhesive tape platform 300 and a perspective view of an example asset 302. Instead of activating the adhesive tape platform in response to separating a segment of the adhesive tape platform from a roll or a sheet of the adhesive tape platform, this example is configured to supply power from the energy source 302 to turn on the wireless transducing circuit 306 in response to establishing an electrical connection between two power terminals 308, 310 that are integrated into the adhesive tape platform. In particular, each segment of the adhesive tape platform 300 includes a respective set of embedded tracking components, an adhesive layer 312, and an optional backing sheet 314 with a release coating that prevents the segments from adhering strongly to the backing sheet 314. In some examples, the power terminals 308, 310 are composed of an electrically conductive material (e.g., a metal, such as copper) that may be printed or otherwise patterned and/or deposited on the backside of the adhesive tape platform 300. In operation, the adhesive tape platform can be activated by removing the backing sheet 314 and applying the exposed adhesive layer 312 to a surface that includes an electrically conductive region 316. In the illustrated embodiment, the electrically conductive region 316 is disposed on a portion of the asset 302. When the adhesive backside of the adhesive tape platform 300 is adhered to the asset with the exposed terminals 308, 310 aligned and in contact with the electrically conductive region 316 on the asset 302, an electrical connection is created through the electrically conductive region 316 between the exposed terminals 308, 310 that completes the circuit and turns on the wireless transducing circuit 306. In particular embodiments, the power terminals 308, 310 are electrically connected to any respective nodes of the wireless transducing circuit 306 that would result in the activation of the tracking circuit 306 in response to the creation of an electrical connection between the power terminals 308, 310.

In some examples, after a tape node is turned on, it will communicate with the network service to confirm that the user/operator who is associated with the tape node is an authorized user who has authenticated himself or herself to the network service 54. In these examples, if the tape node cannot confirm that the user/operator is an authorized user, the tape node will turn itself off.

Monitoring Equipment with Wireless Sensor Nodes

Wireless sensor nodes 510, each wireless sensor node 510 including a sensor, are deployed in the sensing system 500 to monitor various components of equipment and objects of interest, according to some embodiments. Some of the wireless sensor nodes 510 may be directly attached or adhered to components of equipment and objects of interest in order to measure properties of the components of equipment and objects of interest.

FIG. 11 shows an example environment 1100 for a fleet of wireless sensor nodes 1105 and wireless nodes 1110A, 1110B, 1115 of the sensing system 500 for generating sensing data on a section of equipment and communicating the sensing data with the sensing system 500, according to some embodiments. The wireless sensor nodes 1105 includes the wireless sensor nodes 1105A-1105H that are each attached to a different component of an equipment 1120. Each of the wireless sensor nodes 1110 includes a sensor incorporated into the wireless sensor node that generates sensing data on the respective component of the equipment 1120. In the example of FIG. 11, the equipment 1120 is a pumping system for moving liquid in a facility. The equipment 1120 includes a first unit 1120A and a second unit 1120B which are attached to each other.

The wireless sensor node 1105A measures a position of a valve of the pumping system 1120 using an accelerometer or position sensor to measure when the valve moves. The wireless sensor node 1105B is attached to a rotational component of the pumping system 1120 internal to the pumping system 1120 and measures the speed of rotation of the rotational component using an accelerometer. The wireless sensor node 1105C includes a temperature sensor and measures the temperature of the pumping system 1120. The wireless sensor node 1105D includes a flow sensor and detects the flow of liquid through a pipe using the flow sensor. The wireless sensor node 1105E includes a vibration sensor and measure vibrations of the first unit 1120A of the pumping system 1120. The wireless sensor node 1105F includes a strain sensor and measures the amount of axle strain that an axle of the pumping system 1120 is experiencing. The wireless sensor node 1105G includes a vibration sensor and measures vibration of the second unit 1120B of the pumping system 1120. The wireless sensor node 1105H includes a sensor for measuring the oil level in an oil tank of the pumping system 1120. The wireless sensing node 1105I includes an electrical current sensor (e.g., a hall effect sensor) for measuring the electrical current flowing through a plug or wire of the pumping system 1120.

The sensing data of each of the wireless sensor nodes 1105 may be used in combination or separately to detect whether or not the equipment 1120 is functioning properly. The wireless sensor nodes 1105 may generate sensing data to determine and learn baseline data when the equipment 1120 is functioning normally. Sensing data detected by the wireless sensor nodes 1105 that deviates from the baseline may signify a malfunctioning of the equipment 1120. The sensing data may be used in combination to detect specific types of malfunctioning or to confirm that the equipment is indeed malfunctioning. In cases where one of the wireless sensor nodes 1105 is generating data that is deviating from the baseline, the other wireless sensor nodes 1105 can be used to confirm whether the equipment 1120 is functioning. For example, the wireless sensor node 1105B may detect a change in the rotational speed of the rotational component of the pumping system 1120. This may signify that the pumping system 1120 is malfunctioning. To confirm whether this is the case, the sensing system 500 compares the sensing data from other wireless nodes 1105. For example, the sensing system 500 may check the wireless sensor node 1105D to see if there is any detected change in liquid flow within a threshold amount of time from the detected change in rotational speed. If not, the sensing system 500 may determine that the data from the wireless sensing node 1105B is an outlier and that the equipment 1120 is still functioning properly. In further embodiments, the sensing system 500 may also determine that the wireless sensor node 1105D is malfunctioning and requires inspection or replacement. The wireless sensing nodes 1105 wirelessly transmit sensing data to a respective unit controller 1110 via a wireless communication interface. The wireless sensing nodes 1105 may selectively transmit sensing data, in response to detecting an event, according to some embodiments. For example, the wireless sensing nodes 1105 may only transmit sensing data to a respective unit controller 1110 when the detected sensing data deviates beyond a threshold amount from the baseline data. Each of the wireless sensing nodes 1105 is associated with a unit controller that is located within a close distance from the respective wireless sensing nodes 1105. In the example of FIG. 11, the wireless sensor nodes 1105A-1105F are associated with and communicate with the unit controller 1110A, and the wireless sensor 1105G-1105I are associated with and communicate with the unit controller 1110B.

The unit controllers 1110 (including unit controller 1110A and 1110B) are wireless nodes attached to and associated with respective units of the equipment 1120 and are configured to provide intelligence (e.g., decision making on when to transmit information to other wireless nodes) for making determinations on whether relevant events have occurred based on sensing data received from the wireless sensor nodes 1105. In case of detecting certain events based on the received sensing data, the unit controllers 1110 may communicate selected sensing data and the detected events to the section controller 1115 which is associated with the entirety of the equipment 1120. The wireless communication channel between the wireless sensing nodes 1105 and the unit controllers 1110 may be a low latency communication channel, according to some embodiments. In further embodiments, the low latency communication channel may be a short distance communication channel, such as the ones described with respect to the low power communication interface 476 in FIG. 7. This provides the ability for a unit controller to synchronously capture sensing data from multiple wireless sensing nodes and detect events in real time based on sensing data from multiple wireless sensing nodes. This is important for capturing events that occur at multiple wireless sensing nodes relatively at the same time. Detecting events occurring within a threshold amount of time from one another allows for accurate reporting of equipment failure or events that may reveal a need for maintenance on the equipment 1120. For example, the threshold amount of time may be 10 ms. If a first anomaly is detected in the sensing data of a first wireless sensing node and a second anomaly is detected in the sensing data of a second wireless sensing node within the threshold amount of time from the first event, the respective unit controller 1110 that receives the sensing data from both the first and the second sensing node may determine that an equipment failure is likely. In response, the respective unit controller 1110 may transmit a report including parts of the sensing data to the section controller 1115. Using conventional systems, where the intelligence for determining events occurs at a server or an edge node requiring longer distance higher latency communication channels, it may be difficult to detect events across multiple wireless sensor nodes with high enough resolution in time to accurately determine equipment failure or other conditions of the equipment 1120. By using low latency communications between the wireless sensor nodes 1105 and the unit controllers 1110 which are placed within a short distance (e.g., less than 10 feet) from the wireless sensor nodes, events and conditions relevant to the equipment 1120 may be detected with higher accuracy.

The section controller 1115 is a wireless node associated with the equipment 1120 and configured to receive communications from the unit controllers 1110. In some embodiments, the section controller is also configured to receive communications directly from one or more of the wireless sensing nodes 1105. The section controller 1115 may provide further intelligence (e.g., decision making on when to transmit information to the sensing system 500) and may transmit sensing data to the sensing system 500 in response to receiving data from one or more of the unit controllers 1110 and detecting certain events based on the received data. In some embodiments, the wireless sensor nodes 1105 are embodiments of the short range tape node 472, the unit controllers 1110 are embodiments of the medium range tape node 474, and the section controller 1115 is an embodiment of the long range tape node 480. In this case, the sensing data may be relayed from the wireless sensor nodes 1105 to servers or other nodes of the sensing system 500 (not shown in FIG. 11) via the section controller 1115. The section controller 1115 may issue instructions to the unit controller, according to some embodiments. The instructions may be relayed from the server, client devices, or other nodes of the sensing system 500. Each unit controller 1110 may also issue instructions to respective wireless sensor nodes that are associated with the unit controller 1110.

FIG. 11 only shows one section of equipment 1120 in a facility. The facility may include multiple instances of the section of equipment 1120 including their own respective wireless sensor nodes 1105, unit controllers 1110, and section controllers 1115. The sensing system allows for simultaneous monitoring of each section of equipment 1120 in the facility. By distributing parts of the computation and intelligence for detecting events based off of the sensing data generated by the wireless sensing nodes 1105 at the wireless sensing nodes 1105 and the wireless nodes 1110 and 1115, the sensing system 500 creates a mesh network of nodes that can detect events with high accuracy and low latency. Distributing the intelligence also aids in conserving battery life for the wireless sensor nodes 1105 and the wireless nodes 1110 and 1115. Compared to a system that continuously transmits data from its nodes, the wireless sensor nodes are configured to selectively transmit data in response to detecting certain events and anomalies based on the generated sensing data. By reducing the amount of transmissions, energy consumption and congestion of the wireless communication airwaves is reduced.

Distributed Intelligent Software

The distributed intelligent software may include rules, protocols, logic, and/or instructions for one or more of the nodes (including wireless sensor nodes and wireless nodes), the central database and control system, and the client devices in various scenarios. The distributed intelligent software instructs the wireless sensor nodes to enter different states based on the rules and based on the sensing data collected by the wireless sensor nodes.

The states may include, but are not limited to the following examples: a low power mode where the tape node operates with minimal power consumption; a low communication mode where the tape node limits the amount of transmitted/received data and/or frequency of transmitting and receiving data; a high communication mode where the tape node increases the amount of transmitted/received data and/or frequency of transmitting and receiving data; a sensing mode in which sensors included in the tape node collect sensor data, and the sensor data is transmitted to members of the sensing system 500; a no-sensing mode in which sensors included in the tape node are deactivated and do not collect sensor data; a low sensing mode which limits the amount of sensor data collected and transmitted (in some embodiments, this includes decreasing the sampling frequency of the sensors and frequency of transmitting the sensor data); a high sensing mode which increases the amount of sensor data collected and transmitted. (in some embodiments, this includes increasing the sampling frequency of the sensors and frequency of transmitting the sensor data); a sensor configuration mode where a configuration or property of a sensor in the tape node is changed; a sensor activation mode where a specific set of sensors in the tape node are activated (e.g., if a tape node has an acoustic sensor, an accelerometer, and an optical sensor, activating the operation of the accelerometer and the acoustic sensor (e.g., in response to the optical sensor detecting an above threshold value)); a search mode where the tape node searches for a client device in proximity of the tape node to communicate with, a heartbeat mode where the tape node intermittently transmits a signal to the central database and control system to indicate normal functionality of the tape node; an alert mode where the tape node transmits an alert to the central database and control system, a client device of a delivery employee (handler), a client device of a customer, a client device of a final recipient, a client device of an administrator, or some combination thereof; a data processing mode where the tape node calculates values (RMS values, peak values, spectrum analysis, fast Fourier transform (FFT) of data, peak frequency, a time stamp, a relative time a value is reached for a measurement, or other calculated values) based on collected sensing data and only transmits the calculated values a spectral band mode where the tape node collects measurements (e.g., vibration data) and/or calculates values in the form of a spectrum (e.g., a frequency spectrum) but only transmits a portion of the spectrum (e.g., data in a frequency band that is smaller than the full range of frequency-domain data that is collected); a full spectrum mode where the tape node node collects measurements (e.g., vibration data) and/ or calculates values in the form of a spectrum (e.g., a range of frequencies, a range of times, etc. . . . ) and transmits the entire spectrum; a full data mode where the tape node transmits all the sensing data that it has collected; a data history mode where the tape node transmits historical sensing data that it has stored in the memory of the tape node; a high fidelity location mode which increases the resolution and accuracy of location data that is collected and transmitted to the central database and control system (in some embodiments, this includes increasing the sampling frequency of location data and/or the frequency of transmitting the location data, and in other embodiments, this includes activating a GPS module on the tape node and collecting GPS-based location data); a low fidelity location mode which reduces the resolution and accuracy of location data that is collected and transmitted to the central database and control system (in some embodiments, this includes decreasing the sampling frequency of location data and/or the frequency of transmitting the location data and in other embodiments, this includes deactivating a GPS module on the tape node and omitting GPS data in the sensing data, while the tape node is in this mode); and an airplane mode where some of the wireless communication is deactivated based on air travel regulation. The states that the tape node can enter may include additional and/or alternate states not listed above. The tape node may be in multiple states simultaneously, according to some embodiments. For example, the tape node may be in both a high sensing mode and a high communication mode, as described above.

FIG. 12 is a flow chart depicting steps implemented, via execution by one or more processors of the adhesive tape platform, central database and control system, client device, or any combination thereof, by the distributed intelligent software, according to some embodiments. The steps 1200 include the adhesive tape platform initiating 1210 in an initial state. The initial 1200 state may be any of the states described above or it may be another state. For example, the adhesive tape platform may initiate in the low communication state. The adhesive tape platform then aggregates and transmits 1220 sensing data according to the protocols of the initial state. The adhesive tape platform may transmit some or all of the sensing data to the central database and control system and/or client devices, based on the protocols of the initial state. Relevant data aggregated by the adhesive tape platform during the aggregation and transmitting step 1220 are stored 1230. The adhesive tape platform may store 1230 the relevant data in its own memory, according to some embodiments. The central database and or control system may store 1230 the relevant data in its database if aggregated data was received from the adhesive tape platform in step 1220, according to some embodiments. Similarly, a client device may store 1230 the aggregated data in its memory if aggregated data was received from the adhesive tape platform in step 1220 and/or if data is transmitted from the central database and control system.

Based on the relevant data and based on the logic defined in the distributed intelligent software, an event is detected 1240. The event indicates that the relevant data satisfies one or more of the rules and/or conditions included in the distributed intelligent software. For example, if the relevant data includes sensor data that vibrations on a tracked item exceed a high threshold, "a high vibration" event may be detected. If no event is detected, the process repeats, starting at step 1220.

The events may include, but are not limited to the following examples: a sensor in the tape node has taken a measurement that is above a threshold value; a sensor in the tape node has taken a measurement that is below a threshold value; a sensor in the tape node has taken a measurement that is below or equal to a high threshold value and above or below a low threshold value; values of sensing data within a frequency band are higher than a threshold value associated with the frequency band; values of sensing data within a frequency band are lower than a threshold value associated with the frequency band, values of sensing data within a frequency band are higher than or equal to a low threshold value and lower than or equal to a high threshold value associated with the frequency band; a sensor in the tape node is unable to take a measurement (e.g., the sensor is malfunctioning); a two-dimensional bar code on the tape node is scanned by a client device; a client device has initiated communication with the tape node; after a period of time has elapsed after a sensor in the tape node has taken a measurement that is above a threshold value the sensor takes another measurement that is also above the threshold value; after a period of time has elapsed after a sensor in the tape node has taken a measurement that is above a threshold value, the sensor takes another measurement that is now below the threshold value; after a period of time has elapsed after a sensor in the tape node has taken a measurement that is below a threshold value; the sensor takes another measurement that is also below the threshold value; after a period of time has elapsed after a sensor in the tape node has taken a measurement that is below a threshold value, the sensor takes another measurement that is now above the threshold value; after a period of time has elapsed after a sensor in the tape node has taken a measurement that is above a first threshold value and below a second threshold value; the sensor takes another measurement that is also above the first threshold value and below the second threshold value; after a period of time has elapsed after a sensor in the tape node has taken a measurement that is above a first threshold value and below a second threshold value the sensor takes another measurement that is now below the first threshold value or above the second threshold value; a location of the tape node is within a threshold proximity of a target location; a specific duration of time has elapsed since a preceding event (e.g., 5 days have passed since the two-dimensional bar code was scanned); stored energy on an energy storage device (e.g., a battery) on the tape node is below a threshold value or above a threshold value; a specific type of sensor (e.g., light sensor) on the tape node detects a measured signal that is above a threshold value or below a threshold value (e.g., a light sensor detects an above threshold presence of light); the tape node receives a communication from another tape node; the tape node receives a configuration file from another tape node, a gateway device, a client device, the central database and control system, or some combination thereof; the tape node receives data indicating that another tape node in proximity to itself has a battery level below a threshold value or above a threshold value; and the tape node detects another tape node in proximity to the tape node.

In response to detecting 1240 the event, execution of the distributed intelligent software causes 1250 the tape node to alter its state. As discussed above, the instructions may be generated by one or more of the tape nodes, generated and transmitted to the tape node by the central database and control system, generated and transmitted to the tape node by the one or more client devices, or some combination thereof. The tape node then enters a state based on the instruction 1250 from the distributed intelligent software. For example, the tape node may enter a high sensing mode, as described above. In some embodiments, the tape node may also exit the initial state based on the instruction 1250 according to the distributed intelligent software.

The distributed intelligent software also instructs 1260 the central database and control system and the one or more client devices to take corresponding actions, in response to detecting 1240 the event. In some embodiments, execution of the distributed intelligent software causes (e.g., instructs) 1260 the central database and control center to take one or more of the following actions, based on the detected event: transmit a notification to a client device, for example an alert; generate and transmit instructions to the tape node (e.g., instructions to alter the state of the tape node); store a log of the detected event; store a log indicating that the tape node has altered its state; store data received from the tape node and/or client devices; transmit sensor data to a client device; and transmit instructions to a client device (e.g., instructions to update a display on the client device). The instructions for the central database and control system may include actions not listed above. The distributed intelligent software may issue multiple instructions simultaneously or sequentially. For example, the central database and control system may receive instructions to both store a log of the detected event and transmit a notification to a client device.

In some embodiments, the distributed intelligent software causes 1260 a client device to take one or more of the following actions, based on the detected event: display a notification on the display of the client device (e.g., an alert); transmit instructions to the tape node (e.g., instructions to alter the state of the tape node); store a log of the detected event in the client device's memory; store a log indicating that the tape node has altered its state in the client device's memory; store data received from the tape node and/or central database and control system in the client device's memory; transmit data to the central database and control system; transmit instructions to the central database and control system. The instructions for client devices may include actions not listed above. The distributed intelligent software may issue multiple instructions simultaneously or sequentially. For example, the client device may receive instructions to both store a log of the detected event and display a notification on the display of the client device.

Figure 14:
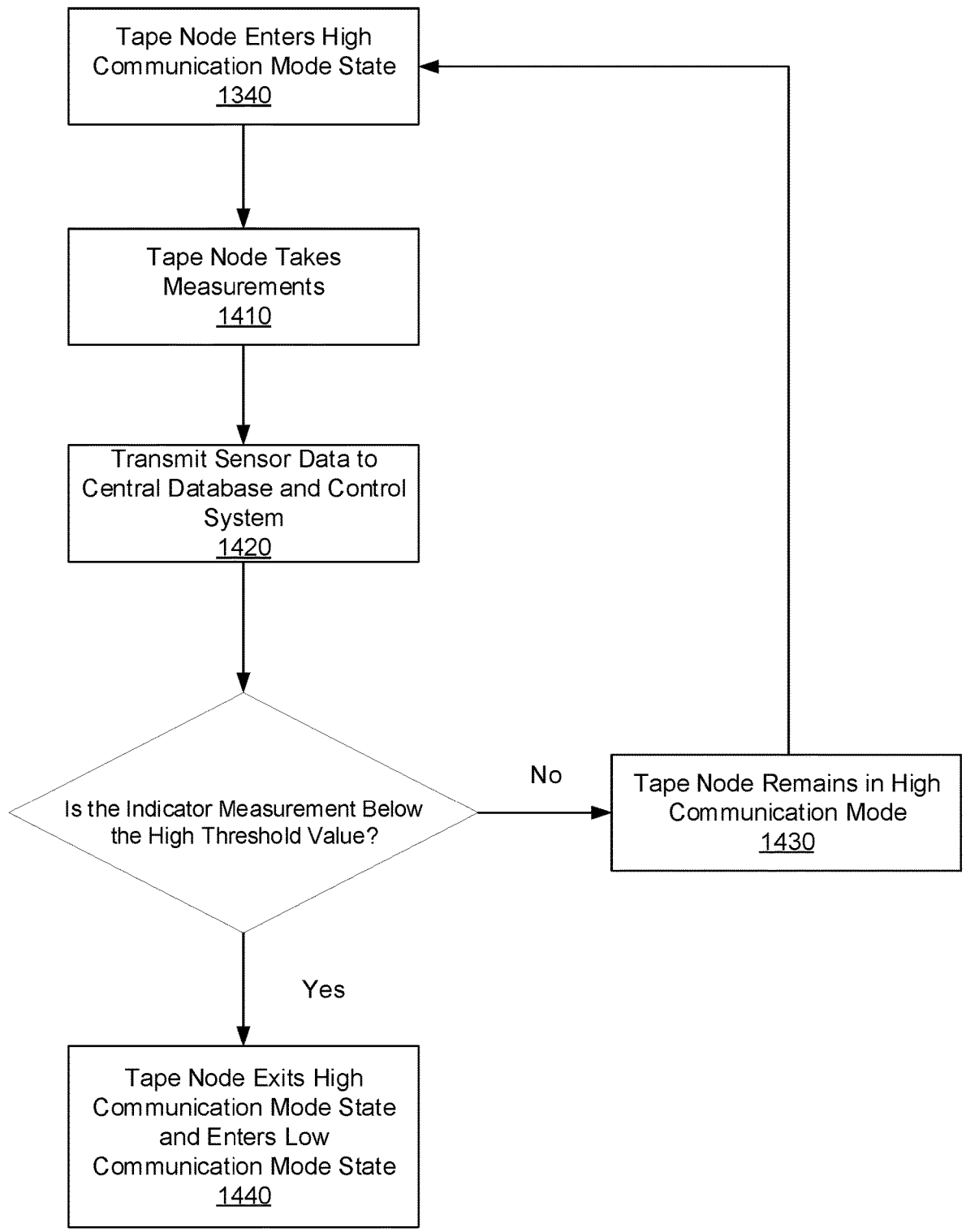
FIG. 14 is a flowchart showing example steps executed continuing from step in FIG. 13 after the tape node enters the high communication mode, according to the distributed intelligent software, according to some embodiments.

FIGS. 13 and 14 are flowcharts showing example steps executed according to the distributed intelligent software. In the example in FIGS. 13 and 14, an indicator measurement is included in the sensor data collected using one or more sensors of a tape node (e.g., tape node 510). For example, a tape node 510 including a pressure sensor may be adhered to an asset, and the indicator measurement is the pressure sensed by the pressure sensor. The event being detected in the example of FIGS. 13 and 14 is the indicator measurement being above a high threshold value. The high threshold value is a parameter of the distributed intelligent software that is relevant to the object being monitored. In some cases, the high threshold value is set by a human operator or administrator of the sensing system 500. In other cases, the high threshold value may be set by a machine learning model. For example, the high threshold value may be a parameter that is determined during training of the machine learning model.

FIG. 13 is a flowchart showing example steps executed according to the distributed intelligent software. The tape node 510 enters 1310 a low communication mode state. The tape node may enter 1310 a low communication mode state when the tape node is initiated based on the distributed intelligent software, according to some embodiments. The tape node takes measurements 1320 using one or more sensors on the sensor device. The measurements are aggregated as sensor data. The sensor data includes an indicator measurement, where the indicator measurement is relevant to an object that the sensor device is monitoring. For example, the indicator measurement may be a peak frequency of vibrations monitored by a vibration sensor in the tape node 510. Some or all of the sensor data may be stored on the memory 513 of the tape node 510. In some embodiments, some or all of the sensor data is transmitted to the central database and communication system 520 and/or one or more client devices 530 each of which may store the sensor data in the database 522 or the memory 432, respectively.

In the low communication mode, the tape node 510 has limited communications with the central database and control system 520. In this example, the tape node 510 does not transmit all of the sensor data collected. Of the sensor data, the tape node 510 only transmits the indicator measurement to the central database and control system 520. The tape node 510 transmits data to the central database and control system at a low frequency (e.g., the tape node 510 transmits the indicator measurement every 5 hours). In other embodiments, the tape node enters additional and/or different state in step 1310.

After step 1320, if the indicator measurement is higher than or equal to a high threshold value, the tape node 510 executes instructions to alter its state, according to the distributed intelligent software. In this example, the tape node 510 exits the low communication mode state and enters a high communication mode state 1340 according to the distributed intelligent software. In some embodiments, the logic of the distributed intelligent software including the high threshold value is stored on the memory 513 of the tape node 510, and the tape node 510 determines if the indicator measurement is above the high threshold value. In this case, the tape node 510 generates the instructions to alter its state according to the distributed intelligent software. In other embodiments, the tape node 510 transmits the indicator measurement to the central database and control system 520, and the central database and control system 520 determines if the indicator measurement is above the high threshold value. In response to determining that the indicator measurement is above the high threshold, the central database and control system 520 generates and transmits the instructions to the tape node 510 to exit the low communication mode state and enter the high communication mode state 1340, according to the distributed intelligent software. Implementing and generating instructions at the tape node, the distributed intelligent software provides the advantage that fewer communication transmissions are necessary. This reduces battery drain on the tape node because it is not transmitting data to, and receiving data from, the central database and control system. Furthermore, this increases the scalability of many tape nodes because it reduces bandwidth used by the central database and control system. In other embodiments, the tape node 510 transmits the indicator measurement to a client device 530, and the client device 530 determines if the indicator measurement is above the high threshold value. In response to determining that the indicator measurement is above the high threshold value, the client device 530 then transmits instructions to the tape node 510 to exit the low communication mode state and enter the high communication mode state 1340, according to the distributed intelligent software. Additional steps executed after the tape nod 510 enters the high communication mode 1340 are discussed below, with respect to FIG. 14.

In the high communication mode, the tape node 510 transmits a higher volume of data than in the low communication mode. The tape node 510 may also transmit data more frequently in the high communication mode than in the low communication mode (e.g., the tape node transmits data every 5 seconds). In this example, the tape node 510 transmits all of the sensor data it is collecting to the central database and control system 520, rather than just the indicator measurement. In other embodiments, the tape node enters additional and/or different states than the high communication mode in step 1340.

After step 1320, if the indicator measurement is below the high threshold value, the tape node 510 remains 1350 in the low communication mode state. The tape node 510 proceeds to transmit 1360 sensor data to the central database and communication system 520 and the client device 530 according to protocols of the low communication mode. The process is then repeated starting at step 1320.

As discussed above, in the example described with respect to FIGS. 6 and 13, battery life may be extended without compromising the ability to detect certain events or violations by using the distributed intelligent software to control aspects of the tape nodes' functions. In other embodiments, the distributed intelligent software provides the benefit of improved detection of the violations. For example, entering the high communication mode and a high sensing mode (where the sampling rate of the sensors in the tape nodes is increased) may improve the ability for the sensing system to detect anomalous behavior in the assets being monitored by providing more granular data to users and/or the central database and control system.

FIG. 14 is a flowchart showing example steps executed continuing from step 1340 in FIG. 13 after the tape node 510 enters the high communication mode, according to the distributed intelligent software. The steps of FIG. 14 may also be implemented without implementing the steps of FIG. 13. In response to the indicator measurement being above the high threshold value, the tape node is instructed to enter 1340 the high communication mode state, according to the distributed intelligent software. The tape node 510 proceeds to take measurements 1410 using its one or more sensors. In some embodiments, the tape node 510 also enters a high sensing mode state at step 1340, and the tape node 510 takes measurements 1410 at a higher sampling rate than in its initial state.

Following the high communication mode protocol, the tape node 510 transmits 1420 the sensor data that it collects in step 1410 to the central database and control system 520. The indicator measurement is included in the sensor data. If the indicator measurement included in the measurements collected in steep 1320 is higher than or equal to the high threshold value, the tape node remains 1430 in the high communication mode. The process then repeats starting from step 1340.

If the indicator measurement is below the high threshold value, the central database and control system 520 generates instructions to alter the state of the tape node 510 and transmits the instructions to the tape node 510, according to the distributed intelligent software. In other embodiments, the tape node 510 generates the instructions and executes them without needing to communicate with the central database and control system 520. In other embodiments, a client device 530 generates and transmits the instructions. In this example, the tape node exits the high communication mode and enters the low communication mode state 1440. The tape node then begins the process shown in FIG. 13, starting at step 1320.

Although FIGS. 13 and 14 only show steps in relation to a single high threshold, the distributed intelligent software may consider multiple thresholds when instructing the adhesive tape platform 510, the central database and control system 520, and the one or more client devices 530. For example, in the process shown in FIG. 14, the distributed intelligent software may include instructions to alter the state of the tape node 510 in the high communication mode in response to the indicator measurement being higher than a second high threshold.

Vibration and Temperature Monitoring

The adhesive tape platform 510 may be used in some applications for vibration and temperature monitoring, according to some embodiments. In this case, a tape node may include at least one of a vibration sensor and a temperatures sensor. In some embodiments, each tape node includes both a vibration sensor and a temperature sensor. In other embodiments, a first tape node including a vibration sensor is used to measure vibrations, and a second tape node including a temperature sensor is used to measure temperature. The first tape node and second tape node may be installed on an item of interest in proximity to each other, in some examples. In other examples, the first tape node and the second tape node may be installed at different positions on the item of interest.

Figure 15:
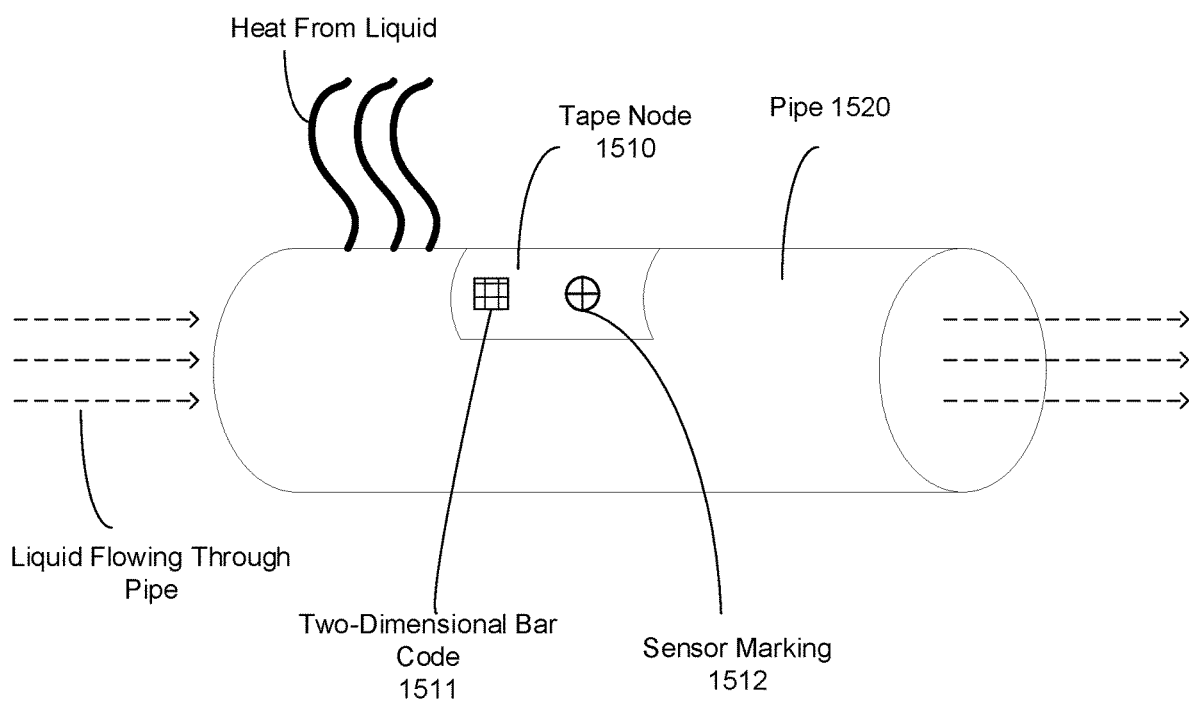
FIG. 15 shows an example of a tape node being used for vibration and temperature sensing, according to some embodiments.

FIG. 15 shows an example of a tape node being used for vibration and temperature sensing. In the example of FIG. 15, the tape node 1510 is adhered to a section of a pipe 1520 that has a liquid flowing through it. The embodiment of FIG. 15 may also apply equally for gas flowing through the pipe 1520. The liquid may be hot or may transfer heat to the pipe, in some cases. The vibration of the section of the pipe 1520 is monitored in order to determine a flow rate of the liquid flowing through the pipe 810, in some embodiments. In some cases, the vibration monitoring may be used to determine additional and/or alternate properties besides flow rate of a liquid through the pipe 610.

The tape node 1510 is an embodiment of the segment 102 of the adhesive tape platform 100. A non-adhesive side of the tape node 1510 is shown in FIG. 15, including a two-dimensional bar code 1511 that appears on the adhesive side of the tape node 1510 and a sensor marking 1512 that also appears on the non-adhesive side of the tape node 1510. The sensor marking 1512 indicates the position of one or more sensors that are included in the tape node 1510, according to some embodiments. In other embodiments, the tape node 1510 does not include the sensor marking 1512.

In the example shown in FIG. 15, the tape node 1510 includes at least one vibration sensor and at least one temperature sensor. In other embodiments, the tape node 1510 includes different configurations of sensors, types of sensors, number of sensors, or some combination thereof. For example, the tape node 1510 may only include a vibration sensor for applications where only vibration sensing is relevant. In another example, the tape node 1510 includes a vibration sensor for vibration sensing and another tape node including a temperature sensor is adhered at a different position on the section of the pipe 1520 for temperature sensing. In other embodiments, other configurations of tape nodes may be used, including a different number of tape nodes, different placements of the tape nodes, different types of tape nodes, or some combinations thereof.

The tape node 1510 wirelessly transmits sensing data collected by its sensors, including data on the vibrations and temperature of the pipe 1520, to an associated embodiment of the central database and control system 520. In some embodiments, the tape node 1510 also transmits sensing data to one or more client devices. An embodiment of a client device 530 may be used to scan the two-dimensional bar code 1511. This may be done to register the tape node 1510 in a log or database, initialize the tape node 1510, pair the tape node 1510 with the client device, for other functions, or some combination thereof.

The tape node 1510 measures vibrations of the section of the pipe 1520 using a vibration sensor, according to some embodiments. The vibration sensor may use one or more of the following sensors to measure vibrations: an accelerometer (piezoelectric-based accelerometer, capacitive-based accelerometer, piezoresistive accelerometer, MEMS-based accelerometer, MEMS resonator-based accelerometer); a strain sensor; a velocity sensor; a microphone or acoustic pressure sensor; an Optical or laser-based sensor; a capacitive sensor or another sensor configured to detect vibrations. Vibration may be monitored using vibration sensing data including acceleration data, velocity data, displacement data, acoustic pressure (e.g., audio) data, other data relevant to calculating the vibration, or some combination thereof.

Figure 16:
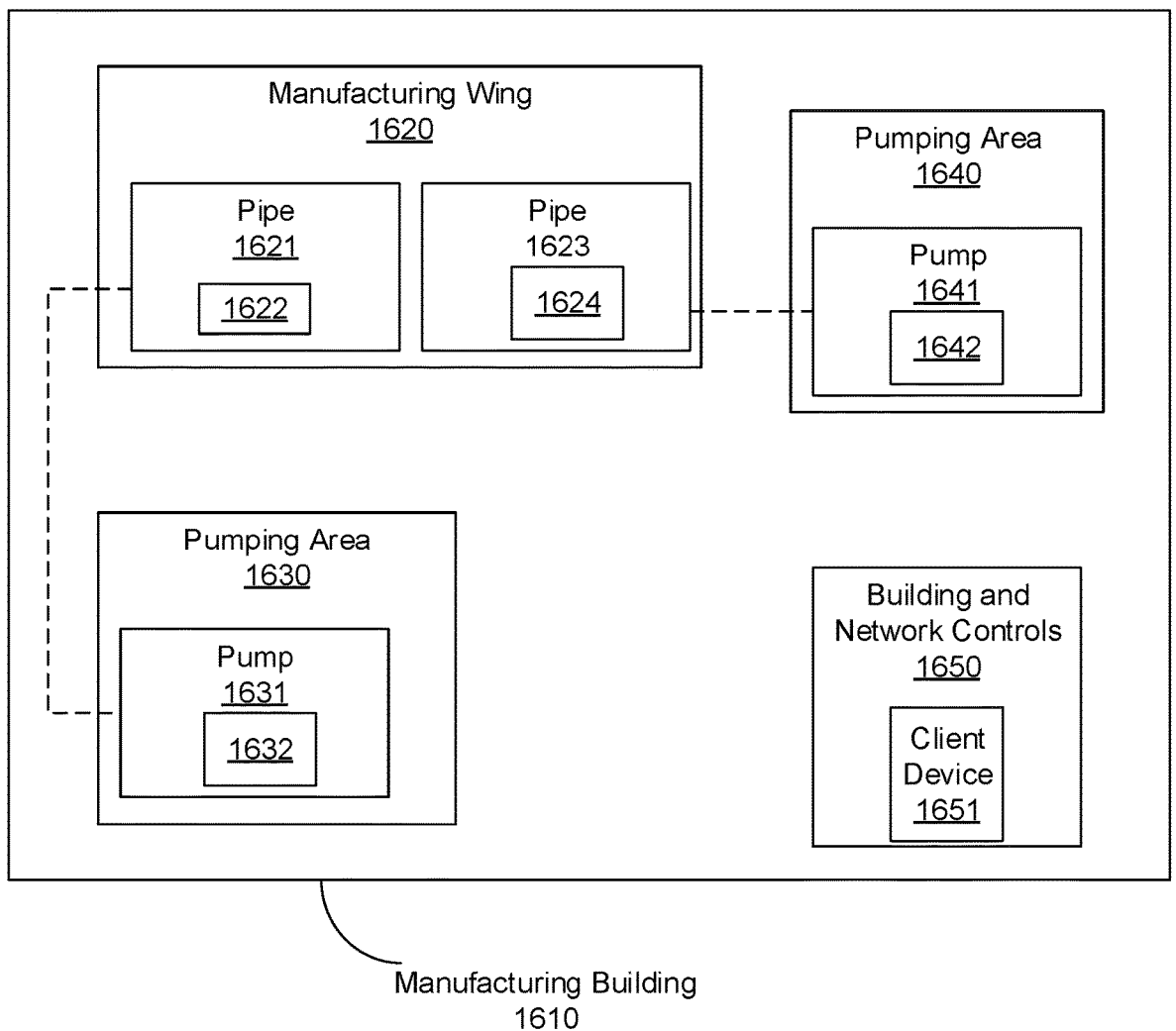
FIG. 16 is a block diagram illustrating an example where multiple tape nodes are used to monitor various items at different locations in a manufacturing building and collect sensor data on the items in a manufacturing building, according to some embodiments.
Figure 21:
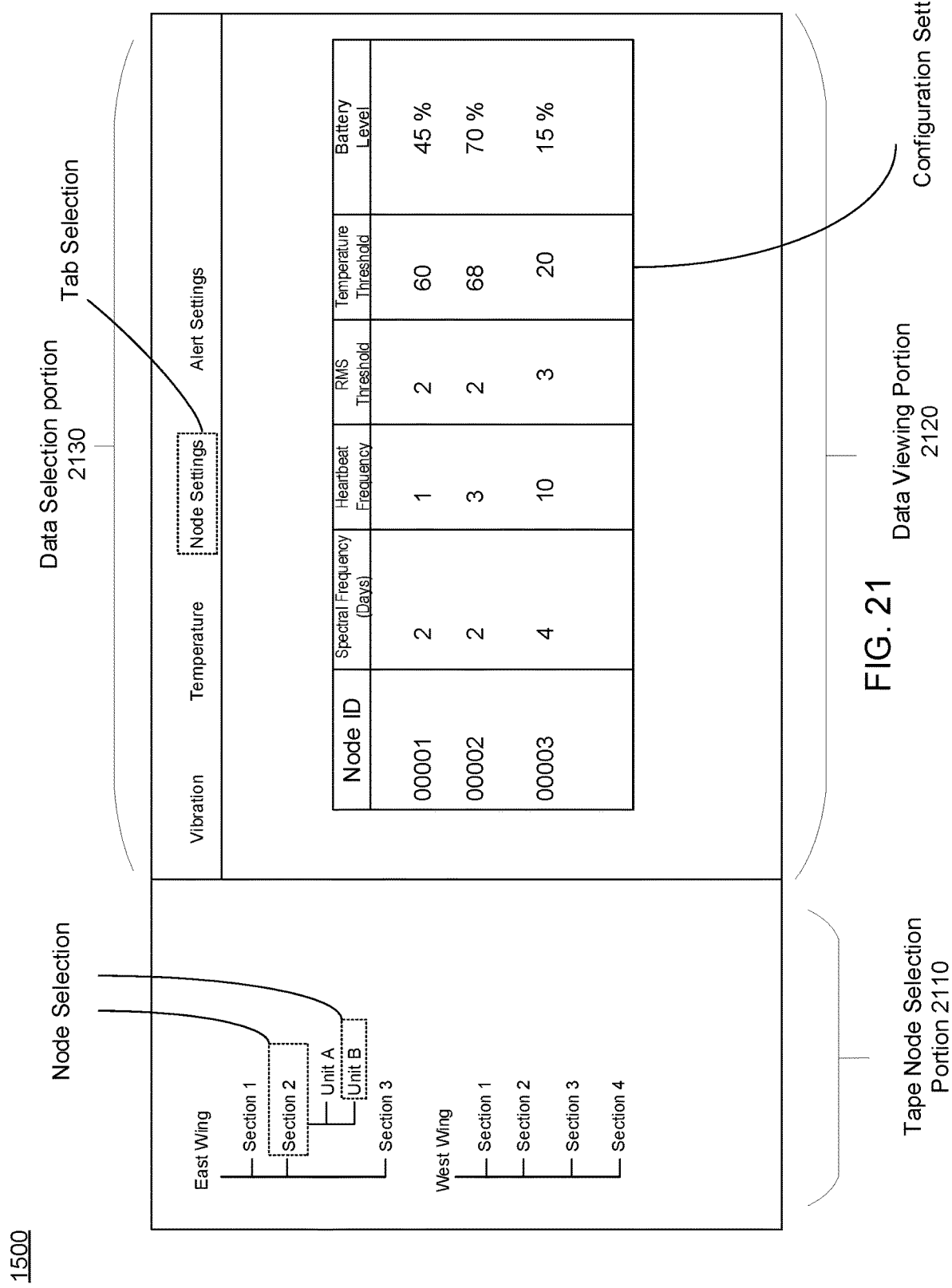
FIG. 21 is an example user interface for displaying information (e.g., properties and settings of the tape node) and sensor data received from a tape node, according to some embodiments.

FIG. 16 is a block diagram 1600 illustrating an example where multiple tape nodes are used to monitor various items at different locations in a manufacturing building 1610 and collect sensor data on the items in a manufacturing building, according to some embodiments. The locations in the manufacturing building 1610 include a manufacturing wing 1620, a pumping area 1630, a pumping Area 1640, and a building and network controls area 1650. In this example, the manufacturing wing 1620 is an area where the flow rate (using vibration measurements) of liquid through pipes and the temperature of the liquid is being monitored using multiple tape nodes, as shown in FIG. 21. In some cases, the vibration monitoring may be used to determine other properties than flow rate of a liquid.

The manufacturing wing 1620 includes a section of a pipe 1621 that has its vibrations and temperature monitored with a tape node 1622. The manufacturing wing 1620 includes another section of a pipe 1623 that is being monitored with another tape node 1624. The liquid flowing through the pipe 1621 may be the same or different from the liquid flowing through the pipe 1623.

The adhesive tape platform is used for safety reasons, according to some embodiments. For example, if the flow rate or the temperature of a liquid through pipe 1621 or pipe 1623 is too high, it may create an unsafe condition in the manufacturing wing 1620. In other cases, the adhesive tape platform is used to measure performance. For example, if the flow rate or the temperature of a liquid through pipe 1621 or 1623 is too low, it may cause lower efficiency of tools in the manufacturing wing.

The pumping area 1630 includes a pump 1631 connected to the pipe 1621. The pump 1631 controls the flow of the liquid flowing through the pipe 1621. For example, the pump 1631 may control a pressure in the pipe 1621 that moves liquid into the pipe 1621. The pumping area 1630 is in a separate location from the manufacturing wing 1620. A tape node 1632 is used to monitor vibrations and temperature of the pump 1631. For example, the tape node 1632 may be adhered to a surface of the pump 1631.

The pumping area 1640 includes a pump 1641 connected to the pipe 1623. The pump 1641 controls the flow of the liquid flowing through the pipe 1623. For example, the pump 1641 may control a pressure in the pipe 1623 that moves liquid into the pipe 1623. The pumping area 1630 is in a separate location from the manufacturing wing 1620 and the pumping area 1630. A tape node 1642 is used to monitor vibrations and temperature of the pump 1641. For example, the tape node 1642 may be adhered to a surface of the pump 1641.

The building and network controls area 1650 is an area used for the management of tools, operations, personnel, processes, and other functions of the manufacturing building 1610. The building and network controls may be an area where a floor manager or some other human operator oversees the operations of the manufacturing building 1610. The building and network controls area 1650 includes at least one client device 1651 that is used to communicate with the tape nodes, 1622, 1624, 1632, 1642, controls for the pump 1631, controls for the pump 1641, and the associated central database and control system 520. The client device 1651 may also communicate with other client devices, tools, machinery, or other devices in the manufacturing building 1610. The client device 1651 is an embodiment of the client device 530.

The tape nodes 1621, 1624, 1632, 1642 are embodiments of the tape node 1510, and each of the tape nodes 1621, 1624, 1632, 1642 includes at least one vibration sensor and at least one temperature sensor, according to some embodiments.

The distributed intelligent software includes logic and instructions for the operations of the tape nodes 1621, 1624, 1632, 1642, the client device 1651, and the associated central database and control system 520. The distributed intelligent software may be customized with parameters and protocols (e.g., threshold values, emergency protocols) that are specific to the applications where the sensing system 500 is being used. For example, the distributed intelligent software may be customized by a user inputting parameters and protocols relevant to the sensing system to the central database and control system using a client device. The central database and control system may then distribute configuration settings (e.g., a configuration file) to the tape nodes which include the customized parameters and protocols. In some examples, the central database and control system does not need to provide the configuration settings to all of the tape nodes, and the tape nodes that already have the configuration settings can transmit configuration settings relevant to the distributed intelligent software to other tape nodes. In other embodiments, the tape nodes may receive configuration settings from a client device. For example, the client device may transmit configuration settings to a tape node when the client device scans the two-dimensional barcode on the tape node. An example of a procedure executed by the sensing system 500 deployed in the manufacturing building 1610 according to the distributed intelligent software is discussed below with respect to FIG. 17.

Figure 17:
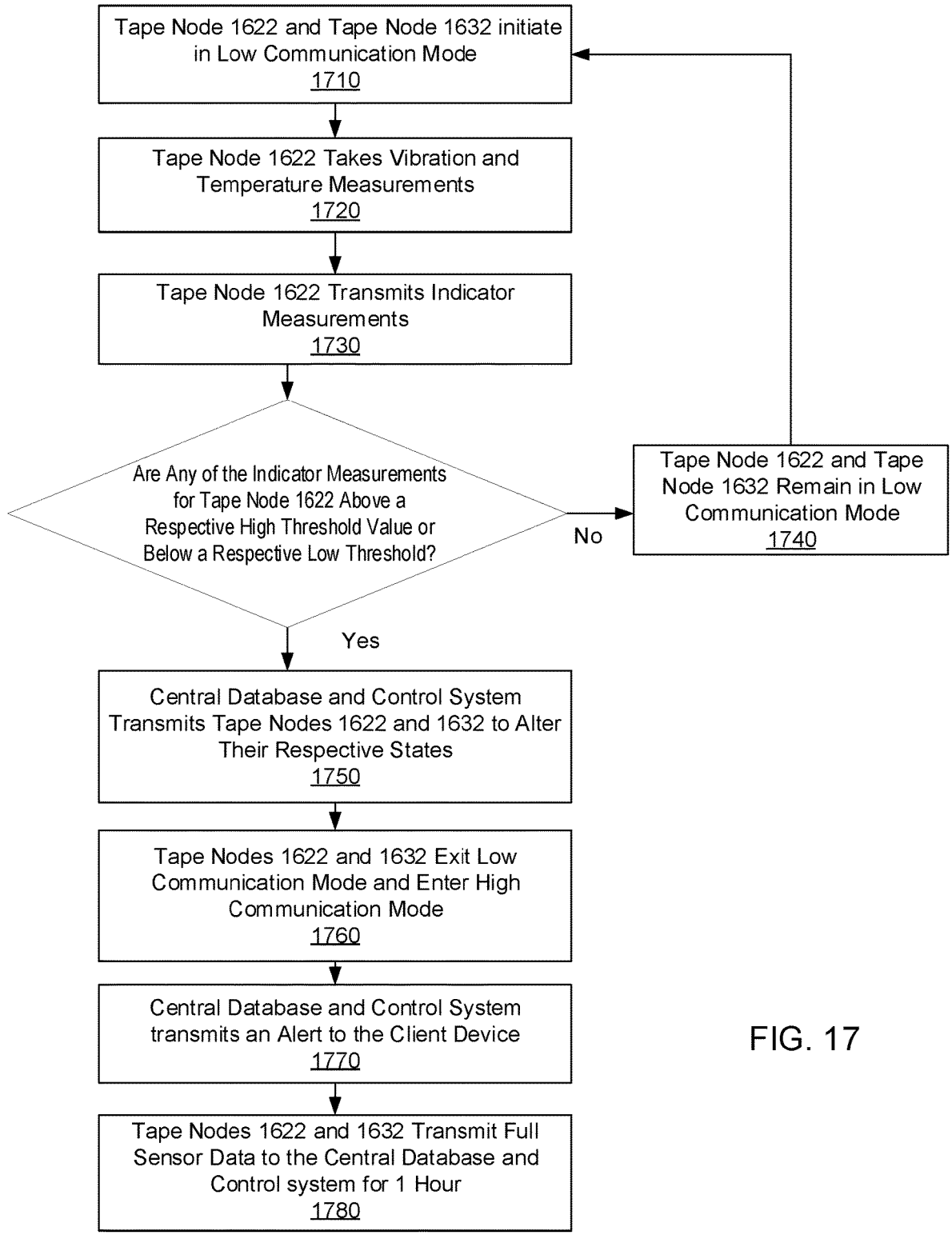
FIG. 17 is a flow chart showing example steps executed according to the distributed intelligent software by components of the sensing system deployed in the manufacturing building shown in FIG. 16, according to some embodiments.

FIG. 17 is a flow chart showing example steps executed according to the distributed intelligent software by components of the sensing system deployed in the manufacturing building 1610 shown in FIG. 16. The example of FIG. 17 involves the tape node 1622 which monitors the vibrations and temperature of pipe 1621 and the tape node 1632 which monitors the vibrations and temperature of pipe 1631. The steps shown in FIG. 17 may similarly apply to the tape node 1624 which monitors the vibrations and temperature of pipe 1623 and the tape node 1642 which monitors the vibrations and temperature of the pump 1641. The steps in FIG. 17 illustrate one example of the logic and protocols included in the distributed intelligent software for the example application of monitoring in the manufacturing building 1610, but the distributed intelligent software and its applications are not limited thereto.

The tape node 1622 and the tape node 1632 initiate in the low communication mode state. In one example of FIG. 17, a client device scans a bar code on each of the tape nodes 1622 and 1632 upon installation of the tape nodes on the respective pipes 1621, 1622. The client device, another tape node, a gateway device, an associated central database and control system, another source, or some combination thereof transmits configuration settings to the tape node 1622 and 1632 to provision the tape nodes to a given task. The provisioning may include downloading certain instructions and logic to the tape node, the client device, and/or the central database and control system to implement a given distributed intelligent software logic for the associated task of the provisioned tape node. For example, the configuration settings may be part of a configuration file that is transmitted to the tape nodes 1622 and 1632. The configuration file may include programs and software instructions, including those part of the distributed intelligent software. After provisioning, the tape nodes may operate according to the intelligent software to control data capture and communication steps as discussed herein.

In the low communication mode, the tape node 1622 and the tape node 1632 limit the communication they perform with the associated central database and control system 520. The tape nodes 1622, 1632 each collect a full range of vibration and temperature sensor data. In this example, the full range of vibration and temperature sensor data include a frequency spectrum (e.g., velocity/acceleration/energy/amplitude values over a range of frequencies) calculated for the vibration measurements by performing a fast Fourier transform (FFT) on the vibration sensor data. The tape nodes 1622, 1632 only transmit a set of indicator measurements in the low communication mode to the central database and control system 520, instead of the full range of vibration and temperature sensor data. The indicator measurements include select FFT frequency-domain values at three indicator frequencies (100 Hz, 1 kHz, and 12 kHz). Each FFT frequency-domain value indicates a component of the vibrations measured that occurs at the corresponding frequency. In other examples, the indicator measurements include additional or alternate FFT frequency-domain values at other frequencies. The indicator measurements also include the current temperature sensed by the respective temperature sensor in the sensor node. In the low communication mode, the indicator measurements are transmitted to the central database and control system 520 at a low frequency (e.g., each tape node transmits the indicator measurements every 1 hour).

The tape node 1622 takes vibration and temperature measurements 1720. Some or all of the sensor data collected by the tape nodes may be stored on the memory of the tape node 1622. The tape node 1622 calculates a frequency spectrum of the vibrations by performing a FFT of the vibration data collected. In some embodiments, the tape node 1622 stores the full frequency spectrum in its memory.

In other embodiments, the tape node 1622 only stores the select FFT frequency-domain values at the three indicator frequencies.

The tape node 1622 transmits the indicator measurements to the central database and control system according to the protocol of the low communication mode. If each of the indicator measurements received by the central database and control system 520 from the tape node 1622 are above or equal to a respective low threshold value and below or equal to a respective high threshold value (i.e., in a moderate range), the tape node 1622 and the tape node 1632 remain 1740 in the low communication mode, according to the distributed intelligent software. The process then repeats, starting from step 1710. Each indicator measurement may have a corresponding high threshold and low threshold, according to some embodiments. In some embodiments, some of the indicator measurements only have a high threshold or a low threshold. For example, the select FFT frequency-domain values at the three frequencies may each have a corresponding high threshold and low threshold, whereas the temperature measurements included in the indicator measurements only has a high threshold. In this case, the tape node 1622 and the tape node 1632 only remain in the low communication mode 1740 if each of the select FFT frequency-domain values are below or equal to the corresponding high threshold and above or equal to the corresponding low threshold and if the temperature measurement is below or equal to the corresponding high threshold.

If any of the indicator measurements received by the central database and control system 520 from tape node 1622 is above a respective high threshold value or below a respective low threshold value, the central database and control system 520 transmits 1750 respective instructions to the tape node 1622 and the tape node 1632 to alter their respective states. The tape node 1622 executes the received instructions, exiting the low communication mode and entering a high communication mode, and the tape node 1632 likewise executes the received instructions, exiting the low communication mode and entering the high communication mode 1760. In this example, the tape node 1622 and the tape node 1632 receive the same instructions and both enter the high communication mode. In other embodiments, the tape node 1632 receives different instructions from the tape node 1622 and enters a different state from the tape node 1622. For example, the tape node 1632 may enter a high sensing mode, while the tape node 1622 enters the high communication mode.

In certain embodiments, steps 1730-1760 are all implemented on a tape node, a gateway device, or some combination thereof, and any instructions discussed above sent from the central database and control system are sent from the tape node, instead. Accordingly, this allows for the tape node to act autonomously, without requiring additional data communication to and from the central database.

The central database (or the tape node or gateway) then transmits 1770 an alert to the client device 1651. The alert to the client device 1651 may be displayed on a display associated with the client device 1651. The alert may notify a human operator of the indicator measurements that are above a respective high threshold or below a respective low threshold. For example, the alert may be displayed on the client device 1651 that indicates that the magnitude of vibrations (according to the selected FFT value) at 1 kHz is above a high threshold for 1 kHz vibrations.

In the high communication mode, the tape node 1622 and the tape node 1632 each transmits 1780 its full range of sensor data (also referred to herein as the "full sensor data") collected to the central database and control system 520 for an hour. The full sensor data may include all of the sensor data collected by the vibration sensor and the temperature sensor in each of the tape node 1622 and the tape node 1632. The full sensor data includes the frequency spectrum of the vibrations for each of the tape nodes 1622, 1623, according to some embodiments. While in the high communication mode, the tape node 1622 and the tape node 1632 each transmits the full sensor data more frequently (e.g., every 5 seconds) than the low frequency of transmission (e.g., every 1 hour) of the indication measurements in the low communication mode.

The full sensor data received by the central database and control system 520 may be stored on the database 522. Further calculations may be performed on the stored data by the application engine 521. The full sensor data is transmitted from the central database and control system 520 to the client device 1651, and the client device 1651 stores the full sensor data in its memory. The client device 1651 displays the full sensor data on its display, for example, for a user to view. The full sensor data may be displayed to a human operator in the building and network controls area 1650, who may make a decision based on the full sensor data. For example, if the vibration and temperature data collected by tape node 1632 indicates that the pump 1631 is functioning incorrectly, the human operator may deactivate the pump using an emergency shutoff. In some embodiments, the emergency shutoff is engaged using the client device 1651. In other embodiments, the client device 1651 automatically engages the emergency shutoff, in response to detecting that the vibration and temperature data collected by the tape node 1632 correspond to a malfunctioning of the pump 1631. In some embodiments, if any of the indicator measurements that the central database and control system 520 from the tape node 1622 are above a second high threshold (value greater than the high threshold value), the client device 1651 is instructed to deactivate the pump using an emergency shutoff.

After an hour of the tape nodes 1622, 1632 transmitting 1780 the full sensor data in the high communication mode, if any of the indicator measurements received from the tape node 1622 or by the tape node 1632 are still above the respective high threshold or below the respective low threshold, the tape nodes 1622, 1632 remain in the high communication mode. This is repeated until the indicator measurements are all below or equal to their respective high threshold and above or equal to their respective low threshold, according to some embodiments. If all of the indicator measurements received from the tape node 1622 and by the tape node 1632 are below their respective high threshold value and above their respective low threshold after step 1780, the tape node 1622 and the tape node 1632 each exit the high communication mode and return to the low communication mode. The process then repeats, starting at step 1710.

Although only the indicator measurements for the tape node 1622 are used to decide whether to proceed from step 1730 to step 1740 or step 1750 in the example of FIG. 17, in other examples, the indicator measurements for the tape node 1632 may be considered.

Figure 18:
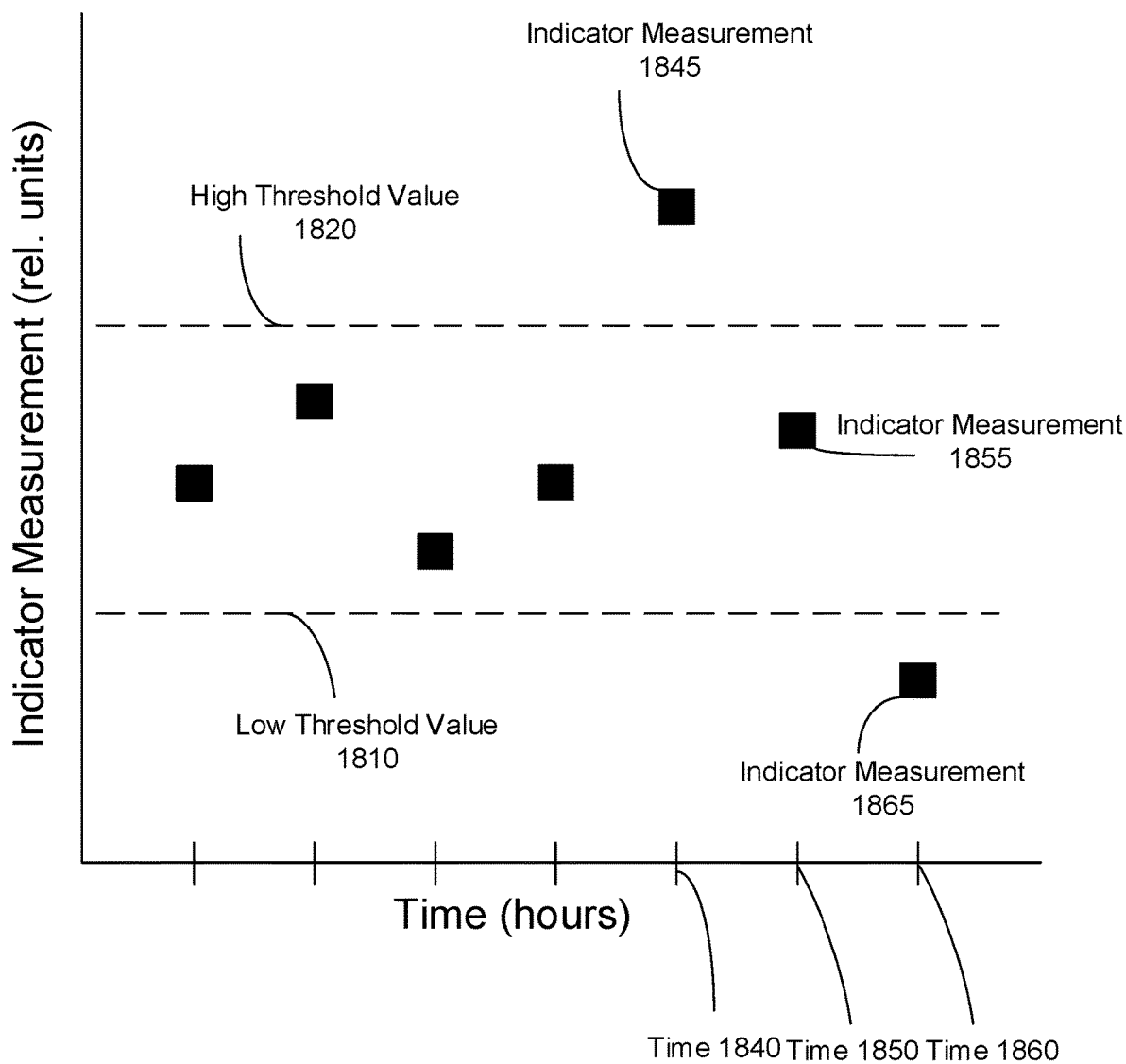
FIG. 18 shows an example plot of an indicator measurement collected at various times by the tape node in the example discussed with respect to FIGS. 16 and 17, according to some embodiments.

FIG. 18 shows an example plot 1800 of an indicator measurement collected at various times by the tape node 1622 in the example discussed with respect to FIGS. 16 and 17. Each indicator measurement shown in the example plot 1800 is a measurement collected by a sensor in the tape node 1622 or a data value calculated based on the collected measurement. For example, each of the indicator measurements shown in the example plot 1800 may be a temperature measurement or a selected FFT frequency-domain values corresponding to the 1 kHz frequency.

The example plot 1800 shows 7 indicator measurements taken over a time period of 7 hours, with a one hour interval between each measurement. Although only 7 indicator measurements are shown, the tape node 1622 may take more than 7 indicator measurements in the time period shown. The example plot 1800 shows the relative values of the low threshold value 1810 and the high threshold value 1820 as corresponding to the indicator measurements. Each threshold value is indicated by a respective dotted line. The first four indicator measurements shown in the example plot 1800 (corresponding to the first four hours shown in the example plot 1800) are in the moderate range, each having a value below or equal to the high threshold value 1820 and above or equal to the low threshold. During the period (before time 1840) when the first four measurements are taken, the tape node 1622 is in the low communication mode according to the distributed intelligent software, corresponding to steps 1710 to 1740 of FIG. 17.

At time 1840, the tape node 1622 collects the indicator measurement 1845 which has a value higher than the high threshold value 1820. Execution of the instructions of the distributed intelligent software causes the tape node to enter the high communication mode, and execute steps 1750 to 1780 in FIG. 17. At time 1850 after an hour has passed from the time 1840 when the tape node 1622 enters the high communication mode, the tape node 1622 collects the indicator measurement 1855 which is in the moderate range. Further execution of the instructions of the distributed intelligent software causes the tape node 1622 to exit the high communication mode and re-enter the low communication mode at time 1850.

At time 1860, the tape node 1622 collects the indicator measurement 1865 which has a value lower than the low threshold value 1810. Further execution of instructions of the distributed intelligent software causes the tape node 1622 to exit the low communication mode and enter the high communication mode at time 1860. The steps 1750 to 1780 in FIG. 17 are then executed.

Figure 19:
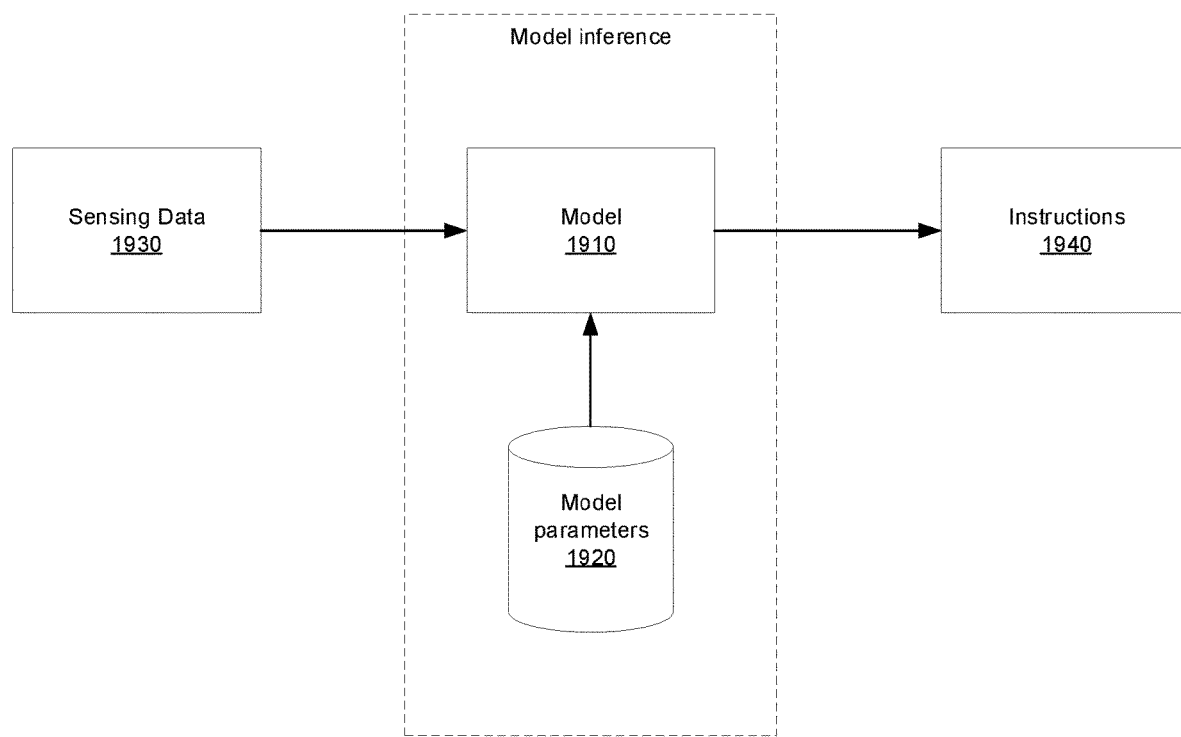
FIG. 19 is a block diagram illustrating an example of a trained machine learning model being used to generate instructions for the distributed intelligent software, according to some embodiments.

FIG. 19 is a block diagram illustrating an example of a trained machine learning model being used to generate instructions for the distributed intelligent software. Aspects of the trained model 1910 and associated model parameters 1920 may be stored on an embodiment of the central database and control system 520, an embodiment of the client device 530, an embodiment of the adhesive tape platform 510, or any combination thereof. The trained model 1910 receives sensing data 1930 as an input. The sensing data 1930 may be received from a tape node, a client device, the central database and control system, or some combination thereof. The trained model 1910 accesses model parameters 1920 relevant to the distributed intelligent software and generates instructions 1940 to alter the state of one or more tape nodes based on the received sensing data 1930 and the accessed model parameters 1920. In some embodiments, instructions 1940 also include instructions for the central database control center 530, one or more client devices 520, or any combination thereof. The model parameters 1920 may include values, parameters, conditions, and logic relevant to the distributed intelligent software. For example, the model parameters 1920 may include one or more threshold values for the sensing data 1330 used in detecting if an event has occurred.

Figure 20:
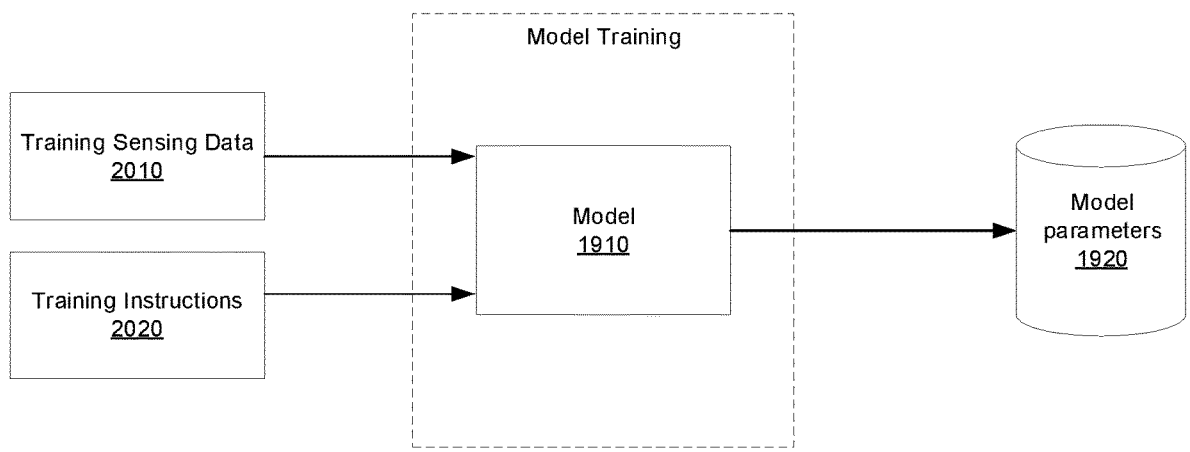
FIG. 20 is a block diagram illustrating an example of training the machine learning model shown in FIG. 19, according to some embodiments.

FIG. 20 is a block diagram illustrating an example of training the machine learning model shown in FIG. 19. During training, the model 1910 is trained using training sensing data 2010 as an input. The model 2010 may also optionally receive training instructions 2020 that correspond to the training sensing data 2010 as an input. For example, this may be the case when the model 1910 is trained using supervised training methods. The training instructions 2020 may include instructions to alter the state of one or more tape nodes according to the distributed intelligent software and corresponding to the training sensing data 1920. The model 1910 is trained by determining model parameters 1920, so as to best represent the relationship between the training sensing data 2010 and associated instructions that will be generated by the trained model 1910. For example, the model 1910 may be a neural network trained using a stochastic gradient descent technique or some other type of machine learning model. Once the model parameter 1920 are known, the trained model 1910 may be used to generate instructions for one or more tape nodes, the central database and control system, one or more client devices, or some combination thereof. As discussed with respect to FIG. 19, the output of the trained model 1910 is used to generate instructions according to the distributed intelligent software.

Example Interface

Figure 22:
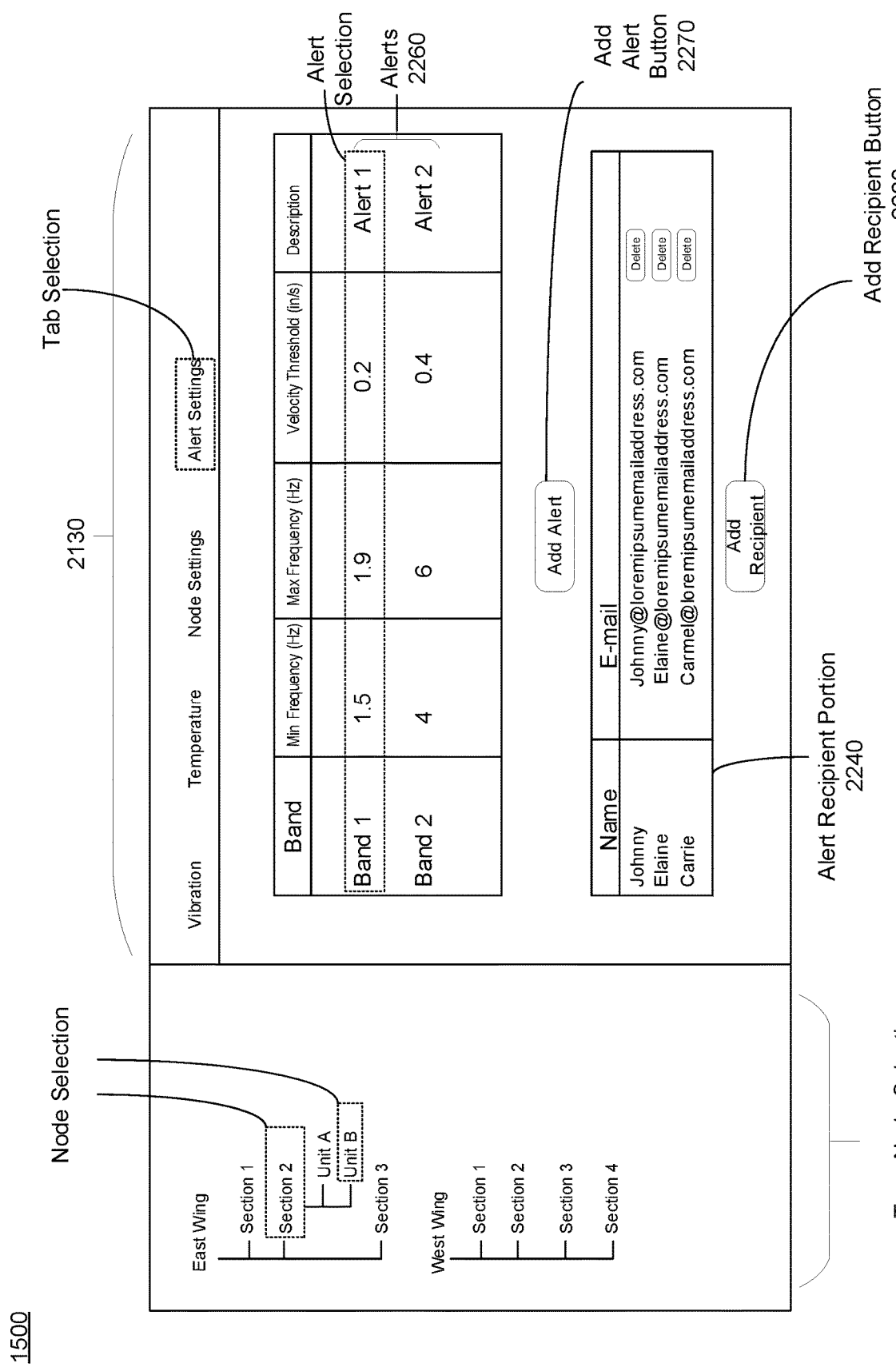
FIG. 22 is an example user interface for setting parameters relevant to the distributed intelligent software, according to some embodiments.
Figure 23:
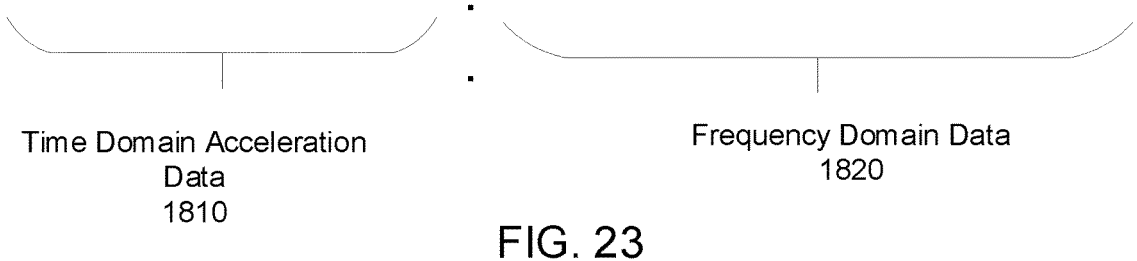
FIG. 23 is a chart showing example sensor data received by the central database and control system from a tape node and downloaded to the client device associated with the interface, according to some embodiments.

FIGS. 21-23 relate to example user interfaces that may be shown on one or more client devices 530 for displaying sensing data, managing the adhesive tape platform and sensing system 500, and setting parameters of the distributed intelligent software, according to some embodiments. The example user interfaces 2100, 2200 in FIG. 21 and FIG. 22, respectively, may be displayed on one or more embodiments of the client device 530. In some embodiments, the example user interfaces may be displayed on a personal computer display as part of an application, web app, website, or some combination thereof. In other embodiments, the example user interfaces are displayed on a smart phone display, as part of a smartphone app.

FIG. 21 is an example user interface 2100 for displaying information (e.g., properties and settings of the tape node) and sensor data received from a tape node. On the left side of FIG. 21 in the tape node selection portion, two tape nodes are shown in the user interface, tape node A and tape node B. The tape node A is organized into a group labeled "East Wing." For example, East Wing may be a label that indicates a location of the tape node A. The tape node B is similarly organized into a group labeled "West Wing." A user may interact with the user interface in the tape node selection portion to select which tape node has its sensor data and properties displayed in the data viewing portion 2120. A user may interact with the data selection portion 2130 to select which types of information are displayed in the data viewing portion 2120. In the example of FIG. 21, the tape node A is selected in the tape node selection portion 2110, and the "node settings" are selected in the data selection portion 2120, resulting in various settings of the tape node A being displayed in the data viewing portion 2120. In some embodiments, the user is able to interact with the settings shown in the data viewing portion 2120 to change various settings and parameters for the selected tape node (e.g., tape node A). Some of the settings and parameters that can be changed using the interface 2100 may affect relevant parameters, logic, and instructions that are included in the distributed intelligent software, according to some embodiments.

FIG. 22 is an example user interface 2200 for setting parameters relevant to the distributed intelligent software. The example user interface 2200 includes the tape node selection portion 2210, the data viewing portion 2220, and the data selection portion 2230. The tape node selection portion 2210, the data viewing portion 2220, and the data selection portion 2230 function similarly to the respective tape node selection portion 2110, the data viewing portion 2120, and the data selection portion 2130 shown in FIG. 21.

In the example of FIG. 22, the tape node A is selected in the tape node selection portion and the "alert settings" are selected in the data selection portion 2230, resulting in the alert settings and information for the tape node A being displayed in the data viewing portion 2220. The alert settings and information for the tape node A are settings and properties relevant to the distributed intelligent software. In particular, the alert settings and information for the tape node partly define rules and logic for when alerts are transmitted to one or more client devices 530 from an embodiment of the central database and control system 520 associated with tape node A, in response to the vibration sensor data that tape node A (an embodiment of the adhesive tape platform 510) collects.

In the example shown in FIG. 22, the central database and control system 520 transmits an alert to one or more client devices 530 associated with the users and email addresses shown in the alert recipient portion 2240. In some embodiments, the alert is transmitted via email to the email addresses shown in the alert recipient portion 2250. The user of the interface 2200 may interact with the alert recipient portion to change which users and/or client devices 530 receive alerts from the central database and control system 520. For example, a user may interact with the add recipient button 2270 to include additional recipients and/or client devices that receive alerts. A row of properties and settings related to an alert 2260 are shown in data viewing portion 2220.

In the example of FIG. 22, the alert 2260 is displayed in the data viewing portion 2220, including the parameters of "Min Frequency (Hz)", "Max Frequency (Hz)", and "Velocity Threshold (in/S)" relevant to how the distributed intelligent software determines when to send the alert 2260. In the example shown in FIG. 22, an alert is transmitted when any of selected velocity indicator measurements has a value above the "Velocity Threshold (in/S)" (i.e., 0.2 in/S). The selected velocity indicator measurements are velocity measurement components that occur in the frequency band between the "Min Frequency (Hz)" and the Max Frequency (Hz) (i.e., between 2.31 Hz and 2.4 Hz). The selected velocity indicator measurements may be calculated by performing an FFT on sensor data from a vibration sensor (e.g., an accelerometer) in tape node A, according to some embodiments. By interacting with the data viewing portion 2220, the user of the interface 2200 may edit and/or change the parameters (e.g., "Min Frequency (Hz)", "Max Frequency (Hz)", and "Velocity Threshold (in/S)") relevant to how the distributed intelligent software determines when to send the alert 2260. By changing the "Min Frequency (Hz)" and the "Max Frequency (Hz)" values, the user may change the frequency band or range of frequencies that are used for the indicator measurement. By changing the "Velocity Threshold (in/S)," the user may change the high threshold value that triggers the alert when the indicator measurement is above the high threshold. The user may also interact with the add alert button 2270 to configure the distributed intelligent software to include additional alerts.

In some embodiments, the client device 530 receives a full range of sensor data from a selected tape node as part of the downloaded sensor data. FIG. 23 is a chart showing example sensor data received by the central database and control system from a tape node and downloaded to the client device 530 associated with the interface 2200, according to some embodiments. The sensor data shown in the chart includes a full range of time-domain acceleration data 2310 (each data pair including an acceleration value and a relative time when the acceleration value was measured) shown on the left two columns of the chart. The sensor data also includes a full range of frequency-domain data 2320 (each data entry including an acceleration value, a velocity value, and a frequency corresponding to the acceleration and the velocity values) in the right 3 columns of the chart. In some embodiments, the frequency-domain data is calculated from a FFT performed on the time-domain acceleration data.

Example Computer Apparatus

Figure 24:
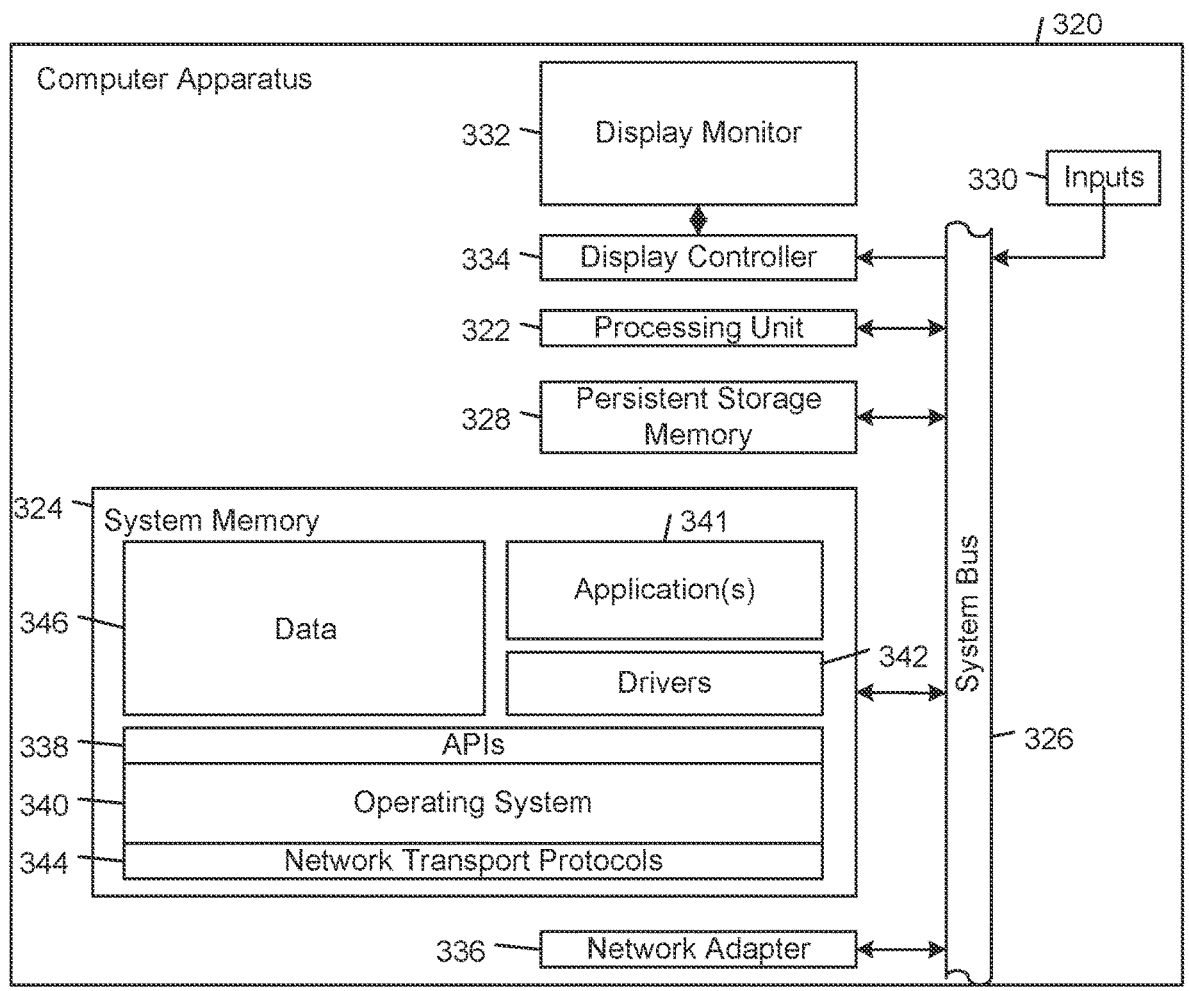
FIG. 24 shows an example embodiment of computer apparatus that, either alone or in combination with one or more other computing apparatus, is operable to implement one or more of the computer systems described in this specification, according to some embodiments.

FIG. 24 shows an example embodiment of computer apparatus 320 that, either alone or in combination with one or more other computing apparatus, is operable to implement one or more of the computer systems described in this specification. A client device in the sensing system 400, 500 may be an embodiment of the computer apparatus 320.

The computer apparatus 320 includes a processing unit 322, a system memory 324, and a system bus 326 that couples the processing unit 322 to the various components of the computer apparatus 320. The processing unit 322 may include one or more data processors, each of which may be in the form of any one of various commercially available computer processors. The system memory 324 includes one or more computer-readable media that typically are associated with a software application addressing space that defines the addresses that are available to software applications. The system memory 324 may include a read only memory (ROM) that stores a basic input/output system (BIOS) that contains start-up routines for the computer apparatus 320, and a random-access memory (RAM). The system bus 326 may be a memory bus, a peripheral bus or a local bus, and may be compatible with any of a variety of bus protocols, including PCI, VESA, Microchannel, ISA, and EISA. The computer apparatus 320 also includes a persistent storage memory 328 (e.g., a hard drive, a floppy drive, a CD ROM drive, magnetic tape drives, flash memory devices, and digital video disks) that is connected to the system bus 326 and contains one or more computer-readable media disks that provide non-volatile or persistent storage for data, data structures and computer-executable instructions.

A user may interact (e.g., input commands or data) with the computer apparatus 320 using one or more input devices 330 (e.g., one or more keyboards, computer mice, microphones, cameras, joysticks, physical motion sensors, and touch pads). Information may be presented through a graphical user interface (GUI) that is presented to the user on a display monitor 332, which is controlled by a display controller 334. The computer apparatus 320 also may include other input/output hardware (e.g., peripheral output devices, such as speakers and a printer). The computer apparatus 320 connects to other network nodes through a network adapter 336 (also referred to as a "network interface card" or NIC).

A number of program modules may be stored in the system memory 324, including application programming interfaces 338 (APIs), an operating system (OS) 340 (e.g., the Windows® operating system available from Microsoft Corporation of Redmond, Wash. U.S.A.), software applications 341 including one or more software applications programming the computer apparatus 320 to perform one or more of the steps, tasks, operations, or processes of the locationing and/or tracking systems described herein, drivers 342 (e.g., a GUI driver), network transport protocols 344, and data 346 (e.g., input data, output data, program data, a registry, and configuration settings).

Examples of the subject matter described herein, including the disclosed systems, methods, processes, functional operations, and logic flows, can be implemented in data processing apparatus (e.g., computer hardware and digital electronic circuitry) operable to perform functions by operating on input and generating output. Examples of the subject matter described herein also can be tangibly embodied in software or firmware, as one or more sets of computer instructions encoded on one or more tangible non-transitory carrier media (e.g., a machine-readable storage device, substrate, or sequential access memory device) for execution by data processing apparatus.

The details of specific implementations described herein may be specific to particular embodiments of particular inventions and should not be construed as limitations on the scope of any claimed invention. For example, features that are described in connection with separate embodiments may also be incorporated into a single embodiment, and features that are described in connection with a single embodiment may also be implemented in multiple separate embodiments. In addition, the disclosure of steps, tasks, operations, or processes being performed in a particular order does not necessarily require that those steps, tasks, operations, or processes be performed in the particular order; instead, in some cases, one or more of the disclosed steps, tasks, operations, and processes may be performed in a different order or in accordance with a multi-tasking schedule or in parallel.

Other embodiments are within the scope of the claims.

Additional Configuration Information

The foregoing description of the embodiments of the disclosure have been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A computer-implemented method comprising:
receiving, by a first wireless node of a sensing system, a first set of sensor data over a first communication interface of the first wireless node, the first set of sensor data generated by a first wireless sensor device of the sensing system attached to a first object of interest using a sensor of the first wireless sensor device, the first wireless sensor device located in proximity to the first wireless node;
receiving, by the first wireless node, a second set of sensor data over the first communication interface of the first wireless node, the second set of sensor data generated by a second wireless sensor device of the sensing system attached to a second object of interest using a sensor of the second wireless sensor device, the second wireless sensor device located in proximity to the first wireless node;
analyzing, by the first wireless node, the received first set of sensor data and second set of sensor data using a processor of the first wireless node;
determining, by the first wireless node, that an event has occurred based on the analysis of the received first set of sensor data and the second set of sensor data; and
in response to determining that the event has occurred, transmitting, by the first wireless node, a first report of the event to another node of the sensing system using a second communication interface of the first wireless node, the report comprising at least a portion of the first set of sensor data and a portion of the second set of sensor data.

2. The computer-implemented method of claim 1, wherein the second communication interface has a longer communication range than the first communication interface.

3. The computer-implemented method of claim 1, wherein the first communication interface is one selected from a group comprising a Bluetooth communication system, a Zigbee communication system, and a Z-Wave communication system.

4. The computer-implemented method of claim 1, wherein the second communication interface is one selected from a group comprising a LoRa communication system, a WiFi communication system, a cellular communication system, and a GPS communication system.

5. The computer-implemented method of claim 1, wherein the first wireless sensor device and the second wireless sensor device are located within a threshold distance from the first wireless node, the threshold distance corresponding to a communication range of the first communication interface.

6. The computer-implemented method of claim 1, further comprising:
   receiving, by the another node, the first report of the event using the second communication interface of the first wireless node;
   analyzing, by the another node, the received first report;
   determining, by the another node, the reported event requires further investigation by a user of the sensing system, based on the analysis of the received report; and
   in response to determining that the reported event requires further investigation by the user of the sensing system, transmitting a second report of the event to a server of the sensing system using a third communication interface of the another node, wherein
   the server notifies a user of the event via a client device associated with the user.

7. The computer-implemented method of claim 6, wherein the third communication interface has a longer communication range than the second communication interface.

8. The computer-implemented method of claim 6, wherein analyzing the received first report of the event by the another node comprises performing statistical analysis by the another node on the received portion of the first set of sensor data and the portion of the second set of sensor data.

9. The computer-implemented method of claim 6, further comprising:
   in response to confirming that the received first report of the event is accurate based on the analysis of the received first report, transmitting, by the another node, a first set of instructions to the first wireless node, wherein the first wireless node executes the instructions.

10. The computer-implemented method of claim 9, further comprising:
    in response to receiving the first set of instructions, transmitting, by the first wireless node, a second set of instructions to the first wireless sensor device and a third set of instructions to the second wireless sensor device, based on the received first set of instructions.

11. The computer-implemented method of claim 10, wherein the first set of instructions comprises configuration settings for the first wireless sensor device and configuration settings for the second wireless sensor device.

12. The computer-implemented method of claim 11, wherein the configuration settings for the first wireless sensor device and the configuration settings for the second wireless sensor device correspond to collecting additional sensor data from the first wireless sensor device and the second wireless sensor device for validating the first report and the second report.

13. The computer-implemented method of claim 1, further comprising:
    determining, by the first wireless node, that additional sensor data is required to confirm that the event has occurred;
    in response to determining that additional sensor data is required, requesting, by the first wireless node, sensor data from a third wireless sensor device of the sensing system attached to a third object of interest using the first communication interface of the first wireless node, wherein the third sensor device transmits a third set of sensor data to the first wireless node;
    analyzing, by the first wireless node, the first set of sensor data, the second set of sensor data, and the third set of sensor data; and
    confirming, by the first wireless node, that the event has based on the analysis of the first set of sensor data, the second set of sensor data, and the third set of sensor data.

14. The computer-implemented method of claim 1, wherein each of the first object of interest and the second object of interest is a component of an asset.

15. The computer-implemented method of claim 14, wherein the first set of sensor data describes a first property of the asset, and the second set of sensor data describes a second property of the asset different than the first property.

16. The computer-implemented method of claim 1, wherein each of the first set of sensor data and the second sensor data is one selected from a group comprising: temperature data, vibration data, acceleration data, velocity data, rotational velocity data, position data, electrical current data, voltage data, strain data, liquid flow data, and gas flow data.

17. The computer-implemented method of claim 1, wherein each of the first wireless sensing device and the second wireless sensing device is an adhesive tape platform that has a flexible form factor.

18. A sensing system comprising:
    a first wireless sensor device attached to a first object of interest, the first wireless sensor device comprising:
       a sensor configured to generate sensor data on a property of the first object of interest,
       a memory,
       a processor, and
       a first wireless communication interface;
    a first wireless node located within a distance from the first wireless sensor device corresponding to a communication range of the first wireless communication interface of the first wireless sensor device, the first wireless node comprising:
       a memory,
       a processor,
       a first wireless communication interface compatible with the first wireless communication interface of the first wireless sensor device, and
       a second wireless communication interface having a communication range that is larger than the communication range of the first wireless communication interface;
    a section node located within a distance from the first wireless node corresponding to the communication range of the second wireless communication interface, the section node comprising:
       a memory,
       a processor,
       a second wireless communication interface compatible with the second wireless communication interface of the first wireless node;
       a third wireless communication interface configured to wirelessly connect with a server of the sensing system; and the server configured to communicate with the section node and client devices associated with users of the sensing system, wherein the first wireless sensor device is configured to communicate with the first wireless node using the first communication interface of the first wireless sensor device and the first communication interface of the first wireless node, and the first wireless node is configured to communicate with the section node using the second communication interface of the first wireless node and the second communication interface of the section node.

\* \* \* \* \*

UNITED STATES PATENT AND TRADEMARK OFFICE
CERTIFICATE OF CORRECTION

PATENT NO. : 11,363,427 B2  
APPLICATION NO. : 17/209192  
DATED : June 14, 2022  
INVENTOR(S) : Hendrik J Volkerink et al.

Page 1 of 1

It is certified that error appears in the above-identified patent and that said Letters Patent is hereby corrected as shown below:

On the Title Page

Item (72), Inventors currently reads:  
"Hendrik J Volkerink, Palo Alto, CA (US); Ajay Khoche, West San Jose, CA (US)", Should read:  
-- Hendrik J Volkerink, Palo Alto, CA (US); Ajay Khoche, West San Jose, CA (US); Rohit Govindbhai Chudasama, Fremont, CA (US) --.

Signed and Sealed this  
Sixteenth Day of September, 2025

Coke Morgan Stewart  
*Acting Director of the United States Patent and Trademark Office*